(12) United States Patent
Chehade et al.

(10) Patent No.: US 9,952,677 B2
(45) Date of Patent: Apr. 24, 2018

(54) METHOD AND APPARATUS FOR DISTINGUISHING FEATURES IN DATA

(71) Applicant: Atheer, Inc., Mountain View, CA (US)

(72) Inventors: Mohamed Nabil Hajj Chehade, Los Angeles, CA (US); Allen Yang Yang, Richmond, CA (US)

(*) Notice: Subject to any disclaimer, the term of this patent is extended or adjusted under 35 U.S.C. 154(b) by 320 days.

(21) Appl. No.: 14/842,411

(22) Filed: Sep. 1, 2015

(65) Prior Publication Data

US 2016/0070360 A1 Mar. 10, 2016

Related U.S. Application Data

(60) Provisional application No. 62/047,479, filed on Sep. 8, 2014.

(51) Int. Cl.

| | |
|---|---|
| *G06F 3/033* | (2013.01) |
| *G06F 3/01* | (2006.01) |
| *G06K 9/00* | (2006.01) |
| *G06F 3/00* | (2006.01) |
| *G02B 27/01* | (2006.01) |
| *G06F 1/16* | (2006.01) |
| *G06F 3/03* | (2006.01) |

(52) U.S. Cl.
CPC ........... *G06F 3/017* (2013.01); *G02B 27/017* (2013.01); *G06F 1/163* (2013.01); *G06F 3/005* (2013.01); *G06F 3/011* (2013.01); *G06F 3/0304* (2013.01); *G06K 9/00335* (2013.01); *G06K 9/00355* (2013.01); *G02B 2027/014* (2013.01); *G02B 2027/0138* (2013.01); *G02B 2027/0178* (2013.01)

(58) Field of Classification Search
USPC ........................................................ 345/156
See application file for complete search history.

(56) References Cited

U.S. PATENT DOCUMENTS

| | | |
|---|---|---|
| 6,304,194 B1 | 10/2001 | McKillip |
| 6,501,853 B1 | 12/2002 | Gregg et al. |

(Continued)

OTHER PUBLICATIONS

Notice of Allowance dated Oct. 4, 2016, for U.S. Appl. No. 14/842,368 by Chehade, M. et al., filed Sep. 1, 2015.

(Continued)

*Primary Examiner* — Jason Olson
(74) *Attorney, Agent, or Firm* — Mohr Intellectual Property Law Solutions, PC

(57) ABSTRACT

To distinguish a region (e.g. hand) within a data set (e.g. digital image), data elements (e.g. pixels) representing a transition (e.g. hand outline) are identified. The direction toward the region is determined, for example using weighted direction matrices yielding a numerical maximum when aligned inward. A test element displaced one or more steps inward from the boundary element is tested against a standard for identifying the region. If the tested element meets the standard, that element is identified as part of the region. By examining data elements away from the transition, noise in the transition itself is avoided without altering the transition (e.g. by smoothing) while still only examining a linear data set (i.e. a contour or trace of the feature rather than a flooded interior thereof). The direction to the exterior of the region, an exterior contour, other features, and/or the transition also may be identified/followed.

23 Claims, 33 Drawing Sheets

(56) References Cited

U.S. PATENT DOCUMENTS

| | | | |
|---|---|---|---|
| 6,529,638 B1 | 3/2003 | Westerman | |
| 6,728,412 B1* | 4/2004 | Vasylyev | G06T 9/004 |
| | | | 382/242 |
| 7,016,011 B2 | 3/2006 | De Haan et al. | |
| 7,672,013 B2* | 3/2010 | Accad | H04N 1/58 |
| | | | 358/1.9 |
| 8,131,098 B2 | 3/2012 | Watanabe et al. | |
| 2007/0003134 A1 | 1/2007 | Song et al. | |
| 2008/0255782 A1 | 10/2008 | Bilac et al. | |
| 2009/0244309 A1 | 10/2009 | Maison et al. | |
| 2011/0173235 A1 | 7/2011 | Aman et al. | |
| 2011/0175916 A1 | 7/2011 | Noris et al. | |
| 2011/0282141 A1 | 11/2011 | Itkowitz et al. | |
| 2011/0295510 A1 | 12/2011 | Gulati et al. | |
| 2012/0033875 A1* | 2/2012 | Bergman | G06T 7/0081 |
| | | | 382/164 |
| 2013/0257748 A1 | 10/2013 | Ambrus et al. | |
| 2014/0056471 A1 | 2/2014 | Gu et al. | |
| 2014/0056472 A1* | 2/2014 | Gu | G06K 9/00208 |
| | | | 382/103 |
| 2014/0270540 A1* | 9/2014 | Spector | G06T 7/60 |
| | | | 382/199 |
| 2014/0340497 A1 | 11/2014 | Shigeta et al. | |
| 2014/0363043 A1 | 12/2014 | Bernal | |
| 2014/0363088 A1* | 12/2014 | Cha | G06K 9/00382 |
| | | | 382/195 |
| 2015/0084884 A1 | 3/2015 | Cherradi | |
| 2015/0138078 A1 | 5/2015 | Krupka et al. | |
| 2015/0254499 A1 | 9/2015 | Pang et al. | |
| 2015/0278589 A1 | 10/2015 | Mazurenko et al. | |
| 2015/0302617 A1 | 10/2015 | Shimura et al. | |
| 2016/0070359 A1 | 3/2016 | Chehade et al. | |

OTHER PUBLICATIONS

Non-Final Office Action dated Feb. 28, 2016, for U.S. Appl. No. 14/842,368 by Chehade, M. et al., filed Sep. 1, 2015.

* cited by examiner

FIG. 3

| 0 | 0 | 0 | 0 | 0 | 0 | 0 | 0 | 1 | 1 | 1 | 1 | 1 | 1 | 1 |
|---|---|---|---|---|---|---|---|---|---|---|---|---|---|---|
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 |

FIG. 4A  404A  406A  402A  408A

| 0 | 0 | 0 | 0 | 0 | 0 | 0 | 0 | 255 | 255 | 255 | 255 | 255 | 255 | 255 |
|---|---|---|---|---|---|---|---|---|---|---|---|---|---|---|
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |
| 0 | 0 | 0 | 0 | 0 | 0 | 0 | 0 | 255 | 255 | 255 | 255 | 255 | 255 | 255 |

FIG. 4B  404B  406B  402B  408B

| 0 | 0 | 0 | 0 | 0 | 0 | 0 | 127 | 255 | 255 | 255 | 255 | 255 | 255 | 255 |
|---|---|---|---|---|---|---|---|---|---|---|---|---|---|---|
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |
| 0 | 0 | 0 | 0 | 0 | 0 | 0 | 127 | 255 | 255 | 255 | 255 | 255 | 255 | 255 |

FIG. 4C    404C    406C    402C    408C

| 12 | 16 | 14 | 15 | 17 | 18 | 15 | 44 | 239 | 239 | 242 | 240 | 239 | 244 | 238 |
|---|---|---|---|---|---|---|---|---|---|---|---|---|---|---|
| 15 | 16 | 16 | 13 | 15 | 16 | 17 | 238 | 241 | 245 | 241 | 238 | 240 | 244 | 241 |
| 13 | 13 | 15 | 14 | 16 | 13 | 16 | 200 | 241 | 241 | 241 | 240 | 239 | 241 | 244 |
| 12 | 15 | 16 | 15 | 16 | 12 | 18 | 194 | 238 | 244 | 242 | 238 | 241 | 242 | 245 |
| 14 | 16 | 13 | 15 | 12 | 13 | 17 | 126 | 240 | 242 | 239 | 240 | 241 | 245 | 243 |
| 15 | 13 | 14 | 14 | 14 | 14 | 12 | 48 | 241 | 244 | 238 | 240 | 237 | 237 | 242 |
| 16 | 18 | 12 | 15 | 17 | 12 | 12 | 84 | 237 | 241 | 237 | 239 | 242 | 244 | 237 |
| 15 | 18 | 12 | 18 | 14 | 16 | 18 | 20 | 239 | 245 | 244 | 242 | 243 | 244 | 244 |
| 18 | 16 | 13 | 14 | 12 | 14 | 13 | 234 | 244 | 237 | 238 | 240 | 239 | 239 | 244 |
| 13 | 15 | 18 | 15 | 15 | 18 | 17 | 221 | 237 | 244 | 238 | 237 | 242 | 242 | 238 |
| 14 | 15 | 16 | 18 | 16 | 12 | 14 | 44 | 240 | 243 | 245 | 240 | 244 | 242 | 237 |
| 16 | 13 | 15 | 15 | 14 | 14 | 14 | 34 | 245 | 241 | 244 | 242 | 243 | 241 | 237 |
| 17 | 17 | 18 | 18 | 15 | 12 | 16 | 125 | 244 | 237 | 239 | 244 | 238 | 238 | 244 |
| 13 | 13 | 12 | 12 | 12 | 12 | 18 | 33 | 244 | 242 | 239 | 237 | 244 | 238 | 239 |
| 16 | 18 | 12 | 16 | 13 | 15 | 18 | 189 | 242 | 241 | 245 | 244 | 240 | 237 | 238 |

Dominant Direction Matrices (614)

614A

| 4 | 8 | 4 |
|---|---|---|
| 2 |   | 2 |
| 1 | 0 | 1 |

614B

| 2 | 4 | 8 |
|---|---|---|
| 1 |   | 4 |
| 0 | 1 | 2 |

614C

| 1 | 2 | 4 |
|---|---|---|
| 0 |   | 8 |
| 1 | 2 | 4 |

614D

| 0 | 1 | 2 |
|---|---|---|
| 1 |   | 4 |
| 2 | 4 | 8 |

614E

| 1 | 0 | 1 |
|---|---|---|
| 2 |   | 2 |
| 4 | 8 | 4 |

614F

| 2 | 1 | 0 |
|---|---|---|
| 4 |   | 1 |
| 8 | 4 | 2 |

614G

| 4 | 2 | 1 |
|---|---|---|
| 8 |   | 0 |
| 4 | 2 | 1 |

614H

| 8 | 4 | 2 |
|---|---|---|
| 4 |   | 1 |
| 2 | 1 | 0 |

Property Matrix (612)

612A

| 52 | 60  | 143 |
|----|-----|-----|
| 14 | 109 | 234 |
| 82 | 14  | 144 |

612B

| 52 | 60  | 143 |
|----|-----|-----|
| 14 | 109 | 234 |
| 82 | 14  | 144 |

612C

| 52 | 60  | 143 |
|----|-----|-----|
| 14 | 109 | 234 |
| 82 | 14  | 144 |

612D

| 52 | 60  | 143 |
|----|-----|-----|
| 14 | 109 | 234 |
| 82 | 14  | 144 |

612E

| 52 | 60  | 143 |
|----|-----|-----|
| 14 | 109 | 234 |
| 82 | 14  | 144 |

612F

| 52 | 60  | 143 |
|----|-----|-----|
| 14 | 109 | 234 |
| 82 | 14  | 144 |

612G

| 52 | 60  | 143 |
|----|-----|-----|
| 14 | 109 | 234 |
| 82 | 14  | 144 |

612H

| 52 | 60  | 143 |
|----|-----|-----|
| 14 | 109 | 234 |
| 82 | 14  | 144 |

Matrix Element Products (616)

616A

| 208 | 480 | 572 |
|-----|-----|-----|
| 28  |     | 468 |
| 82  | 0   | 1   |

616B

| 104 | 240 | 1144 |
|-----|-----|------|
| 14  |     | 936  |
| 0   | 14  | 1    |

616C

| 52 | 120 | 572  |
|----|-----|------|
| 0  |     | 1872 |
| 82 | 28  | 1    |

616D

| 0   | 60 | 286 |
|-----|----|-----|
| 14  |    | 936 |
| 164 | 56 | 1   |

616E

| 52  | 0   | 143 |
|-----|-----|-----|
| 28  |     | 468 |
| 328 | 112 | 1   |

616F

| 104 | 60 | 0   |
|-----|----|-----|
| 56  |    | 234 |
| 656 | 56 | 1   |

616G

| 208 | 120 | 143 |
|-----|-----|-----|
| 112 |     | 0   |
| 328 | 28  | 1   |

616H

| 416 | 240 | 286 |
|-----|-----|-----|
| 56  |     | 234 |
| 164 | 14  | 1   |

Product Sums (618)

| 4 |   | 8 |   | 4 |
|---|---|---|---|---|
|   |   |   |   |   |
| 2 |   |   |   | 2 |
|   |   |   |   |   |
| 1 |   | 0 |   | 1 |

714B

| 4 |   | 8 |   | 4 |
|---|---|---|---|---|
|   | 4 | 8 | 4 |   |
| 2 | 2 |   | 2 | 2 |
|   | 1 | 0 | 1 |   |
| 1 |   | 0 |   | 1 |

714C

| 4 | 6 | 8 | 6 | 4 |
|---|---|---|---|---|
| 3 |   |   |   | 3 |
| 2 |   |   |   | 2 |
| 1 |   |   |   | 1 |
| 1 | 0 | 0 | 0 | 1 |

714D

| 4 | 8 | 8 | 8 | 4 |
|---|---|---|---|---|
| 2 |   |   |   | 2 |
| 2 |   |   |   | 2 |
| 2 |   |   |   | 2 |
| 1 | 0 | 0 | 0 | 1 |

714E

|   | 2 |   |
|---|---|---|
| 1 |   | 1 |
|   | 0 |   |

714E

714F

| 12 | 16 | 14 | 15 | 17 | 18 | 15 | 44  | 12 | 13 | 13 | 12 | 18 | 15 | 13 |
|----|----|----|----|----|----|----|-----|----|----|----|----|----|----|----|
| 15 | 16 | 16 | 13 | 15 | 16 | 17 | 238 | 13 | 14 | 14 | 17 | 18 | 14 | 17 |
| 13 | 13 | 15 | 14 | 16 | 13 | 16 | 200 | 13 | 13 | 18 | 13 | 17 | 14 | 15 |
| 12 | 15 | 16 | 15 | 16 | 12 | 18 | 194 | 18 | 16 | 12 | 13 | 16 | 18 | 17 |
| 14 | 16 | 13 | 15 | 12 | 13 | 17 | 126 | 18 | 14 | 16 | 13 | 14 | 15 | 17 |
| 15 | 13 | 14 | 14 | 14 | 14 | 12 | 48  | 13 | 12 | 13 | 13 | 18 | 16 | 13 |
| 16 | 18 | 12 | 15 | 17 | 12 | 12 | 154 | 16 | 12 | 16 | 13 | 17 | 16 | 14 |
| 15 | 18 | 12 | 18 | 14 | 16 | 18 | 20  | 15 | 16 | 13 | 14 | 18 | 17 | 18 |
| 18 | 16 | 13 | 14 | 12 | 14 | 13 | 234 | 12 | 14 | 14 | 17 | 18 | 16 | 18 |
| 13 | 15 | 18 | 15 | 15 | 18 | 17 | 221 | 13 | 13 | 14 | 12 | 15 | 15 | 13 |
| 14 | 15 | 16 | 18 | 16 | 12 | 14 | 44  | 13 | 15 | 12 | 14 | 13 | 13 | 16 |
| 16 | 13 | 15 | 15 | 14 | 14 | 14 | 34  | 16 | 18 | 14 | 14 | 15 | 17 | 17 |
| 17 | 17 | 18 | 18 | 15 | 12 | 16 | 125 | 16 | 17 | 14 | 13 | 12 | 18 | 18 |
| 13 | 13 | 12 | 12 | 12 | 12 | 18 | 33  | 16 | 14 | 13 | 14 | 15 | 18 | 15 |
| 16 | 18 | 12 | 16 | 13 | 15 | 18 | 189 | 12 | 15 | 16 | 18 | 12 | 12 | 13 |

FIG. 12A

| 243 | 245 | 242 | 243 | 237 | 242 | 238 | 44  | 241 | 239 | 242 | 240 | 239 | 244 | 238 |
|-----|-----|-----|-----|-----|-----|-----|-----|-----|-----|-----|-----|-----|-----|-----|
| 244 | 243 | 241 | 244 | 243 | 237 | 240 | 238 | 241 | 245 | 241 | 238 | 240 | 244 | 241 |
| 240 | 241 | 245 | 243 | 243 | 242 | 243 | 200 | 241 | 241 | 241 | 240 | 239 | 241 | 244 |
| 243 | 243 | 243 | 241 | 244 | 240 | 240 | 194 | 238 | 244 | 242 | 238 | 241 | 242 | 245 |
| 240 | 243 | 242 | 244 | 242 | 245 | 245 | 126 | 240 | 242 | 239 | 240 | 241 | 245 | 243 |
| 240 | 237 | 243 | 240 | 237 | 242 | 244 | 48  | 241 | 244 | 238 | 240 | 237 | 237 | 242 |
| 241 | 240 | 238 | 245 | 244 | 244 | 238 | 154 | 237 | 241 | 237 | 239 | 242 | 244 | 237 |
| 237 | 240 | 240 | 237 | 244 | 245 | 242 | 20  | 239 | 245 | 244 | 242 | 243 | 244 | 244 |
| 237 | 242 | 245 | 238 | 238 | 242 | 238 | 234 | 244 | 237 | 238 | 240 | 239 | 239 | 244 |
| 242 | 245 | 238 | 245 | 237 | 240 | 238 | 221 | 237 | 244 | 238 | 237 | 242 | 242 | 238 |
| 241 | 245 | 239 | 244 | 239 | 241 | 244 | 44  | 240 | 243 | 245 | 240 | 244 | 242 | 237 |
| 240 | 241 | 239 | 239 | 240 | 244 | 237 | 34  | 245 | 241 | 244 | 242 | 243 | 241 | 237 |
| 240 | 239 | 241 | 238 | 242 | 244 | 239 | 125 | 244 | 237 | 239 | 244 | 238 | 238 | 244 |
| 242 | 242 | 239 | 241 | 245 | 243 | 242 | 33  | 244 | 242 | 239 | 237 | 244 | 238 | 239 |
| 244 | 242 | 237 | 237 | 237 | 243 | 240 | 189 | 242 | 241 | 245 | 244 | 240 | 237 | 238 |

FIG. 12B

METHOD AND APPARATUS FOR DISTINGUISHING FEATURES IN DATA

This application claims the benefit of U.S. Provisional Application Ser. No. 62/047,479, entitled "METHOD AND APPARATUS FOR DISTINGUISHING FEATURES IN DATA," filed Sep. 8, 2014, This application is related to U.S. application Ser. No. 14/842,368, entitled "METHOD AND APPARATUS FOR DISTINGUISHING FEATURES IN DATA," filed Sep. 1, 2015. These applications are incorporated herein in their entirety.

FIELD OF THE INVENTION

This disclosure relates to distinguishing features within a larger collection of data. More particularly, the disclosure relates to determining the presence and/or extent of features such as hands or other end-effectors within a data set such as a depth map or a visual image, by evaluating data at and near potential feature boundaries.

DESCRIPTION OF RELATED ART

In order to evaluate, interpret, or otherwise make use of the content of a data set, it may be useful or necessary to distinguish a particular feature from a larger body of data. For example, in order to interpret hand postures and gestures in a visual image (e.g. for use as input) it may be helpful to make a distinction between what portion of the image is or may be the hand. This process—distinguishing one portion of a data set such as an image from another portion thereof—is sometimes referred to as "segmentation".

In segmenting an image or otherwise making such a distinction within a data set, it may at times be useful to rely on boundaries between the feature in question and portions of the data set that are not part of the feature. To continue the example above, it may be useful to distinguish between "hand" and "not hand" in a visual image by identifying transitions within the image that may represent the outline of the hand.

However, relying on boundaries in such fashion also may be problematic. Boundaries may not always be sharp or otherwise well-defined. In addition, boundaries in a visual image may or may not represent the outline of the hand, perhaps instead representing other outlines, incidental features within the image, image artifacts, etc.

BRIEF SUMMARY OF THE INVENTION

This disclosure contemplates a variety of systems, apparatus, methods, and paradigms for distinguishing and/or segmenting features within data.

In one embodiment a machine-implemented method for controlling a device through hand inputs is provided, including establishing a depth image including pixels in a processor, and defining a hand in the depth image with the processor. Defining the hand includes establishing a depth value for the pixels of the depth image, establishing a depth value standard distinguishing the hand in the depth image based on the depth value for the pixels, and establishing a plurality of test boundary pixels collectively comprising a boundary for said hand within said depth image, determining the next test boundary element at least partially from the current test boundary element. The method includes, for each boundary pixel, establishing eight dominant directions, establishing a property matrix including the depth value for a three by three configuration of pixels centered on and excluding the test boundary pixel, and establishing a three by three dominant direction matrix for each of the dominant directions, each dominant direction matrix centered on and excluding the test boundary pixel and including weighting values of 8 in the dominant direction, 4 s 45 degrees offset from the dominant direction, 2 s 90 degrees offset from the dominant direction, 1 s 135 degrees offset from the dominant direction, and 0 180 degrees offset from the dominant direction. The method further includes for each dominant direction matrix, multiplying each value thereof with a corresponding depth value of the property matrix and summing products thereof to yield a dominant direction value, and determining a test inward direction for the hand relative to the test boundary pixel by comparing the dominant direction values. The method also includes establishing a test hand pixel in the depth image displaced at least one step from the test boundary pixel in the test inward direction, comparing the depth value of the test hand pixel to the depth value standard, and if the depth value of the test hand pixel satisfies the depth value standard, identifying the test hand pixel as belonging to the hand. If the pixels identified as belonging to the hand include a substantially continuous trace disposed inward from the boundary, the method includes identifying a portion of the depth image enclosed by the trace as belonging to the hand. The method also includes determining with the processor the configuration and/or motion of the hand, identifying with the processor a control command that is associated with the configuration and/or motion of said hand calling the control command with the processor so as to control the device.

In another embodiment a machine-implemented method for controlling a system through event detection is provided, including establishing a data set including elements in a processor, and defining a region in the data set with the processor. Defining the region includes establishing a property of the elements, establishing a standard distinguishing the region based on the property, and establishing a test boundary element. Defining the data set also includes determining a test inward direction for the region relative to the test boundary element, determining a test region element of the data set displaced at least one step from the test boundary element in the test inward direction, comparing the property of the test region element to the standard, and identifying the test region element as belonging to the region if the property of the test region element satisfies the standard. The method also includes determining with the processor an event indicated by the region, identifying with the processor a control command associated with the event, and calling the control command with the processor, so as to control said system.

The method may include establishing a plurality of test boundary elements, and for each test boundary element establishing a test inward direction, establishing a test region element displaced at least one step inward, comparing the property of the test region element to the standard, and identifying the test region element as belonging to the region if the property of the test region element satisfies the standard.

The next in a plurality of test boundary elements may be determined at least partially from the current test boundary element.

The method may include establishing a boundary propagation direction for the region relative to the test boundary element, and establishing the next test boundary element by displacing at least one step from the current test boundary element in the boundary propagation direction.

The test boundary elements may collectively form a boundary of the region. The boundary may be at least substantially continuous. Elements identified as belonging to the region may form a trace disposed inward from the boundary. The trace may be at least substantially continuous.

A portion of the data set enclosed by the boundary may be identified as belonging to the region. Elements of the data set inward of the trace relative to the boundary may be identified as belonging to the region.

The method may include calling a control command responsive to defining the region.

The data set may include an optical image, a depth map, and/or a depth image. The elements may include pixels. The property may include color, brightness, degree of focus, and/or depth. The test boundary element includes a discontinuity in the property.

Establishing the test inward direction may include establishing dominant directions, analyzing each dominant direction, and selecting the test inward direction from the among the dominant directions.

Analyzing the dominant directions may include calculating a mathematical value for the dominant directions based on a value of the property at or near the test region element, and selecting the test inward direction may include comparing the mathematical values.

Analyzing the dominant directions may include establishing a property matrix including values of the property for a configuration of elements at or near the test boundary element, establishing a dominant direction matrix including weighting values for the configuration of elements at or near the test boundary element, and multiplying each element thereof with a corresponding element of the property matrix and summing products thereof to yield a dominant direction value.

Selecting the test inward direction may include identifying the maximum of the dominant direction values and selecting the dominant direction associated therewith as the test inward direction.

If at least two of the dominant direction values are substantially equal maxima, the property matrix may be expanded to an enlarged configuration of elements at or near the test boundary element, and each of the dominant direction matrices may be expanded to the enlarged configuration. For each enlarged dominant direction matrix, each element thereof may be multiplied with a corresponding element of the enlarged property matrix and the products thereof summed to yield an enlarged dominant direction value. The maximum of the enlarged dominant values may be identified, and the dominant direction associated therewith selected as the test inward direction.

Selecting the test inward direction may include identifying a minimum of the dominant direction values and selecting the dominant direction associated therewith as the test inward direction.

If at least two of the dominant direction values are substantially equal minima, the property matrix may be increased to an enlarged configuration of elements at or near the test boundary element, and each of the dominant direction matrices may be increased to the enlarged configuration. For each enlarged dominant direction matrix, each element thereof may be multiplied with a corresponding element of the enlarged property matrix and the products thereof summed to yield an enlarged dominant direction value. The minimum of the enlarged dominant values may be identified, and the dominant direction associated therewith selected as the test inward direction.

The property matrix may include a three by three matrix centered on and excluding the test boundary element.

The weighting values for each of the dominant direction matrices include 8 in the dominant direction, 4 s 45 degrees offset from the dominant direction, 2 s 90 degrees offset from the dominant direction, 1 s 135 degrees offset from the dominant direction, and 0 180 degrees offset from the dominant direction.

The standard may be variable.

In another embodiment an apparatus is provided for controlling a system responsive to event detection, that includes a processor. A data set establisher including executable instructions is instantiated on the processor, the data set establisher being adapted to establish a data set including a plurality of elements. A property establisher including executable instructions is instantiated on the processor, the property establisher being adapted to establish a property of at least some of the elements of the data set. A standard establisher including executable instructions is instantiated on the processor, the standard establisher being adapted to establish a standard distinguishing a region of the data set based on the property. A test boundary element establisher including executable instructions is instantiated on the processor, the test boundary element establisher being adapted to establish potential boundary elements defining the region within the data set. A test inward direction determiner including executable instructions is instantiated on the processor, the test inward direction establisher being adapted to establish a test inward direction relative to the test boundary element. A test region element displacer including executable instructions is instantiated on the processor, the test region element displacer being adapted to displace a test region element from the test boundary element in the test direction by at least one step. A property comparer including executable instructions is instantiated on the processor, the property comparer being adapted to compare the test region element against the standard. A region identifier including executable instructions is instantiated on the processor, the region identifier being adapted to identify the test region element as part of the region if the test region element satisfies the standard. A control command caller including executable instructions is instantiated on the processor, the controller command caller being adapted to determine an event indicated by the region, to identify a control command associated with the event, and to call the command so as to control the system.

The apparatus may include a body, the processor being disposed on the body, a sensor disposed on the body, and first and second displays disposed on the body, wherein the body is adapted to be worn on a head of a wearer, such that when the body is worn the first and second displays are disposed substantially in front of, facing toward, and proximate the eyes of the wearer so as to enable output thereto, and the sensor is aligned such that a field of view of the sensor is directed substantially in front of the wearer.

In another embodiment an apparatus for controlling a system responsive to event detection is provided. The apparatus includes means for establishing a data set including a plurality of elements, and means for defining a region in the data set. The means for defining the region includes means for establishing a property of the elements of the data set, means for establishing a standard distinguishing the region of the data set based on the property, means for establishing a test boundary element, means for determining a test inward direction for the region relative to the test boundary element, means for determining a test region element of the data set displaced at least one step from the test boundary element in the test inward direction, means for comparing the property of the test region element to the standard, and means for identifying the test region element as belonging to the region if the property of the test region element satisfies the standard. The apparatus also includes means for determining an event indicated by the region, identifying a control command associated with the event, and calling the control command so as to control the system.

In another embodiment a machine-implemented method for controlling a device through hand inputs is provided, including establishing a depth image including pixels in a processor, and defining a hand from a background in the depth image with the processor. Defining the hand from the background includes establishing a depth value for the pixels of the depth image, establishing a hand depth value standard corresponding with the hand in the depth image based on the depth value for the pixels, and establishing a background depth value standard corresponding with the background in the depth image based on the depth value for the pixels. Defining the hand from the background also includes establishing a plurality of test boundary pixels collectively comprising a boundary for said hand within said depth image, determining the next test boundary element at least partially from the current test boundary element. The method includes, for each boundary pixel, establishing eight dominant directions, establishing a property matrix including the depth value for a three by three configuration of pixels centered on and excluding the test boundary pixel, and establishing a three by three dominant direction matrix for each of the dominant directions, each the dominant direction matrix centered on and excluding the test boundary pixel and including weighting values of 8 in the dominant direction, 4 s 45 degrees offset from the dominant direction, 2 s 90 degrees offset from the dominant direction, 1 s 135 degrees offset from the dominant direction, and 0 180 degrees offset from the dominant direction. The method further includes for each dominant direction matrix, multiplying each value thereof with a corresponding depth value of the property matrix and summing products thereof to yield a dominant direction value, determining a test inward direction for the hand relative to the test boundary pixel by comparing the dominant direction values, and determining a test outward direction for the hand relative to the test boundary pixel by comparing the dominant direction values. The method also includes establishing a test hand pixel in the depth image displaced at least one step from the test boundary pixel in the test inward direction, comparing the depth value of the test hand pixel to the hand depth value standard, and identifying the test hand pixel as belonging to the hand if the depth value of the test hand pixel satisfies the hand depth value standard. The method further includes establishing a test background pixel in the depth image displaced at least one step from the test boundary pixel in the test outward direction, comparing the depth value of the test background pixel to the background depth value standard, and identifying the test background pixel as belonging to the background if the depth value of the test hand pixel satisfies the background depth value standard. If the pixels identified as belonging to the hand form a substantially continuous inward trace disposed inward from the boundary, the method may include identifying a portion of the depth image enclosed by the inward trace as belonging to the hand. The method also includes determining with the processor the configuration and/or motion of the hand, identifying with the processor a control command that is associated with the configuration and/or motion of said hand calling the control command with the processor so as to control the device.

In another embodiment a machine-implemented method for controlling a system through event detection is provided, including establishing a data set including a plurality of elements in a processor, and defining a region from a remnant in the data set with the processor. Defining the region from the remnant includes establishing a property of the elements of the data set, establishing a region standard distinguishing the region of the data set based on the property, establishing a remnant standard distinguishing a remnant of the data set based on the property, and establishing a test boundary element. Defining the region from the remnant also includes determining a test inward direction for the region relative to the test boundary element, determining a test outward direction for the region relative to the test boundary element, determining a test region element of the data set displaced at least one step from the test boundary element in the test inward direction, and determining a test remnant element of the data set displaced at least one step from the test boundary element in the test outward direction. Defining the region also includes comparing the property of the test region element to the region standard and identifying the test region element as belonging to the region if the property of the test region element satisfies the region standard, and comparing the property of the remnant region element to the remnant standard and identifying the test remnant element as belonging to the remnant if the property of the test remnant element satisfies the remnant standard. The method also includes determining with the processor an event indicated by the region, identifying with the processor a control command associated with the event, and calling the control command with the processor, so as to control said system.

The method may include establishing a plurality of test boundary elements, and for each the test boundary element establishing a test inward direction for the region relative to the test boundary element, establishing a test outward direction for the region relative to the test boundary element, establishing a test region element of the data set displaced at least one step from the test boundary element in the test inward direction, and establishing a test remnant element of the data set displaced at least one step from the test boundary element in the test outward direction. The method may include for each test boundary element comparing the property of the test region element to the region standard and identifying the test region element as belonging to the region, and comparing the property of the remnant region element to the remnant standard and identifying the test remnant element as belonging to the remnant if the property of the test remnant element satisfies the remnant standard.

The method may include establishing the next plurality of test boundary element at least partially from the current test boundary element.

The method may include establishing a boundary propagation direction for the region relative to the test boundary element, and establishing the next test boundary element by displacing at least one step from the current test boundary element in the boundary propagation direction.

The plurality of test boundary elements may collectively form a boundary of the region. The boundary may be at least substantially continuous.

Elements identified as belonging to the region may form an inward trace disposed inward from the boundary, and elements identified as belonging to the remnant may form an outward trace disposed outward from the boundary. The inward and outward traces may be at least substantially continuous.

A portion of the data set enclosed by the boundary may be identified as belonging to the region, and a portion of the data set external to the boundary may be identified as belonging to the remnant.

Elements of the data set inward of the inward trace relative to the boundary may be identified as belonging to the region, and elements of the data set outward of the outward trace may be identified as belonging to the remnant.

The method may include calling a control command responsive to defining the region from the remnant.

The data set may include an optical image, a depth map, and/or a depth image. The elements may include pixels. The property may include color, brightness, degree of focus, and/or depth. The test boundary element may include a discontinuity in the property.

Establishing the test inward direction may include establishing dominant directions, analyzing each dominant direction, and selecting the test inward direction from among the dominant directions. Establishing the outward direction may include analyzing each dominant direction, and selecting the test outward direction from among the dominant directions.

Analyzing the dominant directions may include calculating a mathematical value for each dominant direction based on a value of the property at or near the test region element. Selecting the test inward direction and test outward direction may include comparing the mathematical values.

Analyzing the dominant directions may include establishing a property matrix including values of the property for a configuration of elements at or near the test boundary element, establishing a dominant direction matrix for each dominant direction, each dominant direction matrix including weighting values for the configuration of elements at or near the test boundary element, and for each dominant direction matrix multiplying each element thereof with a corresponding element of the property matrix and summing products thereof to yield a dominant direction value.

Selecting the test inward direction may include identifying a maximum of the dominant direction values and selecting the dominant direction associated therewith as the test inward direction. Selecting the test outward direction may include identifying a minimum of the dominant direction values and selecting the dominant direction associated therewith as the test outward direction.

If at least two of the dominant direction values are substantially equal maxima, the method may include expanding the property matrix to an enlarged configuration of elements at or near the test boundary element, expanding the dominant direction matrices to the enlarged configuration, and for each enlarged dominant direction matrix multiplying each element thereof with a corresponding element of the enlarged property matrix and summing products thereof to yield an enlarged dominant direction value. The method also may include identifying a maximum of the enlarged dominant values and selecting the dominant direction associated therewith as the test inward direction. If at least two of the dominant direction values are substantially equal minima, the method may include expanding the property matrix to an enlarged configuration of elements at or near the test boundary element, expanding the dominant direction matrices to the enlarged configuration, and for each enlarged dominant direction matrix multiplying each element thereof with a corresponding element of the enlarged property matrix and summing products thereof to yield an enlarged dominant direction value. The method also may include identifying a maximum of the enlarged dominant values and selecting the dominant direction associated therewith as the test outward direction.

Selecting the test inward direction may include identifying a minimum of the dominant direction values and selecting the dominant direction associated therewith as the test inward direction. Selecting the test outward direction may include identifying a maximum of the dominant direction values and selecting the dominant direction associated therewith as the test outward direction.

If at least two of the dominant direction values are substantially equal minima, the method may include expanding the property matrix to an enlarged configuration of elements proximate the test boundary element, enlarging each of the dominant direction matrices to the enlarged configuration, and for each enlarged dominant direction matrix multiplying each element thereof with a corresponding element of the enlarged property matrix and summing products thereof to yield an enlarged dominant direction value. They method also may include identifying a minimum of the enlarged dominant values and selecting the dominant direction associated therewith as the test outward direction. If at least two of the dominant direction values are substantially equal minima, the method may include enlarging the property matrix to an enlarged configuration of elements proximate the test boundary element, enlarging each of the dominant direction matrices to the enlarged configuration, and for each enlarged dominant direction matrix multiplying each element thereof with a corresponding element of the enlarged property matrix and summing products thereof to yield an enlarged dominant direction value. The method also may include identifying a maximum of the enlarged dominant values and selecting the dominant direction associated therewith as the test inward direction.

The property matrix may include a three by three matrix centered on and excluding the test boundary element.

The weighting values for each the dominant direction matrices may include 8 in the dominant direction, 4 s 45 degrees offset from the dominant direction, 2 s 90 degrees offset from the dominant direction, 1 s 135 degrees offset from the dominant direction, and 0 180 degrees offset from the dominant direction.

The region standard and/or the remnant standard may be variable.

In another embodiment an apparatus for controlling a system responsive to event detection is provided, that includes a processor adapted to execute executable instructions instantiated thereon. A data set establisher including executable instructions is instantiated on the processor, the data set establisher being adapted to establish a data set including a plurality of elements. a property establisher including executable instructions is instantiated on the processor, the property establisher being adapted to establish a property of at least some of the elements of the data set. A standard establisher including executable instructions is instantiated on the processor, the standard establisher being adapted to establish a region standard and a remnant standard distinguishing a region of the data set from a remnant of the data based on the region and remnant standards. A test boundary element establisher including executable instructions is instantiated on the processor, the test boundary element establisher being adapted to establish potential boundary elements defining the region from the remnant within the data set. A test direction establisher including executable instructions instantiated on the processor, the test direction establisher being adapted to establish a test inward direction relative to the test boundary element and a test outward direction relative to the test boundary element. A test region element displacer including executable instructions is instantiated on the processor, the test region element displacer being adapted to displace a test region element from the test boundary element in the test inward direction by at least one step and to displace a test remnant element from the test boundary element in the test outward direction by at least one step. A property comparer including executable instructions is instantiated on the processor, the property comparer being adapted to compare the test region element against the region standard and the test remnant element against the remnant standard. A region identifier including executable instructions is instantiated on the processor, the region identifier being adapted to identify the test region element as part of the region if the test region element satisfies the region standard and to identify the test remnant element as part of the remnant if the test remnant element satisfies the remnant standard. A control command caller including executable instructions is instantiated on the processor, the controller command caller being adapted to determine an event indicated by the region, to identify a control command associated with the event, and to call the command so as to control the system.

The apparatus may include a control command caller including executable instructions instantiated on the processor, the caller being adapted to call a control command with the processor responsive to defining the region from the remnant.

The apparatus may include a body, the processor being disposed on the body, a sensor disposed on the body, and first and second displays disposed on the body, wherein the body is adapted to be worn on a head of a wearer, such that when the body is worn the first and second displays are disposed substantially in front of, facing toward, and proximate eyes of the wearer so as to enable output thereto, and the sensor is aligned such that a field of view of the sensor is directed substantially in front of the wearer.

In another embodiment an apparatus for controlling a system responsive to event detection is provided, that includes means for establishing a data set including a plurality of elements, and means for defining a region from a remnant in the data set. The means for defining the region from the remnant include means for establishing a property of the elements of the data set, means for establishing a region standard distinguishing the region of the data set based on the property and the remnant of the data set based on the property, means for establishing a test boundary element, means for establishing a test inward direction for the region relative to the test boundary element and a test outward direction for the region relative to the test boundary element, means for establishing a test region element of the data set displaced at least one step from the test boundary element in the test inward direction and establishing a test remnant element of the data set displaced at least one step from the test boundary element in the test outward direction, means for comparing the property of the test region element to the region standard and the property of the test remnant element to the remnant standard, and means for identifying the test region element as belonging to the region if the property of the test region element satisfies the region standard and identifying the test remnant element as belonging to the remnant if the remnant property of the test remnant element satisfies the standard. The apparatus also includes means for determining an event indicated by the region, identifying a control command associated with the event, and calling the control command so as to control the system.

BRIEF DESCRIPTION OF THE SEVERAL VIEWS OF THE DRAWINGS

Like reference numbers generally indicate corresponding elements in the figures.

FIG. 3 shows an example data set in the form of an image with a hand therein, arranged as an array of binary data.

FIG. 4A shows an example data set exhibiting a sharp boundary therein.

FIG. 4B shows another example data set exhibiting a sharp boundary therein.

FIG. 4C shows an example data set exhibiting a boundary therein.

FIG. 4D shows an example data set exhibiting a boundary with noise variation therein.

FIG. 6 shows an example arrangement for determining inward direction with matrices.

FIG. 12A and FIG. 12B show example data sets including non-boundary features therein.

DETAILED DESCRIPTION OF THE INVENTION

Figure 1:
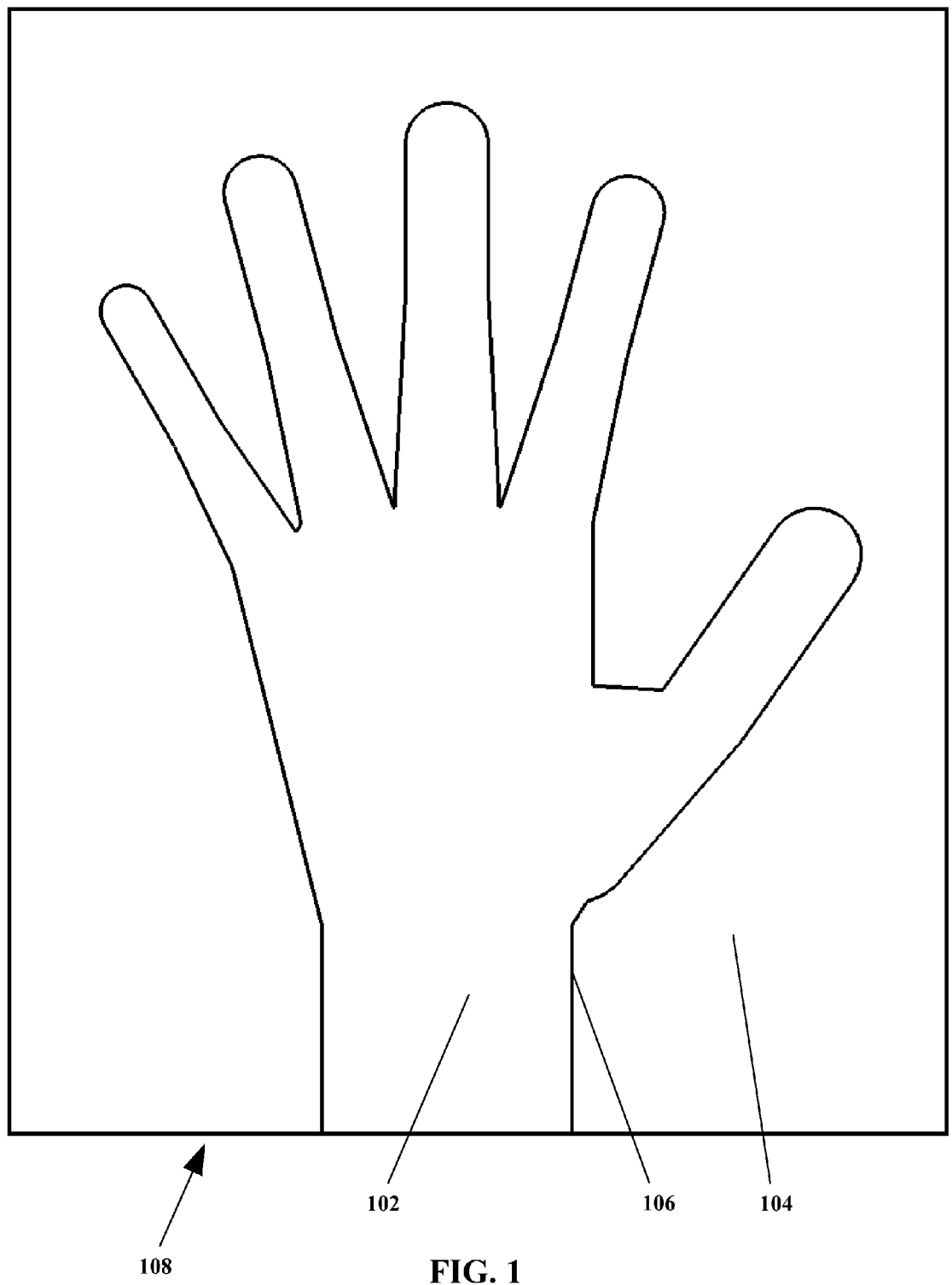
FIG. 1 shows an example data set in the form of an image with a hand therein.

FIG. 1 shows an example data set 108 in the form of an image. (The image in FIG. 1 is intentionally simplified for purposes of illustration; in practice an actual image or other data set may contain additional data, may be less clearly defined, may not exhibit a clear boundary or other transition, etc.) Therein a hand 102 is visible, being visibly distinct from the remainder 104 of the image along a boundary 106. The hand 102 may be considered to be a feature that is to be distinguished within the data set 108. For example, if the image were to be used for sensing posture/gesture input to some device or system, distinguishing the feature within the data set 108—i.e. determining what portion of the image is the hand 102—may be useful or necessary.

Although for purposes of example in FIG. 1 a hand 102 in an image is treated as a feature that is to be distinguished, embodiments are not limited only to distinguishing hands or other end-effectors, nor to use only with images as data sets. Likewise, although for simplicity only one hand 102 is shown in FIG. 1, embodiments may be equally suitable for distinguishing two or more features within a data set. Furthermore, embodiments are not particularly limited in regard to what may be considered a feature; while the hand 102 is treated as the feature in FIG. 1, the remainder 104 of the image (i.e. "everything but the hand") also may be considered a feature. Likewise, features need not represent physical objects, and may for example be or include non-physical or even abstract entities such as a shadow, an area with a particular range of color, a portion of an image exhibiting movement, etc.

Figure 2:
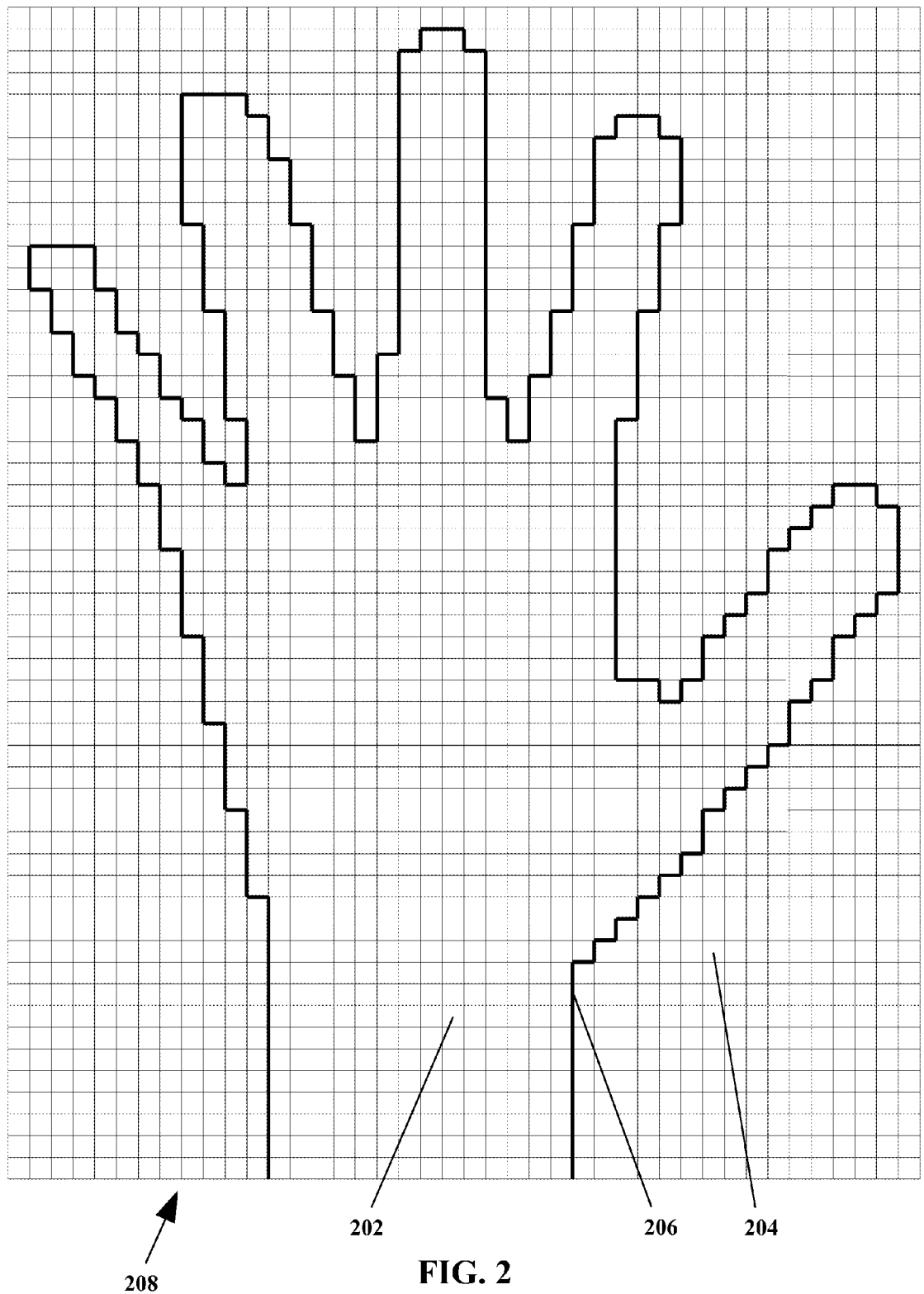
FIG. 2 shows an example data set in the form of an image with a hand therein, as ordered into pixels.

Now with reference to FIG. 2, another example data set 208 is shown in the form of a pixelated image. Such an arrangement corresponds at least approximately to certain regular two-dimensional data sets such as digital still photographs, depth maps, etc. A hand 202 similar to that in FIG. 1 (though pixelated) is visible, distinct from the remainder 204 of the image along a boundary 206. Again, the hand 202 may be considered to be a feature that is to be distinguished within the data set 208.

However, although a boundary 206 is shown in FIG. 2 for clarity, in practice a pixelated image such as that shown in FIG. 2 may not exhibit a boundary as a distinct feature in and of itself. That is, while there may be an area of a data set that differs from another area in terms of some property of the data, the boundary may not be an explicit feature so much as a transition between one value of such a property and another value of the property.

Figure 3:
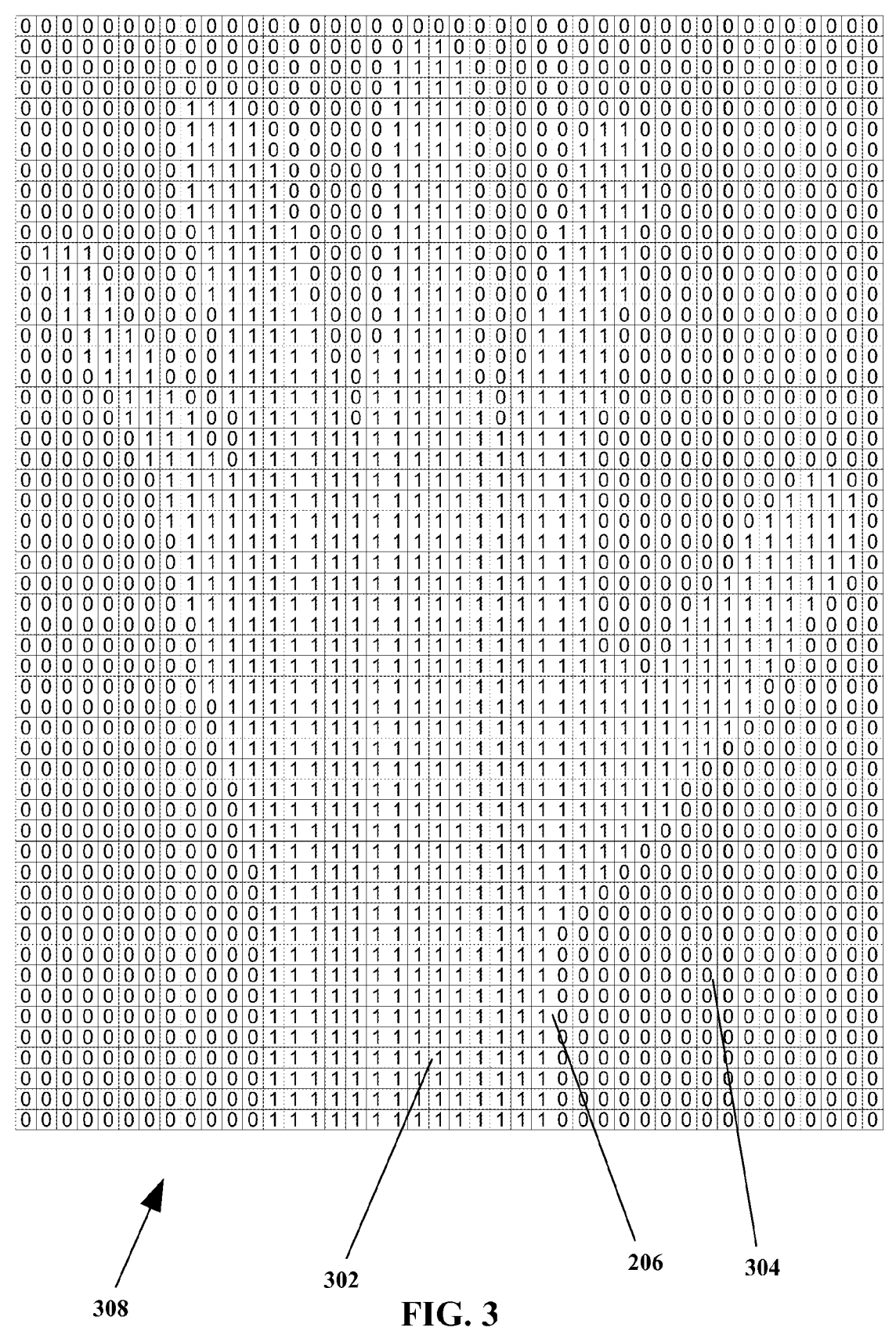

As a more concrete example, with reference to FIG. 3 another pixelated example data set 308 is shown therein. In the data set, each element (shown in this instance as rectangular pixels with a number therein) has some property with a value of either 0 or 1. This may correspond, for example, to a binary or black-and-white visual image of a hand, with the hand in white (with a color value of 1) and the remainder of the image in black (with a color value of 0).

The hand 302 may be represented by those pixels having a value of 1, while the remainder 304 of the image may be represented by those pixels having a value of 0. However, as may be seen there is no explicit line or other "thing" that represents the border between the hand 304 and the remainder 304 of the image. The fact of variation between a property value of 1 and a property value of 0 may be considered to be a boundary 306, and is indicated as such in FIG. 3, but it is important to note that as with the example shown in FIG. 3 not all data sets will have clear and explicit boundaries delineating features. In at least certain instances, boundaries within a data set must be detected, defined, or even arbitrarily assigned in some fashion.

Now with reference to FIG. 4A through FIG. 4D, the matter of determining boundaries is addressed further.

In FIG. 4A a data set 408A is shown that includes both a first region 402A and a second region 404A. The first region 402A exhibits some property with a binary value of 1, and the second region 404A exhibits some property with a binary value of 0. This is at least somewhat similar to the arrangement of FIG. 3, although in FIG. 4A the data set 408A does not depict any particular object, rather being an abstraction for purposes of illustration. Also as in FIG. 3, in FIG. 4A a boundary 406A may be considered to exist as a line between the first and second regions 402A and 404A, though that boundary 406A does not necessarily have any explicit existence beyond the fact of variation in property (i.e., in this example there are pixels that have a value of 1 on one side and pixels with a value of 0 on the other side). A data element (in this example a pixel) may be considered to be "on the boundary" or even to "be the boundary" if the pixel has a 0 to one side and a 1 to the opposite side, but again such a boundary is at least arguably not a tangible "thing".

Now referring to FIG. 4B, a similar arrangement to that in FIG. 4A is shown, with a data set 408B that includes a first region 402B and a second region 404B. The first region 402A exhibits some property with a value of 255, and the second region 404A exhibits some property with a binary value of 0. Such an arrangement may correspond for example with an 8 bit binary value of some property, having a range of 0 to 255. The range of the property, and the property itself, are not particularly limited.

Again in FIG. 4B, as in FIG. 4A, a boundary 406B may be considered to exist as a line between the first and second regions 402B and 404B, though that boundary 406A does not necessarily have any explicit existence beyond the fact of variation in property. Also as with FIG. 4A, in FIG. 4B a data element may be considered to be on or at the boundary if the pixel has a 0 to one side and a 255 to the opposite side.

Turning to FIG. 4C, another data set 408C is shown that includes a first region 402C and a second region 404C. The first region 402C exhibits some property with a value of 255, and the second region 404C exhibits some property with a binary value of 0. However, unlike FIG. 4B in FIG. 4C there is not a sharp transition in the value of the property from 0 to 255. Rather, the elements of the data set 408C with a value of 0 are separated from the elements of the data set 408C with a value of 255 by elements of the data set 408C with a value of 127. Such an arrangement may occur in data sets when transitions are not arbitrarily sharp; for a boundary between "black" and "white" there may be some region of "gray" therebetween.

Such a "gray area" may for example result from an arrangement wherein a pixel in an image is a mix of information from one object or feature and another object or feature. As a more concrete example, a pixel along the edge of a depth map of a hand may be a mix of the depth to the hand and the depth to whatever background may be behind the hand. Thus, the range of values in the transition itself (in this example a contour defining an outline of a hand) may range from the depth value of the hand to the depth value of the background, inclusive. In addition, under certain conditions transitions in images may be prone to generating artifacts in sensors, processing algorithms, etc., so that transitions may exhibit values (depth values for this example) that vary even more widely than the range between that of the hand and the background.

Although FIG. 4C shows an arrangement with a gray area at the transition 406C between the first region 402C and the second region 404C, in practice neither transitions nor regions will necessarily be so well-defined as is the case for FIG. 4C. That is, where FIG. 4C shows a data set 408C having a first region 402C with a uniform value of 255, a second region 404C with a uniform value of 0, and a transition 406C with a uniform value of 127, such uniformity may not be present in all data sets. Data sets may include therein a degree of variation or "noise".

Now with reference to FIG. 4D, another data set 408D is shown, including an example depiction of noise within the data set 408D. As noted above with regard to FIG. 4C, not all data sets may relied upon to be well-defined and free of noise; the arrangement of FIG. 4D shows an example of a data set less uniform than those examples illustrated in FIG. 4A, FIG. 4B, and FIG. 4C.

In the example of FIG. 4D the seven right-most columns of elements in the data set 408D exhibit a property with a value ranging 237 through 245 inclusive; these columns are identified collectively in FIG. 4D as the first region 402D. The seven left-most columns of elements in the data set 408D exhibit a property with a value ranging from 12 through 18 inclusive; these columns are identified collectively in FIG. 4D as the second region 404D. The center column between the first and second regions 402D and 404D ranges may be considered to be the boundary 406D, with cells that exhibit a property ranging from 20 through 238.

Although the boundary 406D is shown as a relatively dramatic change in values, as may be referred to as a "discontinuity" (e.g. the numerical values drop in a manner that is sharp and distinct from casual review), this is an example only. While discontinuity of some degree (though not necessarily so stark as shown in FIG. 4) may be considered as a boundary, boundaries may be more subtle, and may be defined by many ways and in view of many properties. Indeed, for certain data sets boundaries may not be immediately apparent at all, and identifying boundaries may include statistical analysis and/or other approaches for detecting subtle variations within a data set. The various embodiments are not limited with regard to what boundaries may be considered, or how those boundaries are defined, or how boundaries are identified.

(With regard to element 412D, a three-by-three matrix of data elements within the data set 408D is represented thereby, about which more will be said later.)

In the arrangement of FIG. 4D, as may be seen, there is variation or noise within the data set. The degree of variation may be seen by inspection to be greater along the boundary 406D (with a range of 219) than within either the first region 402D (with a range of 9) or the second region 404D (with a range of 7). It is not uncommon for sets to exhibit higher noise along transitions between/around features than within the features themselves, as in the example of FIG. 4D. The reasons for this greater degree of noise may vary.

For example, consider as an example a data set representing a depth image of a hand in front of a background, as acquired by a depth sensor. In this example each data element would represent a point in two dimensional space and a depth or distance from the sensor that acquired the data. For purposes of illustration, consider that the hand is at a substantially uniform distance of 10 cm and the background is at a substantially uniform distance of 100 cm. Given such an arrangement, the transition would correspond with the outline of the hand (sometimes referred to as a contour or contour line).

Under such circumstances, increased noise along the transition may result from physical parameters of the system. For example, the area represented by a data element along a transition may be only partially occupied by the hand, and so may be anywhere from 0% hand and 100% background to 100% hand and 0% background. This may result in distance measurements that are a mix of the distance to the hand and the distance to the background, and which (in this example) may be anywhere from 10 cm to 100 cm.

Noise along a transition may also manifest due to the particulars of the sensor or other entity used to obtain the data. For example, certain sensors may produce unusual or even erroneous data in regions wherein properties change rapidly or discontinuously; in such cases the values generated for individual data elements along a transition may not accurately represent either the hand or the background, may generate "fault" responses or physically impossible values (e.g. a distance of −1), etc. Certain algorithms for processing data likewise may produce noise in such fashion.

Other phenomena also may contribute to noise in data sets in instead of or in addition to those noted, but regardless of source(s) a high degree of noise in a transition can be problematic.

For example, if a transition is used to determine the contour of a region (e.g. the shape, size, extent, etc. of that region) it is typically necessary or at least useful to distinguish data elements that represent transitions from the rest of the data set. If the noise of a transition is sufficiently large, transitions may not be sufficiently distinct as to be readily identifiable; actual transitions may be overlooked, and spurious transitions may be interpreted as real.

By extension, if a transition is to be taken as part of a region (rather than as a separate feature unto itself), determining whether a transition point is part of a region or not may be difficult or impossible due to noise. That is, if by virtue of noise any given data element along a transition may have a value that could reasonably be interpreted as either a first region or a second region, questions may arise as to whether a transition data element is to be considered part of the first region, or the second region (or a transition region unto itself), as to how such a determination may be made, etc.

In addition, following a transition within a data set may be problematic if the noise along that transition is high. For example, if adjacent data elements along a transition vary greatly then it may be unclear as to which direction the transition follows, or whether the transition continues at all. One way to constrain a process of following transitions is to place a limit on the variation of one element to another along a transition, e.g. under the assumption that a transition feature may be at least approximately continuous. That is, for the example of a depth map of a hand as described above, it may be anticipated that the true physical depth to a hand may vary, but also that the variation will not exhibit large jumps; if one point along the perimeter of the hand is at a depth of 9 cm, a nearby point may be at 8 cm or 10 cm but probably would not be at 30 cm. However, such an approach in itself may cause difficulties for a transition with a high degree of noise, since adjacent data elements may exhibit apparent depths that do vary greatly (e.g. 8 cm to 30 cm) even though the hand that the data set is to represent does not so vary. Limiting consideration to a narrow range (e.g. a data element is considered to be part of a transition only if it varies by 3 cm or less from an adjacent element that is already accepted as a transition element) may result in parts of a real transition being excluded, while allowing for a broad range (e.g. an adjacent data element may be considered part of a transition even if it varies from an adjacent transition element by up to 20 cm) may result in data elements unrelated to the hand being considered to be part of the hand.

Various embodiments enable properties of at least certain data sets to be exploited so as to at least partially overcome problems of noise in transitions within data sets.

Referring again to FIG. 4D, by inspection it may be observed that the noise within the first and second regions 402D and 404D is significantly less—more than an order of magnitude less—than the noise along the transition 406D. Although the difference in noise in FIG. 4D is deliberately large for illustrative purposes, and embodiments are not limited only to such large variations in noise, many data sets do exhibit less noise within regions than along transitions around/between regions. This reduced noise level within regions may be exploited by various embodiments to useful effect.

Briefly, the various embodiments evaluate data sets by relying not on (or at least not exclusively on) a prospective transition to define regions within the data sets, but on a portion of the contents of a prospective region itself that is inset into the region from the transition by some distance. More colloquially, one "moves in a few pixels from the edge" of a feature, and considers the data set at that inward displacement, rather than relying entirely on the much noisier edge itself.

Figure 5:
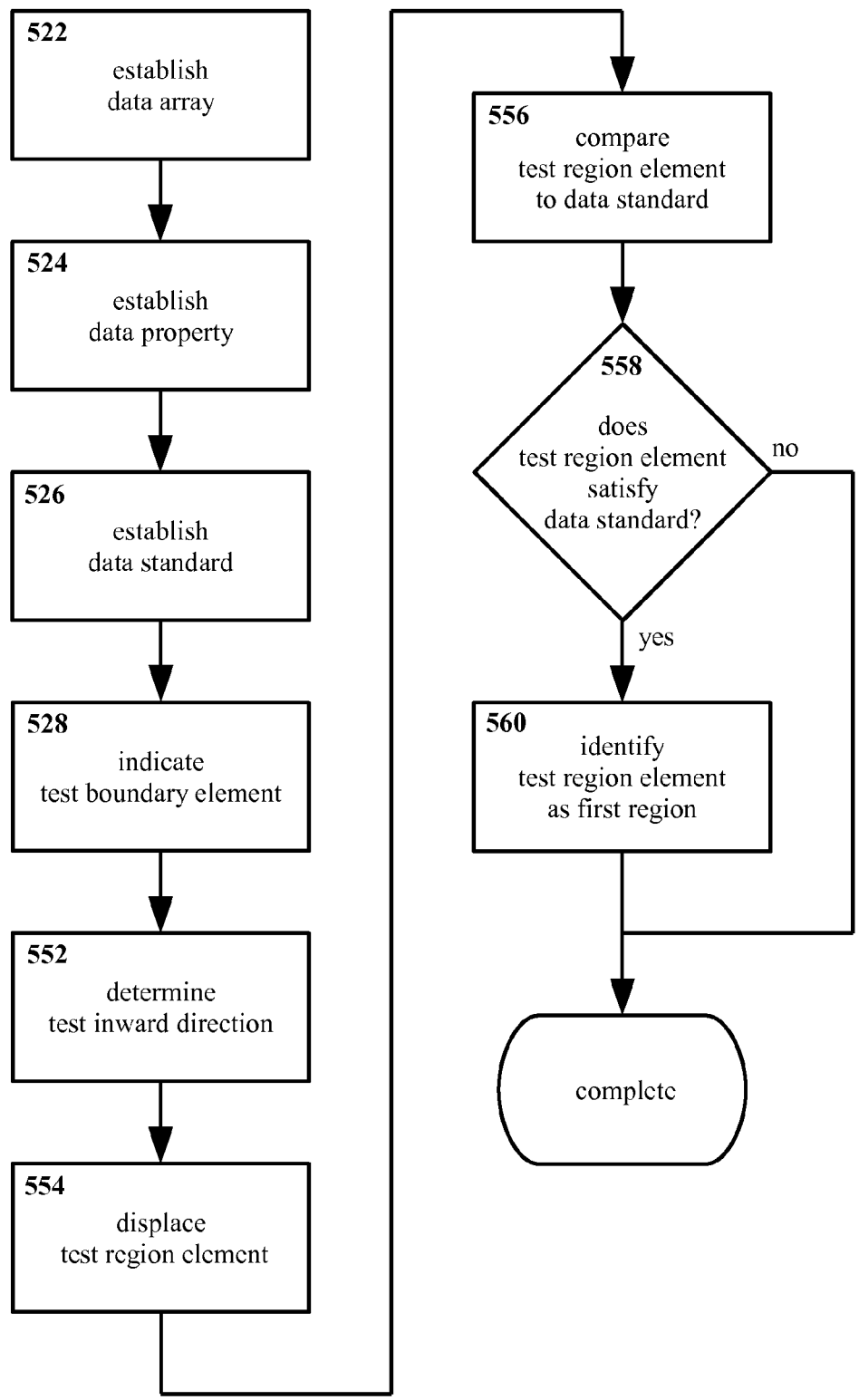
FIG. 5 shows an example method for distinguishing features in a data set, in flow-chart form.

By way of illustrating the above, an example method is shown in FIG. 5.

In the example method of FIG. 5, a data set is established 522.

A data set may be any assemblage of data (the individual components thereof being referred to typically herein as "data elements"). Example data sets shown previously in FIG. 4A through FIG. 4D are two-dimensional rectilinear arrangements of pixels. Such an arrangement may for example correspond with a digital visual image, a depth map, etc. However, other arrangements may be equally suitable for use as data sets, and embodiments are not particularly limited with regard to the size, type, configuration, etc. of data sets that are usable therewith. Notably, data sets may be in arrangements other than rectilinear, such as linear, hexagonal or "honeycomb", etc. In addition, data sets may be other than two dimensional, for example one dimensional, three dimensional, for or more dimensional, etc. Other arrangements also may be equally suitable.

Establishing a data set also is not particularly limited. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a data set may encompass several potential approaches, including but not limited to the following.

Establishing a data set may include generating the data set from some parent entity, including but not limited to a physical object, a virtual object, an augmented object, or some other data object. For example, a data set may be established by sensing a physical object or environment, such as by capturing a digital visual image with a CCD or CMOS sensor, etc.

Establishing a data set also may include creating the data set without regard to a parent entity, e.g. a processor may execute instructions so as to create a data set in some fashion, whether from existing data, user inputs, internal algorithms, etc.

Establishing a data set additionally may include selecting a previously-existing data set, for example by reading a data set from a data store, downloading a data set from a communication link, or otherwise obtaining a data set that already exists in a form as to be usable by certain embodiments.

Embodiments are not particularly limited insofar as how a data set may be established. It is required only that a data set that is functional is in some fashion made available. Other arrangements than those described may be equally suitable. Also, where used with regard to other steps such as establishing a data property, establishing a data standard, etc., establishing should be similarly be interpreted in a broad fashion.

Continuing in FIG. 5, a data property is established 524. A data property is any property by which elements of a data set may vary and/or be distinguished. For example, for a depth map a data property may be depth or distance, for a digital visual image a data property may be brightness, etc. A data set may include two or more data properties, for example a digital visual image may have red, green, and blue brightness channels, each of which may be considered to be properties. Embodiments are not particularly limited with regard to what data property or properties may be utilized.

A data standard is established 526. A data standard is any rule or guideline by which a feature within a data set, such as a region thereof, may be determined. For example, a data standard for a depth map may be "all data elements having a depth between 12 cm and 15 cm". Data standards may be simple or complex, and may include multiple parameters, e.g. "all data elements having a depth between 12 and 15 cm, with at least one adjacent data element also between 12 and 15 cm in depth". Multiple data standards also may be established. A data standard typically is applicable to a data set, but is not necessarily a part of a data set in itself.

A test boundary element is established 528. That is, in some fashion a data element of the data set is proposed, noted, etc. as being a possible boundary of a region within the data set. Embodiments are not particularly limited with regard to how data elements may be established as being possible boundaries; a variety of algorithms, approaches, etc. for finding and/or identifying elements within a data set as being potential and/or definite boundary elements may be suitable. Alternately, test boundary elements already known may be communicated from some source (e.g. as a result of some other method dedicated more particularly to establishing test boundary elements within a data set), read from a data store, etc.

A determination is made 552 as to a test inward direction. That is, a data element having been established 528 as a potential boundary element, the direction from that boundary element into the feature in question is determined. More concretely, for a data element that may represent part of the outline of a hand, on one side of that data element would be the hand, and on the other side would be something else (such as a background, etc.). Assuming for purposes of description that the hand is the feature of interest (as opposed to the background, which may be equally suitable), then the determination 552 is made as to which side of the boundary is hand and which side is not-hand.

It is noted that although FIG. 5 refers only to determining a test inward direction 552, this is an example only. As described in more detail subsequently herein, a test outward direction may be determined in addition or instead, one or more directions in which a boundary (of which the test boundary element may be a part) propagates may be determined in addition or instead, etc.

In addition, it is not required that the test inward direction necessarily must exactly correspond to any particular mathematical and/or geometric definition of "inward" (although the consideration of formal and/or exact definitions also is not excluded). For example, considering a boundary as a well-defined curve, the test inward direction may not necessarily be exactly normal to that curve, the test inward direction may not necessarily be aligned with some geometric center of either the boundary curve or the shape defined thereby, etc. So long as the test inward direction moves into the region in question sufficiently that displacing one or more steps/elements in that direction significantly reduces the noise, the test inward direction may be adequately determined for purposes of the method. As an example, if the "exact" inward direction is directly to the left from some boundary element, depending on the particulars of an embodiment it may be acceptable if the test inward direction is directly to the left but also somewhat upward or downward, e.g. 45 degrees upward or downward from directly left. Although mathematically speaking a 45 degree discrepancy (or more) between an idealized inward direction and the test inward direction determined 552 herein may appear large, so long as the method as describes functions such discrepancies may be acceptable for at least certain embodiments.

As a matter of terminology, it is noted that when segmenting a feature the direction from the boundary into the feature is sometimes referred to as the "dominant direction". This is also referred to herein as "inward"; for distinction between the actual direction and certain approaches for determining the direction in question, matrices and other tools for determining the inward (or outward, or propagation) direction may be referred to as "dominant direction matrices", etc., while the direction itself may be referred to as inward, outward, etc. More regarding this term and its application is described later herein.

Returning to FIG. 5, embodiments are not particularly limited with regard to how the determination 552 is made. Typically, but not necessarily, the determination 552 of the direction corresponding with the interior of a feature (the dominant direction) utilizes an displacement from a test boundary element. That is, one or more data elements that are displaced from the test boundary element by at least one date element are considered when determining a likely dominant direction. Considering a two dimensional digital image as an example, when considering a pixel representing a portion of a boundary, one or more pixels that are displaced by at least one pixel from that boundary pixel typically (though not necessarily) may be evaluated in order to determine the dominant direction. (It is noted that displacement also may be utilized elsewhere in the method, for example in step 554 described below.)

Examples of such determination are presented in some detail later herein, but embodiments are not limited only to the examples shown, nor only to determination utilizing displacements, and other arrangements may be equally suitable.

Still with reference to FIG. 5, a displacement is made 554 from the boundary element in the direction of the interior of the feature. Again to use as an example a hand against a background, in such instance a data element some distance (e.g. one or several pixels) inward into the hand from the outline of the hand is placed under consideration. As noted with regard to FIG. 4D above, noise in data sets frequently is less at some distance away from transitions than at or near to transitions. Thus, by consideration elements of the data set that are some distance inward from the boundary, problems of noise along the boundary may to at least some degree be avoided. The element that is considered after the displacement is referred to herein as the test region element (since this element may be part of a region of interest, and is to be tested and/or otherwise evaluated in that regard).

Embodiments are not particularly limited with regard to the magnitude of the displacement, i.e. how far consideration moves from the boundary. The magnitude of the displacement may vary, and may depend on the particulars of a given embodiment and/or a given data set. For example, for a very large or very finely granular data set (such as a large, high resolution digital image) and/or data sets having a very high degree of noise along the boundary it may be necessary to move several to many elements inward from the boundary, while for other data sets it may be sufficient to move only one or two elements inward.

Continuing in FIG. 5, the value of the property (established in step 524) for the test region element (as reached by the displacement in step 554) is compared 556 against the data standard (as established in step 526).

A determination is made 558 as to whether the property (or properties) of the test region element satisfy the data standard. If the result is positive—if the relevant property of the test region element does satisfy the data standard—then the method continues with step 560 (described below). If the result is negative—if the relevant property of the test region element does not satisfy the data standard—then the method skips step 560.

Moving on in FIG. 5, depending on the results of the determination in step 558 the test region element is identified 560 as belonging to a first region. That is, the data element that was the subject of the determination 558 is now considered to be part of the region or other feature that is to be segmented from the overall data set. (The data element in question may have been suspected as a part of the region even before the determination 558, but this is not required.)

It is noted, however, that other factors than those shown may affect determination of a data element as belonging to the first region, before, after, or concurrent with the steps shown. For example, consider a hand as a first region within a digital depth image. The method shown in FIG. 5 may result in pixels within that depth image being identified as belonging to the hand (i.e. the first region) based on whether those pixels exhibit an appropriate depth for a hand (i.e.

those pixels meet a standard for depth). However, even those pixels so identified as belonging to the hand through the steps shown nevertheless may be excluded from the hand based on other considerations. For example, an object at the proper depth to be a hand may exhibit colors atypical for hands (e.g. lime green), may exhibit shapes atypical for hands (e.g. a rectangular solid such as a book rather than a palm-and-fingers arrangement), etc. Even real hands may be so excluded; if the feature of interest is the hands of a person wearing a head mounted display, then a hand that is in the depth image but that does not conform to expectations for a user's hand—such as by entering the image frame from the top (which may be uncomfortable or impossible, depending on sensor configuration)—also may be excluded.

Thus, although for simplicity the method shown in FIG. 5 indicates a binary "yes or no" determination and identification—elements either are or are not part of the first region—this is an example only. In a strict sense, the identification of data elements as belonging to the first region may be considered provisional, subject to other factors, etc.

Still with regard to FIG. 5, although the method shown therein is illustrated as being complete following step 560 (if the determination is positive, or step 558 if the determination is negative), it is emphasized that the method in FIG. 5 is an example only. Other steps, other functions, etc. may be incorporated into the method, and/or other methods may be executed in combination with various embodiments. In addition, for at least certain embodiments at least some portion of the method may repeat, e.g. in an ongoing loop that continues to follow a transition or other boundary, evaluating multiple test boundary elements in sequence (e.g. so as to trace an overall outline of a region or other feature).

Notably, other responses also may be executed in addition to and/or as part of step 560. For example, similarly to the test region element being identified 560 as belonging to the first region, the test boundary element likewise may be identified as belonging to a boundary, confirmed as being a boundary element, etc. Alternately, the test boundary element may be identified as belonging to the first region as well.

In particular, in certain embodiments it may be useful to temporarily or permanently associate a new value to the test boundary element if identifying the test boundary element as belonging to the first region. For example, a test boundary element may be associated with the property value of the test region element. More colloquially, the value of a displaced pixel that is in the low-noise interior of the region may be associated with the boundary pixel. This may be useful, for example, in further processing of the region; if the boundary of a hand (for example) is to be considered as part of the hand, it may be convenient or advantageous to act as though the boundary had similar property values to the interior of the hand.

Thus, for certain embodiments the property value of each test region element found to satisfy the data standard may be used (temporarily or permanently) as the property value for the test boundary element from which that test region element is displaced. Other arrangements, including but not limited to calculating a synthetic property value for the test boundary element (for example by averaging the original property value of the test boundary element with the property value of the test region element) may be equally suitable.

Still with reference to FIG. 5, it is emphasized that a region may be segmented from a larger data set by comparing to a standard (or otherwise considering) data elements that are displaced inward from the region's boundary. Such a feature in various embodiments may facilitate segmenting even for data sets wherein at least the boundary exhibits a relatively high degree of noise.

Conventional approaches to segmenting data sets with noisy boundaries may include an approach referred to as "flooding". Flooding is an area-based approach that seeks to identify individually all of the data elements that are part of a feature. In flooding, most if not all of the elements in some target portion of a data set (and potentially throughout the entire data set) are evaluated individually, for example compared against some standard, to determine whether those elements are indeed part of the feature that is to be segmented. As a more concrete example, considering a white region within a black-and-white digital visual image, every pixel (or every second pixel, or some similar area-based approach) within the image may be examined to determine whether that pixel is white.

However, flooding may prove computationally intensive. If the data set is large, if the evaluation is complex, if processing power is limited, etc., it may be impractical or at least undesirable to examine all or even a sizeable portion of a data set. In addition, some data sets tend to increase in size exponentially, or at least non-linearly: for example, doubling the resolution of a digital image from 320×240 to 640×480 increases the total number of pixels by a factor of four (from 76,800 pixels to 307,200 pixels, respectively). This is in contrast to boundaries, which frequently grow less quickly; a boundary in a two-dimensional data set typically may be at least approximately linear in form, and thus grows approximately linearly as the data set becomes larger, etc. (This is at least sometimes true for higher-dimensional data sets as well, with boundaries in a three dimensional data set typically being two dimensional and growing as the second power while the full data set grows with the third power, and so forth.)

Another approach to addressing noisy boundaries within data sets is to manipulate and/or filter the data along possible boundaries. For example, data elements that are suspected to represent part of a boundary may be "smoothed" for evaluation through averaging with nearby data elements, truncating property values (e.g. a data element with a value that is "too high" may be limited to some maximum value), etc. Potential boundary elements alternately may be ignored if those elements fall outside of some range, or otherwise do not conform to expected property values.

However, manipulating data in such fashion may distort or limit the usefulness of considering boundaries at all. Real boundary elements may be overlooked, data elements may be incorrectly taken to be boundary elements, etc.

By contrast, various embodiments evaluate data elements that at least substantially follow a boundary within a data set, without necessarily following or evaluating data elements that make up that boundary. Rather than relying on the boundary itself (with the noise associated therewith), embodiments may move inward (and/or, similarly, outward) one or more steps from the boundary and evaluate data elements in the potentially less noisy interior of a the region encompassed by that boundary.

In doing so, various embodiments may facilitate both computational efficiency in evaluating only a relatively small number of data elements to determine the extent of a feature within a data set, and confidence in determining that data elements indeed correspond with the sought-for feature (i.e. property values for data elements satisfy a data standard). Such advantages are noted only as examples, and embodiments may also exhibit other features and/or advantages.

Still with reference to FIG. 5, although FIG. 5 refers only to identifying an individual element as belonging to a first region, this is an example only for purposes of simplicity. If multiple test boundary elements are available, or are made available, then one or more elements may be identified as belonging to the first region relative to each such test boundary point. In such manner, a boundary within a data set may utilized to distinguish some first region in that data set from a second region of the data set. (Alternatively, the "second region" may simply be considered as a "remnant" of the data set, e.g. everything in the data set that is not the first region, or everything that is neither the first region nor the boundary, etc.)

Collectively, if a group of data elements are identified as belonging to a first region as described for example in FIG. 5 (and in variations elsewhere herein), that group of data elements so identified may be collectively referred to as a "trace". As a simple example thereof, considering a boundary defining a hand in a digital image made up of pixels, the trace may represent an outline inset from the boundary of the hand, made up of pixels that have been identified as belonging to the hand.

Figure 29:
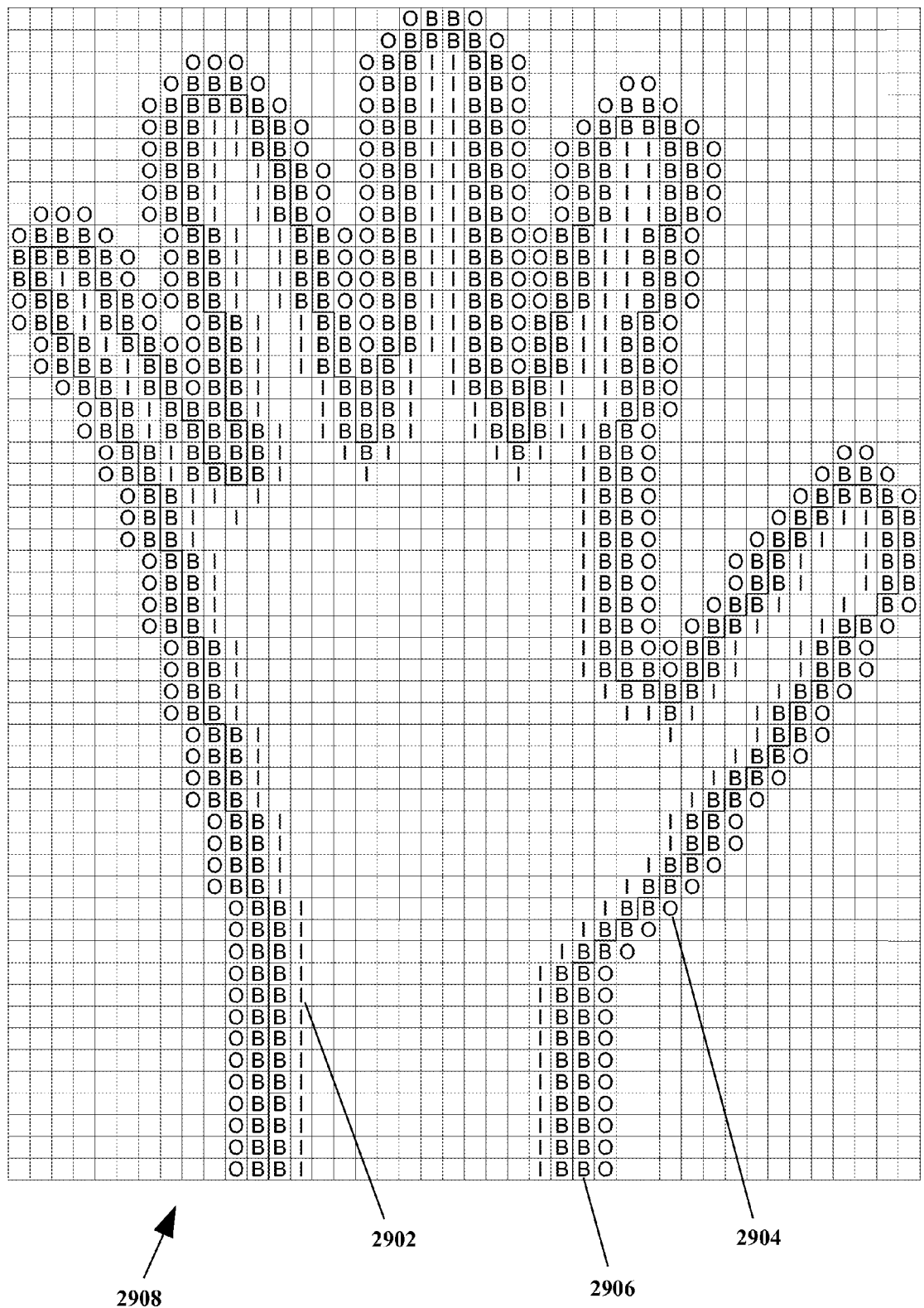
FIG. 29 shows an example of inward and outward traces with respect to a boundary for a data set as ordered into pixels.

Referring now to FIG. 29, an example of inward and outward traces is shown therein. A data set 2908 is shown therein in the form of a pixelated image. A heavier line indicates a sharp outline of a hand, as an example subject of the image 2908. Such a line would not necessarily be visible or present, but is shown for clarity.

As may be seen, a number of pixels are marked B; these pixels collectively represent a boundary 2906 within the image 2908. These elements may for example serve as test boundary elements, for consideration according to various embodiments of method as described herein (or other variations not explicitly described). It is noted that the boundary 2906 as illustrated is generally two pixels wide; this is an example only, however, and boundaries may be more or fewer pixels (or other data elements) in width. Moreover, not all data sets necessarily will lend themselves to boundaries that reasonably may be described as having "width"; embodiments are not limited thereby.

Also in FIG. 29, a number of pixels are marked I; these pixels collectively represent an inward trace 2902. That is, the pixels marked I forming the inward trace 2902 have been identified as belonging to a first region (in the example shown, a hand in an image). As may be seen, the pixels making up the inward trace 2902 are generally displaced by one step (i.e. one pixel, or other data element) from the boundary 2906. The inward trace 2902 as shown also is a single pixel wide, but again such features are examples, and are not limiting with regard to embodiments.

Still with reference to FIG. 29, a number of pixels are marked O; these pixels collectively represent an outward trace 2904. That is, pixels marked O forming the outward trace 2904 have been identified as belonging to a second region (in the example shown, a background in an image). As again may be seen, the pixels making up the outward trace 2904 are generally displaced by one step from the boundary 2906, and the outward trace 2904 as shown is a single pixel wide, but such features are examples, and are not limiting with regard to embodiments.

Although FIG. 29 is presented for illustrative purposes with regard to inward and/or outward traces, embodiments are not limited thereby. For example, certain embodiments may determine and/or consider only an inward trace, or only an outward trace, rather than necessarily both an inward and an outward trace. Traces also may vary in width, steps of displacement from a boundary, degree of continuity, etc., and boundaries likewise may vary in width, degree of continuity, etc. In addition, data sets other than images, and other than two-dimensional rectilinear arrangements, may be equally suitable.

As noted a trace is not limited with regard to width, but typically may be as little as one or a few pixels wide, for an arrangement wherein only one pixel is identified relative to a test boundary point as belonging to the first region. That is, a one-pixel-wide boundary may produce only a one-pixel wide trace, for at least certain embodiments. However, such a one-pixel-wide trace may not necessarily include the entirety of the first region. That is, although all elements in a trace may belong to the first region, not all elements of the first region may be part of the trace. To continue the example above, a portion of an image of a hand inside the inward trace also may be part of the hand.

For at least certain embodiments, it may be suitable to in some fashion utilize the trace and/or the boundary itself to identify other elements of the first region.

One approach may be to simply identify elements that are inward of the trace with respect to the boundary as belonging to the first region (i.e. given that the elements in the trace itself have already been identified as belonging to the first region). In colloquial terms, anything inside the trace may be "filled in" and added to the first region as well. (This likewise may apply to arrangements wherein an outer trace is determined; all points outward from an outward trace with respect to the boundary may be considered as not belonging to the first region, e.g. belonging to a second region, a background, a remnant, etc. Conversely, it may be suitable to consider all points inward from an outward trace as belonging to the first region, or all points outward from an inward trace as not belonging to the first region.) Boundary elements may or may not also be identified as belonging to the first region, as well.

Such an approach, wherein everything "inside" the inward trace for the first region is considered to also be part of the first region, may be particularly suitable for arrangements wherein the trace and/or the boundary fully encloses some portion of the data set. That is, if a trace for a first region of a data set encloses a part of that data set, it may be suitable for at least certain embodiments to identify that part of the data set as also being the region.

Considering data elements inside the inward trace for the first region, and/or the boundary, also may be particularly suitable if the inward trace and/or the boundary are continuous or at least substantially continuous. That is, if there are no gaps between adjacent elements making up the trace, and/or the boundary, then it may be considered particularly reliable to consider everything inside the trace and/or boundary as being part of the first region as well. However, absolute continuity is not necessarily required for such an approach; gaps in the boundary and/or trace may not invalidate such an approach. The exact number, frequency, arrangement, size, etc. of such gaps may vary from one embodiment to another, so long as confidence may be retained that what is inside (or outside) such a substantially continuous boundary and/or trace may be reliably identified as belonging to the first region (or to a background, etc.). For example, given a trace defining a hand in an image that is tens or hundreds of pixels in height and/or width, occasional gaps of one or several pixels within the trace may still be considered "substantially continuous".

In addition, in at least certain instances a boundary or trace may be considered substantially continuous for such purposes even if large gaps may be present within the boundary or trace. To return to the example of a hand, if a hand is extending upward from the bottom of a field of view of an image (e.g. as shown in FIG. 1), then the edge of the field of view may cut across some part of the arm. No transition will necessarily be present within such an image along that cut across the arm, since the image itself ends at the cut. In such instance, the edge of the field of view may be ignored, may be treated as boundary (thus potentially extending the trace along the inside of the cut), etc., or the "gap" represented by the cut across the arm may itself be ignored for purposes of considering continuity.

However, an arrangement wherein elements of a data set are identified as belonging to a first region if a trace and/or boundary encloses those elements and/or is substantially continuous is an example only. Other arrangements may be equally suitable.

One such alternate arrangement may be to search, exclusively or preferentially, within the border and/or the trace in order to identify whether elements therein also are part of the first region (e.g., elements therein satisfy the property standard for the first region). Where in the previous example such elements were assumed to also be part of the first region, in this case the elements may be considered as potentially being part of the first region, but still tested. While this may in some sense resemble "flooding", wherein some or all elements in an area or entirety of a data set are tested in order to find and define some feature or region, at least one important distinction should be made: namely, by considering data elements enclosed by a trace and/or boundary, and/or otherwise inward from an inward trace relative to a boundary, a search is enabled within a well-defined sub-set of data elements with a high probability of belonging to the region of interest. That is, elements surrounded (in whole or in part) by a boundary or trace for a first region may, in at least some embodiments, be particularly good candidates for belonging to that first region as well. As a more concrete example, for a digital pixel image of a hand, if a trace is determined inward into the hand from the boundary between the hand and a remnant of the image, then it may be reasonable to expect that the other pixels within the trace also are part of the hand.

Thus considering the interior of the trace and/or the boundary for a first region may enable targeted searching, as opposed to more generalized flooding. Since regions of interest may be much smaller than the data sets within which they reside, this may facilitate a considerable reduction in processing demands. For example, in an image captured by a head mounted display and considered for gesture control, only a few percent of the image may be "hand", with the rest being "not hand" (a background, remnant, second region, etc.). Thus even if all pixels within an inward hand trace were tested to determine whether those pixels are part of the hand, this may represent only a small fraction of the total pixels in the image.

As noted with regard to step 552 in FIG. 5 embodiments are not particularly limited with regard to how the inward direction or dominant direction may be determined, though in at least some embodiments a displacement from a potential boundary element may be utilized. Now with reference to FIG. 6, an example arrangement for determining the inward direction for a region to be segmented from a data set is shown therein.

As previously referenced in FIG. 4D a three-by-three matrix 412D was shown therein. Now with reference to FIG. 6, similar property matrices 612A through 612H are shown therein with numerical contents equal to the property values shown in the matrix 412D. The property matrices 612A through 612H are presented as an example of a potential boundary element in a data set (similar to that in FIG. 4D) and the eight elements of that data set that are displaced by one element (i.e. one square away from) the aforementioned boundary element. In the example shown, the boundary element has a property value of 20, with the data elements displaced by one step have values of 84, 237, 239, 244, 234, 13, 18, and 12 (beginning at the top center and moving clockwise).

It is noted that the property matrices 612A through 612H are identical to one another. However, although property matrices may be identical, and matrices 612A through 612H are so presented for illustrative purposes, this is not required and other arrangements may be equally suitable.

Also in FIG. 6, eight dominant direction matrices 614A through 614H are shown. Each of the dominant direction matrices 614A through 614H is associated with one possible dominant direction from a potential boundary element. That is, each of the dominant direction matrices 614A through 614H is associated with one direction that may correspond with being "towards the interior" of a region that is to be segmented from a larger data set, and for which the potential boundary element may represent a portion of a boundary thereof.

Each of the dominant direction matrices 614A through 614H is weighted differently, though in similar patterns. For each dominant direction matrix 614A through 614H a single weighting factor of 8 is disposed in one position, with a 4 adjacent thereto left and right (i.e. rotated by 45 degrees), a 2 another step left and right (i.e. rotated 90 degrees), a 1 a third step left and right (i.e. rotated 135 degrees), and a 0 opposite (i.e. rotated 180 degrees). No value is given for the center cell of each three-by-three dominant direction matrices 614A through 614H in this example; as noted the dominant direction in the example of FIG. 6 considers data elements displaced from a potential boundary element, and in this case the potential boundary element itself (which would correspond with the center cell of the dominant direction matrices) is ignored. However, it is not required that potential boundary elements be ignored, and arrangements that consider potential boundary elements may be equally suitable.

Given such an arrangement, the weighting factors in the dominant direction matrices 614A through 614H may be multiplied with the corresponding property values in the property matrices 612A through 612H. For each pair of matrices 612A and 614A through 612H and 614H eight products result, which may be arranged as product matrices 616A through 616H as shown in FIG. 6. The products in each product matrix 616A through 616H then may be summed, producing product sums 618A through 618H.

The arrangement of weighting factors in the dominant direction matrices 614A through 614H tend to produce higher product sums when aligned in the direction of a region with higher property values. Thus, in selecting the largest of the product sums 618A through 618H—in the example shown product sum 618C with a value of 3,522—the direction most likely to correspond with the dominant direction (into the region to be segmented) may be determined. That is, since the dominant direction matrix 614C corresponding with the greatest product sum 618C is oriented to the right—the highest weighting factor, 8, is in a position to the right of center (i.e. in the 3 o'clock position)—the dominant direction is determined as being to the right of the potential boundary element. More colloquially, inward into the region to be segmented (e.g. corresponding to a hand as in earlier examples) is to the right of the boundary at the location under consideration.

Of course, the specific example shown in FIG. 6 assumes that the region to be segmented has generally higher property values than the data set overall. If instead the region to be segmented were anticipated to have lower property values than the data set overall, the same or similar dominant direction matrices 614A through 614H may be used, along with similar determination of product matrices 616A through 616H and product sums 616A through 616H, with the dominant direction then being selected as corresponding with the lowest product sum 616A through 616H (in this case 618G with a value of 1,118).

It is emphasized that, as may be seen from the arrangement shown for FIG. 6, it is not necessary to know which directions are "inward" into a region, "outward" away from a region, "forward" or "backward" along a transition, etc. A range of different directions may be considered, in order to determine which direction represents (or at least may represent) "inward", "outward", etc. For example, in the arrangement of FIG. 6, eight directions distributed at 45 degree increments are considered through the use of weighted matrices, and an "inward" direction determined therefrom. Although foreknowledge of which direction(s) represent inward, outward, forward or backward along a transition, etc. is not excluded, neither is such foreknowledge necessary; through the approaches described herein, one or more such directions may be determined.

Although as described with regard to FIG. 6 determination of such relevant directions—e.g. inward, outward, etc.—is presented as an example approach for choosing a direction of displacement from a transition, such an approach may also have other advantages. For example, if a direction inward into a feature from a transition that defines an outline of that feature is determined, and a direction outward out of that feature from the transition also is determined, then in at least certain instances the direction(s) in which the transition itself extends may be determined. As a simple example, if "inward" is to the left and "outward" is to the right, then it may be inferred that the transition extends upward and/or downward; that is, the boundary may be considered as likely being approximately midway between the inward and outward directions. Considering a pixelated digital image as a more concrete example, if left is inward and right is outward, then moving one or several pixels upward and/or downward may yield potential boundary pixels for further evaluation (e.g. again through weighted matrices, repeating certain operations as described herein). More complex evaluations than aiming midway between the inward and outward directions also may be suitable.

Thus as described, determining an inward and/or an outward direction from a transition may in at least certain instances facilitate following that transition. Other advantages also may follow, in place of or in addition to those already noted herein.

Although FIG. 6 shows one approach for illustrative purposes, it is emphasized that the particular arrangements shown in FIG. 6 are examples only. Even for embodiments that utilize dominant direction matrices similar to those in FIG. 6, arrangements that are more complex, differently configured, etc. may be equally suitable. For example, if the region to be segmented is anticipated to be higher than some minimum but lower than some maximum, two distinct dominant direction matrices may be used for each dominant direction, yielding two sets of products and two sums, which may be considered together so as to identify a region of intermediate property value. In addition, for arrangements with multiple properties (such as three channel values for red, green, and blue in an RGB image) multiple matrices similar to those in FIG. 6 may be employed, e.g. one each for the red, green, and blue property values of each data element, or multiple dimensional matrices may be utilized addressing all three values (for red, green, and blue) at once, or some other approach may be utilized.

Figure 7:
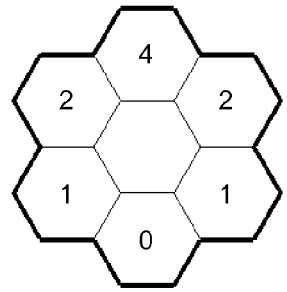
FIG. 7 shows additional example arrangements for determining inward direction with matrices.
Figure 7:
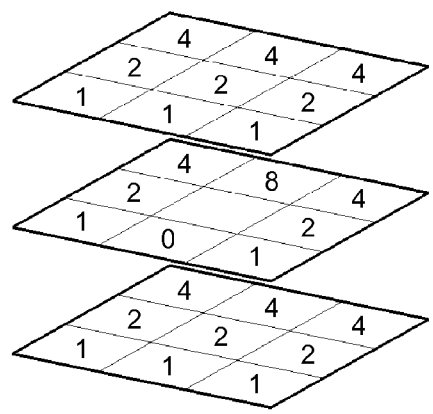

With reference now to FIG. 7, several alternative arrangements of dominant direction matrices 714A through 714F are shown therein.

As may be seen, dominant direction matrix 714A is a five-by-five matrix. Although the weighting values in dominant direction matrix 714A are similar to those in the dominant direction matrices 614A through 614H in FIG. 6, in dominant direction matrix 714A the weighting values are displaced by two elements from a central element (such as a potential boundary element). Such an arrangement may for example be useful if a noisy boundary is more than one data element wide, since the data elements considered for determining the dominant direction then would be displaced by two elements from a potential boundary element instead of only being displaced by one.

Dominant direction matrix 714B also is a five-by-five matrix, though with weighting values at both one-element and two-element displacements. Dominant direction matrix 714C is a five-by-five matrix with all weighting factors displaced by two elements, but with all such two-step displaced locations having a weighting factor (as compared with dominant direction matrix 714A which has several empty spaces at a two-step displacement). Dominant direction matrix 714D resembles dominant direction matrix 714C but with different weighting factors.

Dominant direction matrix 714E is a three-by-three matrix as in FIG. 6 but with weighting factors in only four positions. Such an arrangement may consider only four possible dominant directions, rather than eight as in the dominant direction matrices shown and described with regard to FIG. 6. (For such an arrangement as with dominant direction matrix 714E, only four rather than eight dominant direction matrices may be established.)

Dominant direction matrix 714F is hexagonal rather than square; as has been noted embodiments are not limited only to rectilinear data sets, and dominant direction matrix 714F may be useful with a data set having a hexagonal arrangement. Dominant direction matrix 714G by contrast is rectilinear but is three dimensional, a three-by-three-by-three cubic matrix. Such an arrangement may be useful with a three dimensional data set.

The arrangements shown in FIG. 7 are examples only. Other arrangements of dominant direction matrices than those shown, other variations on weighting factors, etc. may be equally suitable. Furthermore, other computations and/or evaluations than the product-and-sum arrangement (as shown in FIG. 6) also may be equally suitable. In addition, although the use of dominant direction matrices in determining a dominant direction is itself an example only; embodiments are not limited only thereto, and other arrangements may be equally suitable.

Figure 8:
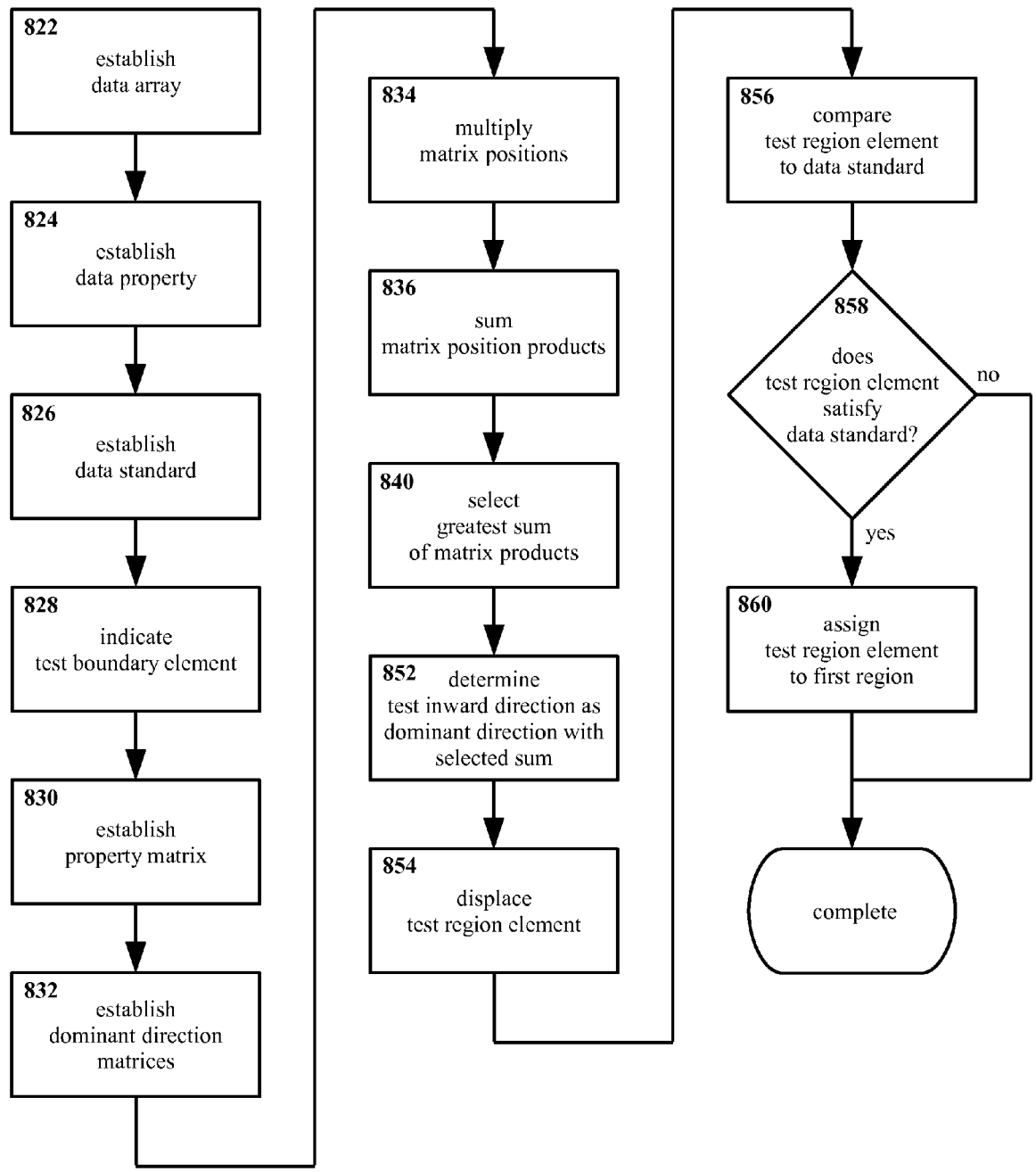
FIG. 8 shows an example method for distinguishing features in a data set incorporating matrices to determine inward direction, in flow-chart form.

Turning to FIG. 8, therein is shown an example method, including steps for identifying an inward direction through the use of dominant direction matrices.

In the example method of FIG. 8, a data set is established 822. A data property is also established 824, and a data standard is established 826. Data sets, data properties, data standards, and the establishment thereof have been previously described herein.

A test boundary element is established 828. Test boundary elements and indication thereof have been previously described herein.

A property matrix is established 830. Typically though not necessarily a property matrix corresponds with a portion of a data set substantially centered on a test boundary element in a regular arrangement (e.g. a three-by-three matrix), including values of the relevant data property defined in step 824 for elements surrounding the test boundary element out to a displacement distance of at least one element. It is not necessary that property matrices, where used, must always and/or exactly be centered on a test boundary element. A degree of variation may be permissible, so long as the variation is not so great as to unduly interfere with the useful functioning of the method as described herein. For example, a property matrix might be displaced by one or even several pixels from a test boundary element, whether by accident or intent, while the method nevertheless may function as described. Property matrices along similar lines have been shown and described previously herein with regard to FIG. 6 (though embodiments are not limited only to such property matrices).

Dominant direction matrices are established 832. Dominant direction matrices typically though not necessarily are matrices corresponding in configuration to the property matrix, with weighting factors or other information so as to enable a comparison of two or more potential dominant directions and the selection of a single dominant direction therefrom. Example dominant direction matrices have been shown and described previously herein with regard to FIG. 6.

Matrix positions are multiplied 834. That is, in this example each weighting factor in each dominant direction matrix is multiplied with the data property value in the corresponding property matrix, producing a product array. Similar actions have been shown and described previously herein with regard to FIG. 6.

Matrix position products are summed 836. That is, in this example the products of each weight factor and each corresponding data property value are added together to produce a single numerical value. Similar actions again have been shown and described previously herein with regard to FIG. 6.

The greatest of the numerical values is selected 840 from among the sums of the matrix products determined in step 836. Similar actions again have been shown and described previously herein with regard to FIG. 6. As noted with regard to FIG. 6 this assumes that the region to be segmented from a data set is anticipated to have a higher data property value than the data set as a whole, though other arrangements may be equally suitable.

Based on the selection in step 840, a likely inward direction (dominant direction) is determined 852, that direction corresponding with the dominant direction matrix for which the resulting product sum is greatest (as determined in step 836). That is, in this example the direction from boundary to interior is determined 852 based on the product sums as determined in step 836.

Continuing in FIG. 8, a displacement is made 854 from the boundary element under consideration, in the direction of the interior of the feature. Displacement in this fashion has been described previously herein, e.g. with regard to FIG. 5.

The value of the property (established in step 824) for the test region element (as reached by the displacement in step 854) is compared 856 against the data standard (as established in step 826). A determination is made 858 as to whether the property (or properties) of the test region element satisfy the data standard. If the result is positive—if the relevant property of the test region element does satisfy the data standard—then the method continues with step 860 (described below). If the result is negative—if the relevant property of the test region element does not satisfy the data standard—then the method skips step 860.

Depending on the results of the determination in step 858 the test region element may be identified 860 as belonging to a first region. Following step 860, the method in the example of FIG. 8 is complete.

At this point it may be useful to emphasize potential advantages of at least certain embodiments, in light of (but not limited to the arrangement of) FIG. 8.

As may be seen from the example arrangement of FIG. 8, various embodiments may facilitate determination of a direction toward the interior of a feature (the "dominant direction") that is to be segmented from a data set. The feature is determined not necessarily or exclusively by testing and/or following an outline of the feature (e.g. a transition within the data), nor by testing an entire area of elements to determine the extent of the feature (e.g. "flooding"), but rather may determine the extent, shape, configuration, etc. of a feature by determining what may be considered an "inset outline", i.e. by tracing the feature near to but displaced inward by some distance from a transition that defines the feature. The transition region, while frequently noisier than the feature's interior, may then if desired be identified as belonging to the feature, for example through some mechanic such as treating transition elements as though having the property values of (for example) elements displaced one or more steps inward therefrom, or expanding the region one or more steps outward from the clearly-identifiable inset elements, etc.

In sum, various embodiments may facilitate advantages (e.g. less testing than by "flooding") of tracing an outline that is linear, or that may be at least approximately linear (e.g. being more than one element wide but still representing significantly less area than the data set as a whole), while avoiding disadvantages of tracing the outline proper (e.g. high noise at a transition in the data set). Considering a visual data set as an example, a contour of a feature (such as a hand) may be followed along the interior of the feature, without necessarily evaluating the (potentially noisy) outline of the feature. Data loss and/or other issues associated with smoothing transitions likewise may be avoided by various embodiments.

In addition, in determining an "inward" direction into a feature to be segmented, various embodiments also may indicate by default or at least suggest an "outward" direction away from the feature, and thus likewise a direction or directions in which the transition defining the feature may propagate. That is, determining which way is "in" may indicate which way is "out" (e.g. the opposite direction), and which way the transition proceeds (e.g. a direction between "in" and "out"). Outward direction, transition propagation direction(s), etc. also may be determined explicitly in various embodiments, for example through the use of different dominant direction matrices (though such matrices may be referred to with the directions to be determined, e.g. "transition direction matrices", "outward matrices", etc. to differentiate from matrices used to determine the actual dominant direction.)

It is emphasized that these are not necessarily the only advantages of various embodiments, nor are such advantages limited only to arrangements similar to those shown and described with respect to FIG. 8.

Although the description thus far has referred mainly to examples wherein a clear determination may be made as to a single direction that represents the interior of a feature, in practice such determinations may not always be clear, nor is it required that such determinations will necessarily be clear. (More regarding potential usefulness of outcomes that do not clearly indicate a single inward direction is said later herein.)

FIG. 9A and FIG. 9B, FIG. 10A and FIG. 10B, and FIG. 11A and FIG. 11B respectively show example arrangements for determining an inward direction for a feature in a data set using dominant direction matrices similar to the arrangement in FIG. 8, wherein an initial determination is not assumed to provide a clear indication of the inward direction. Broadly speaking, although the arrangement in FIG. 8 shows only a single such determination of inward direction, embodiments are not limited only to a single determination; repetition of the determination, modification of the determination, expansion of the determination, additional determinations, etc. may be equally suitable. Likewise, although the arrangements in FIG. 9A and FIG. 9B, FIG. 10A and FIG. 10B, and FIG. 11A and FIG. 11B utilize dominant direction matrices as in FIG. 8, embodiments are not limited only thereto.

Figure 9A:
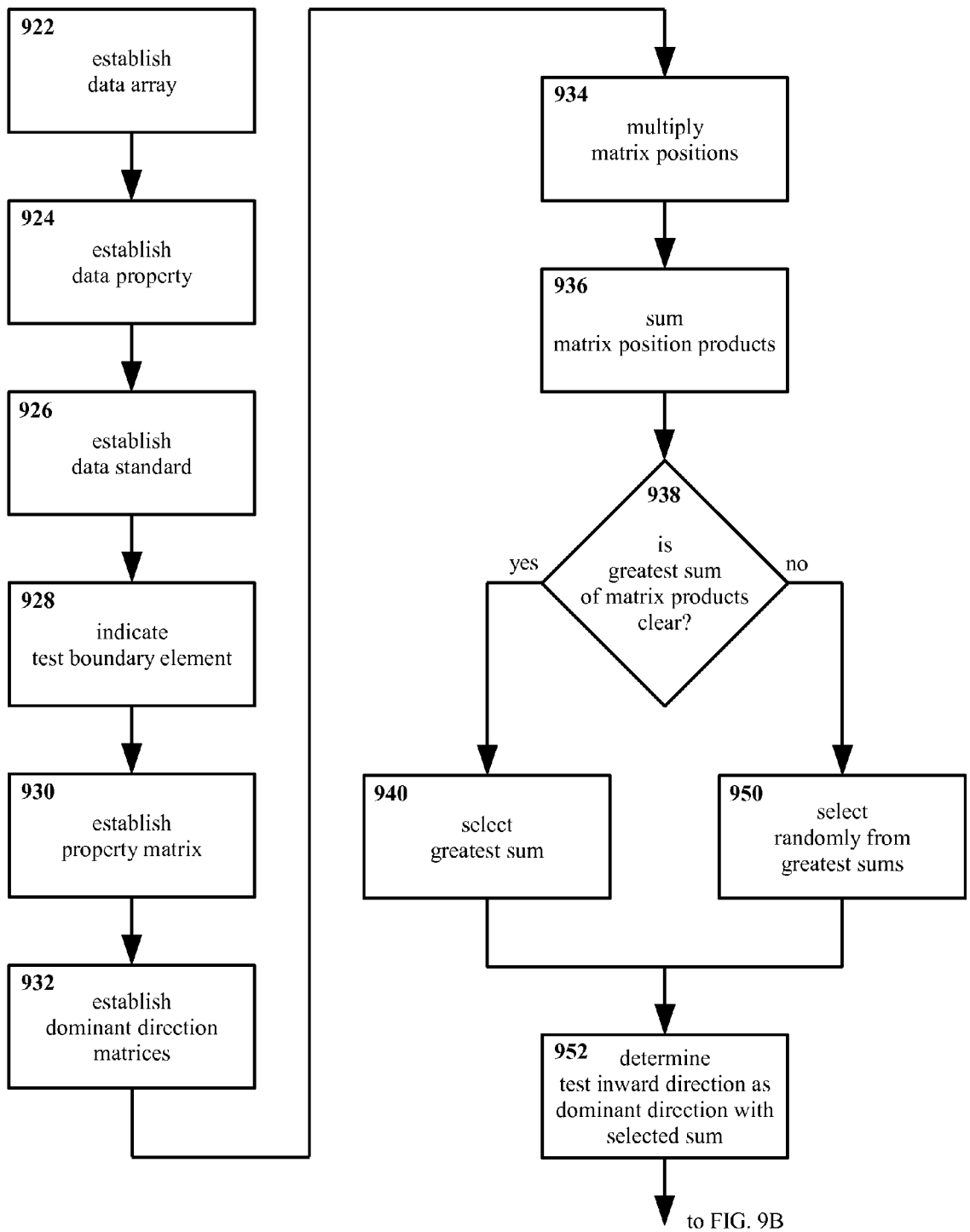
FIG. 9A and FIG. 9B show an example method for distinguishing features in a data set, with provision for unclear determination of inward direction, in flow-chart form.

With reference now to FIG. 9A, a data set is established 922. A data property is also established 924, and a data standard is established 926. Data sets, data properties, data standards, and the establishment thereof have been previously described herein.

A test boundary element is established 928. Test boundary elements and indication thereof have been previously described herein. A property matrix also is established 930, and dominant direction matrices are established 932. Matrix positions are multiplied 934, and matrix position products are summed 936. Similar steps have been described previously herein with regard to FIG. 8.

Still with reference to FIG. 9A, a determination is made 938 as to whether the greatest sum of the matrix products (summed in step 936) is clear. That is, is one product of matrix sums (i.e. for one dominant direction matrix) clearly larger than all other such products? The manner by which the determination 938 is made is not particularly limited. In some embodiments any degree of numerical superiority may be considered sufficient, for example if one sum is 2,116 and another sum is 2,115 the larger sum may be considered to be clearly greater. However, in other embodiments some minimum difference may be required to consider one sum to be clearly greater than another, e.g. a difference of 10, of 100, of 2% of the larger value, etc. Likewise, other requirements may be imposed, e.g. the greatest sum must be at least 2,000 in order to be conclusively identified as greatest, etc. Other arrangements also may be suitable.

Regardless of the precise manner of the determination 938, instances may arise when the determination 938 does not indicate one matrix product sum as being clearly greater. Such instances may also be considered as examples wherein two or more matrix product sums exhibit substantially equal maxima. That is, two or more matrix product sums may be exactly equal, but also may be equal to within some range, such as a range corresponding with a real, estimated, or anticipated noise and/or natural variation. Thus if the noise (or other variation) were anticipated to be +/−5, two matrix product sums may be considered substantially similar if a difference therebetween is 5 or less (half the noise range), 10 or less (the full noise range), 20 or less (twice the noise range), etc., depending on the embodiment. Such variation also may be expressed in percentages, or in other manners, without limitation.

If the determination 938 is positive—if a greatest sum of matrix products is clear—then the method continues with selecting the greatest sum 940.

If the determination 938 is negative—if a greatest sum of matrix products is not clear—then the method continues instead with selecting randomly 950 from among the candidates for the greatest sum. For example, if two sums are equal (or two sums exceed all others by some minimum but one does not exceed the other by at least 10, or 100, or 2%, etc.), then one of the two sums is selected based on chance rather than seeking a distinguishing merit of one some over the other.

Continuing in FIG. 9A, whether step 940 or step 950 is executed the method proceeds with determining a likely inward direction (dominant direction) 952, that direction corresponding with either the dominant direction matrix for which the resulting product sum is greatest as selected in step 940 or with the random selection as made in step 950.

Figure 9B:
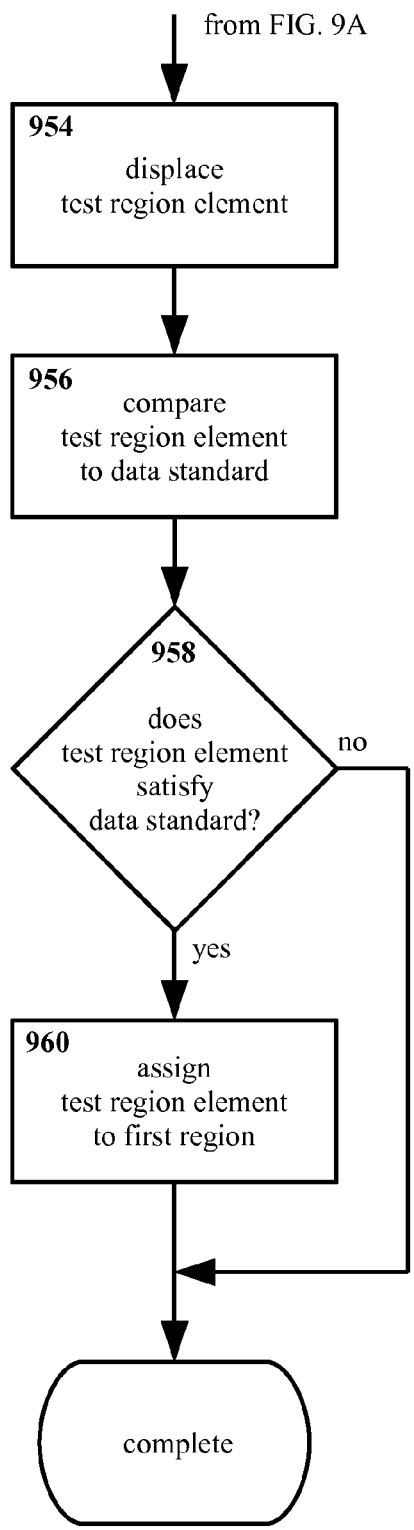

Moving now to FIG. 9B, a displacement is made 954 from the boundary element under consideration, in the direction of the interior of the feature. The value of the property for the test region element is compared 956 against the data standard. A determination is made 958 as to whether the property of the test region element satisfies the data standard. If the result of this determination 958 is positive—if the relevant property of the test region element does satisfy the data standard—then the method continues with step 960 (described below). If the result is negative—if the relevant property of the test region element does not satisfy the data standard—then the method skips step 960.

Depending on the results of the determination in step 958 the test region element may be identified 960 as belonging to a first region. Following step 960, the method in the example of FIG. 9A and FIG. 9B is complete.

As described, the arrangement of FIG. 9A and FIG. 9B provides one example of an arrangement for addressing instances wherein an inward direction (or more generally, whether a data element displacement some distance from a potential transition element represents the interior of a feature) may not be immediately clear. Now with reference to FIG. 10A, another example is shown.

Figure 10A:
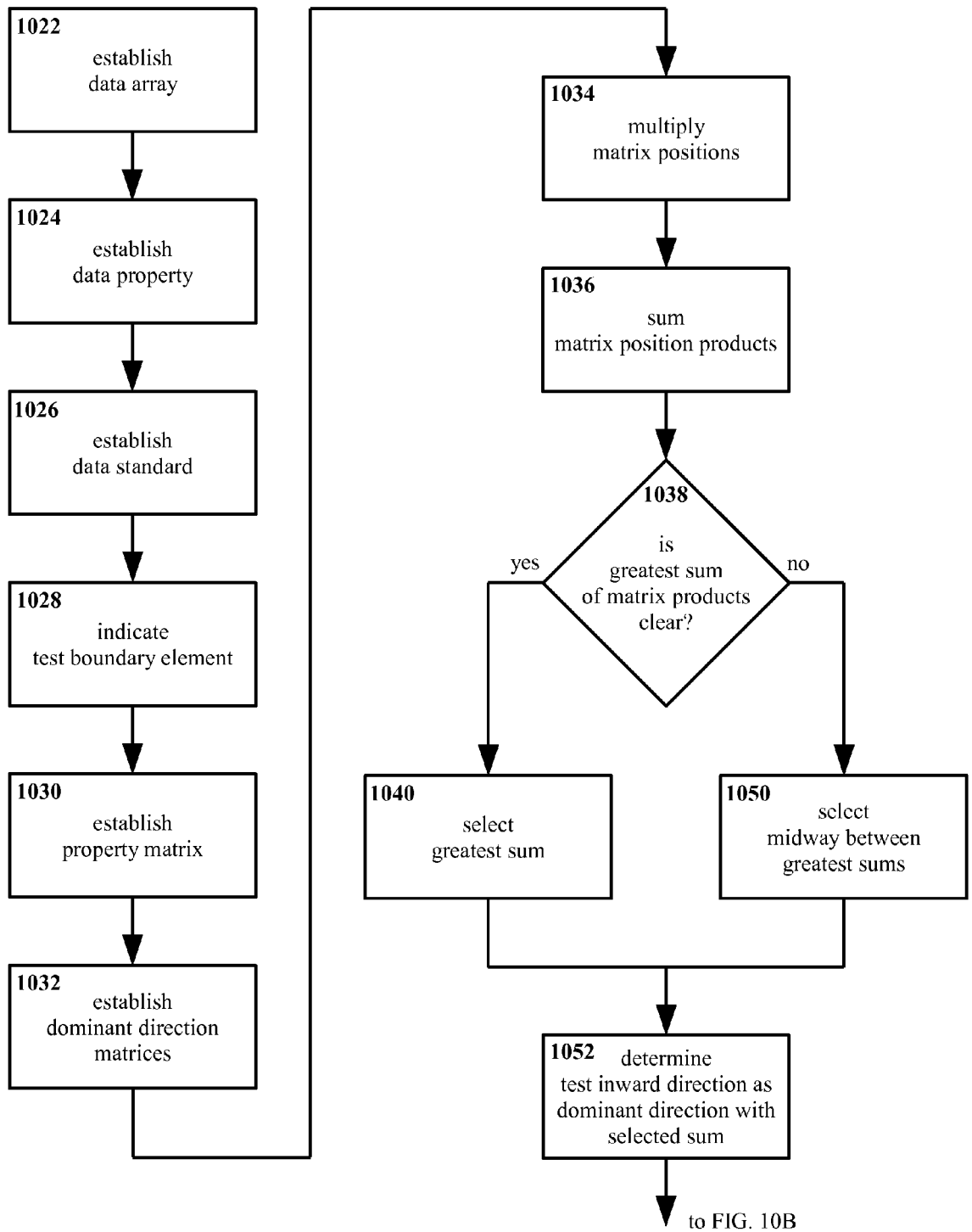
FIG. 10A and FIG. 10B show another example method for distinguishing features in a data set, with provision for unclear determination of inward direction, in flow-chart form.

In FIG. 10A, a data set is established 1022. A data property is also established 1024, and a data standard is established 1026. A test boundary element is established 1028. A property matrix also is established 1030, and dominant direction matrices are established 1032. Matrix positions are multiplied 1034, and matrix position products are summed 1036.

Still with reference to FIG. 10A, a determination is made 1038 as to whether the greatest sum of the matrix products is clear. If the determination 1038 is positive—if a greatest sum of matrix products is clear—then the method continues with selecting the greatest sum 1040.

If the determination 1038 is negative—if a greatest sum of matrix products is not clear—then the method continues instead with selecting a sum 1050 that is at least substantially midway between the candidates for greatest sum (e.g. averaging between/among greatest sums). For example, if two sums are equal (or two sums exceed all others by some minimum but one does not exceed the other by at least 10, or 100, or 2%, etc.), one sum corresponding with a heading of 315 degrees and another sum with a heading of 225 degrees, a sum corresponding with a heading of 270 degrees may be selected.

It is emphasized that it may not be necessary to select a sum 1050 that is exactly midway between candidates. If, for example, two candidates were to represent 0 degrees and 135 degrees (a situation different from that shown with regard to FIG. 10), where the available directions between are 45 degrees and 90 degrees, then there would be no sum or direction exactly midway between the two candidates. Even if a sum or direction exactly between two candidates is available, it is not necessarily required to select the sum or direction exactly between those two candidates. Some variation in direction may be permissible without interfering with the function of the method as described.

Figure 10B:
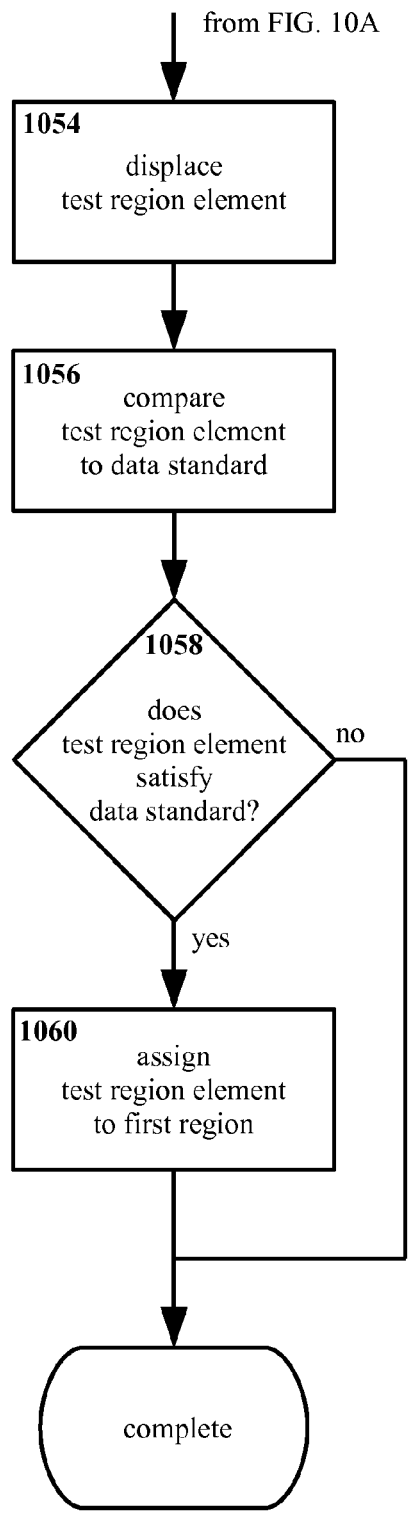

While the example in FIG. 10A and FIG. 10B uses a simple averaging or midway selection, other computational approaches may be utilized, and embodiments are not particularly limited with regard thereto.

Continuing in FIG. 10A, whether step 1040 or step 1050 is executed the method proceeds with determining a likely inward direction (dominant direction) 1052, that direction corresponding with either the dominant direction matrix for which the resulting product sum is greatest as selected in step 1040 or with the computational selection as made in step 1050.

Moving now to FIG. 10B, a displacement is made 1054 from the boundary element under consideration, in the direction of the interior of the feature. The value of the property for the test region element is compared 1056 against the data standard. A determination is made 1058 as to whether the property of the test region element satisfies the data standard. If the result of this determination 1058 is positive—if the relevant property of the test region element does satisfy the data standard—then the method continues with step 1060 (described below). If the result is negative—if the relevant property of the test region element does not satisfy the data standard—then the method skips step 1060.

Depending on the results of the determination in step 1058 the test region element may be identified 1060 as belonging to a first region. Following step 1060, the method in the example of FIG. 10A and FIG. 10B is complete.

Figure 11A:
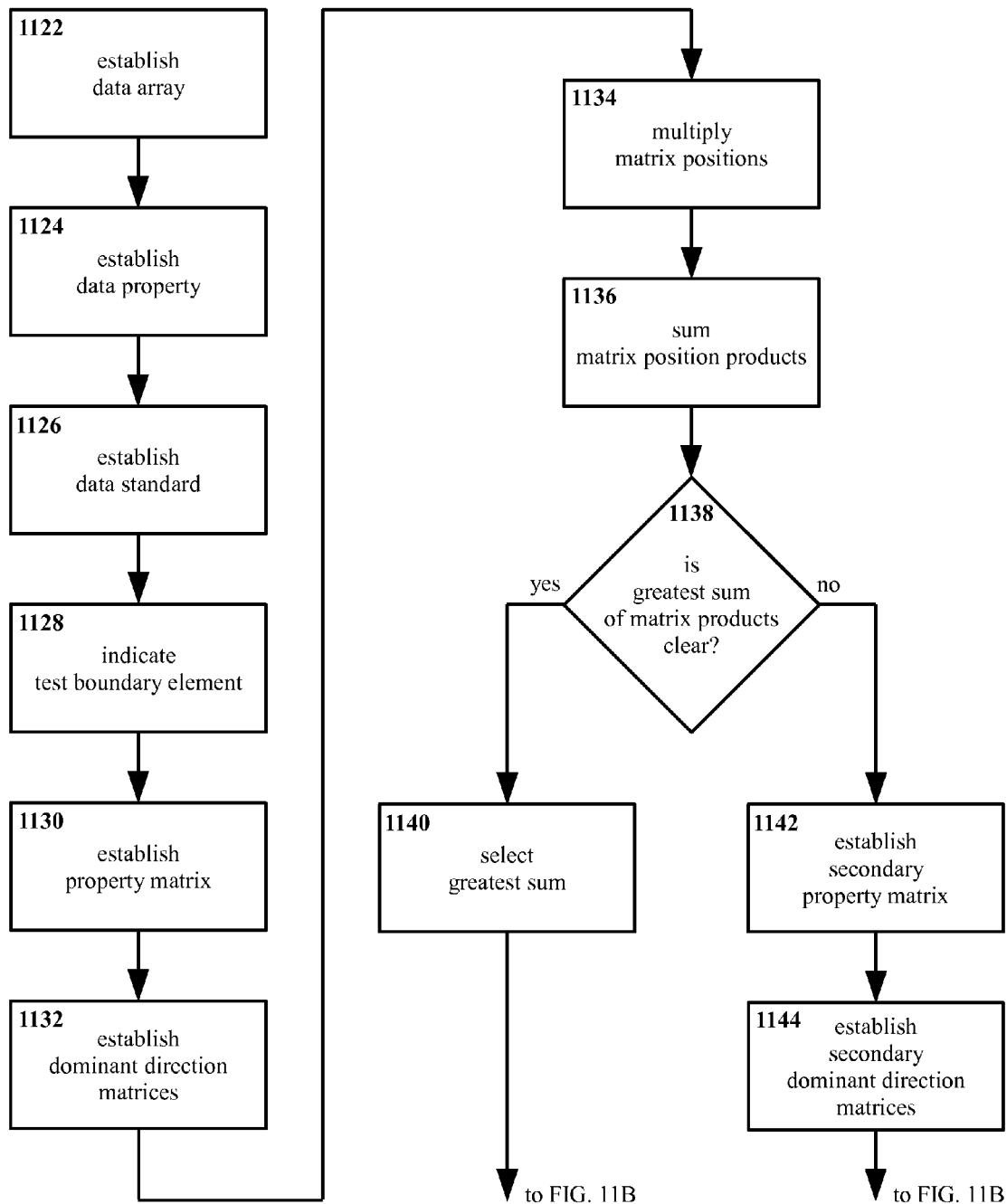
FIG. 11A and FIG. 11B show another example method for distinguishing features in a data set, with provision for unclear determination of inward direction, in flow-chart form.

Now with reference to FIG. 11A, a data set is established 1122. A data property is also established 1124, and a data standard is established 1126. A test boundary element is established 1128. A property matrix also is established 1130, and dominant direction matrices are established 1132. Matrix positions are multiplied 1134, and matrix position products are summed 1136.

A determination is made 1138 as to whether the greatest sum of the matrix products is clear. If the determination 1138 is positive—if a greatest sum of matrix products is clear—then the method continues with selecting the greatest sum 1140.

If the determination 1138 is negative—if a greatest sum of matrix products is not clear—then the method continues instead with establishing a secondary property matrix 1142. A secondary property matrix may resemble the property matrix established in step 1130, and/or may be established in similar fashion. However, typically the secondary property matrix is larger than the property matrix, arranged differently, or otherwise differs so as to facilitate a "second opinion" regarding the dominant direction. For example, the secondary property matrix may extend across a larger portion of the data set, e.g. the secondary property matrix may be a five-by-five element matrix where the property matrix is a three-by-three matrix. In extending further from a potential boundary element, such a larger matrix may be more likely to reach into the low-noise interior of a region (assuming such a region is present). Typically, though not necessarily, a secondary property matrix trades off a feature such as greater computational demands against higher reliability in determining the dominant direction. To continue the example above, a five-by-five matrix includes twenty-five elements, where a three-by-three matrix includes nine; the greater quantity of data under consideration for a five-by-five matrix may represent a greater computational effort than for a three-by-three matrix.

Continuing in FIG. 11A, secondary dominant direction matrices are established 1144. Secondary dominant direction matrices typically though not necessarily are matrices corresponding in configuration to the property matrix. As with the dominant direction matrices established in step 1132, secondary dominant direction matrices may include weighting factors or other information so as to enable a comparison of two or more potential dominant directions and the selection of a single dominant direction therefrom.

Figure 11B:
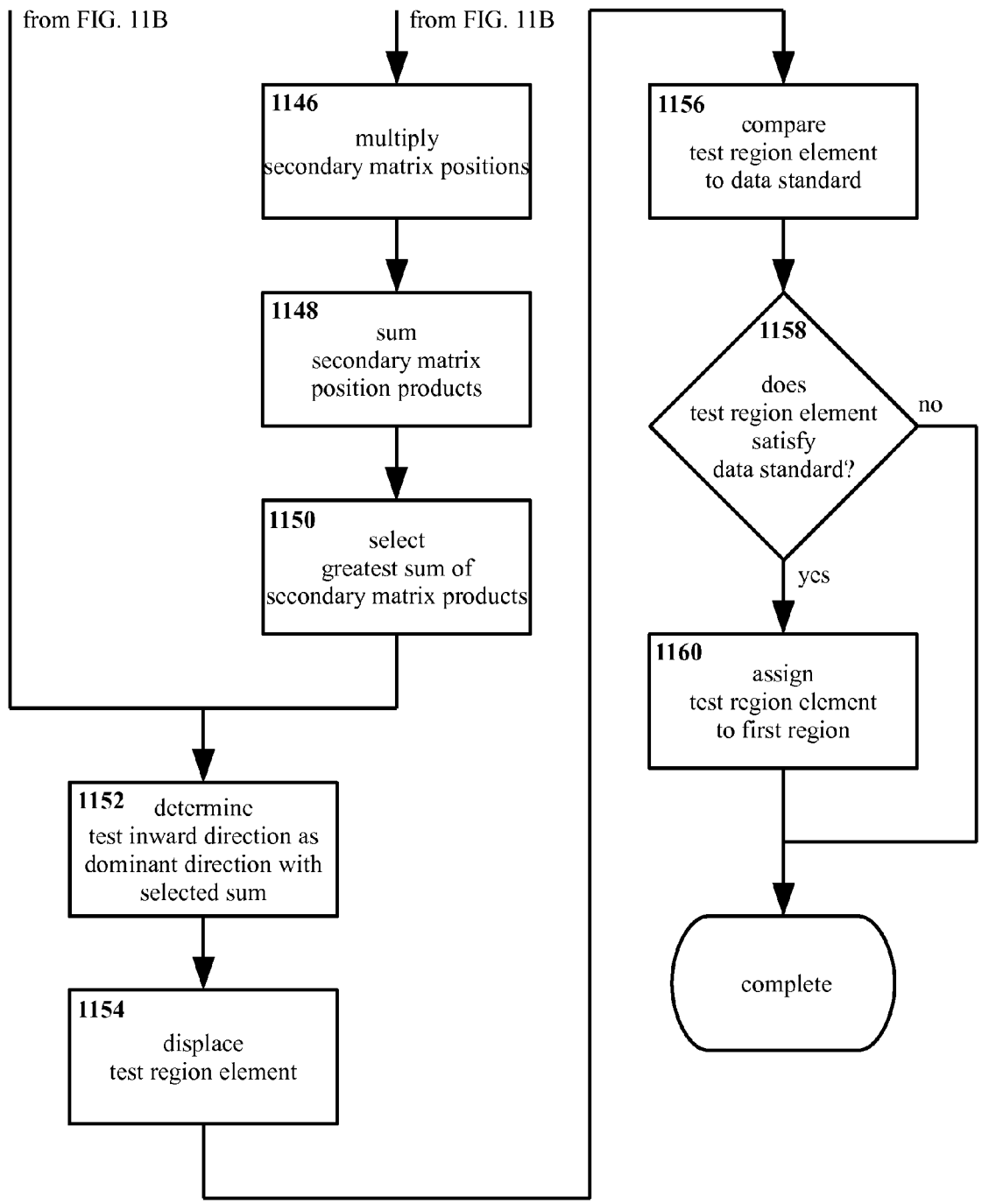

Moving now to FIG. 11B, secondary matrix positions are multiplied 1146. As with the multiplication of property matrices in step 1138, in this example each weighting factor in each secondary dominant direction matrix is multiplied with the data property value in the corresponding secondary property matrix, producing a secondary product array.

Secondary matrix position products are summed 1148. In this example the products of each weight factor and each corresponding data property value are added together to produce a single numerical value.

Moving on in FIG. 11A, the greatest of the numerical values is selected 1150 from among the sums of the secondary matrix products determined in step 1148. (This assumes that one sum is clearly discernible as greater than the others. If this is not true, yet another series of steps with a tertiary property matrix, tertiary dominant direction matrices, etc. may be executed. Embodiments are not particularly limited with regard to the number of potential iterations that may be carried out.)

Continuing in FIG. 11A, whether step 1140 or steps 1142 through 1150 are executed the method proceeds with determining a likely inward direction (dominant direction) 1052, that direction corresponding with either the dominant direction matrix determined in step 1140 or after iteration in step 1150.

A displacement is made 1154 from the boundary element under consideration, in the direction of the interior of the feature. The value of the property for the test region element is compared 1156 against the data standard. A determination is made 1158 as to whether the property of the test region element satisfies the data standard. If the result of this determination 1158 is positive—if the relevant property of the test region element does satisfy the data standard—then the method continues with step 1160 (described below). If the result is negative—if the relevant property of the test region element does not satisfy the data standard—then the method skips step 1160.

Depending on the results of the determination in step 1158 the test region element may be identified 1160 as belonging to a first region. Following step 1160, the method in the example of FIG. 11A and FIG. 11B is complete.

Briefly, the three examples provided in FIG. 9A and FIG. 9B, FIG. 10A and FIG. 10B, and FIG. 11A and FIG. 11B may be seen as addressing a situation wherein a dominant direction may not be clear through three broad approaches, i.e. random selection, computation, and iteration, respectively. Although any or all such approaches may be suitable for certain embodiments, embodiments are not limited only to such approaches, nor to the specific examples present in FIG. 9A through FIG. 11B, and other arrangements may be equally suitable.

However, although examples are provided in FIG. 9A through FIG. 11B for addressing inconclusive determinations of dominant direction, as has been noted previously an ambiguous dominant direction and/or inconclusive determination of dominant direction may in itself be useful for certain embodiments, and may be utilized thereby.

For example, it may be possible for data sets to exhibit data elements or arrangements of data elements that may in some fashion resemble a transition surrounding a feature that is to be segmented from the data set, when in fact the data elements in question do not represent such a transition. More colloquially, "false positives" may be present in data sets. Thus, if a clear determination of a dominant direction cannot be made, this may be interpreted as an indication that the element under consideration may not in fact be a transition element, and/or that the feature being sought may not in fact be present (or may not be bounded by the data element under consideration).

Referring now to FIG. 12A, another data set 1208A is shown, including an example depiction of noise within the data set 1208A. In the example of FIG. 12A the seven right-most columns of elements in the data set 408D exhibit a property with a value ranging 12 through 18 inclusive; these columns are identified collectively in FIG. 12A as the first region 1202A. The seven left-most columns of elements in the data set 1208A also exhibit a property with a value ranging from 12 through 18 inclusive; these columns are identified collectively in FIG. 4D as the second region 1204A. The cells of the center column between the first and second regions 1202A and 1204A exhibit a property ranging from 20 through 238. (A three-by-three matrix 1212A of data elements is also shown for reference and comparison with FIG. 4A through FIG. 4B.)

In the data sets shown previously in FIG. 4A through FIG. 4D, two distinct regions of with visibly different property values were separated by a transition. In the examples shown therein, the numerical property values on the left were low, while those on the right were high. As has been noted, this may represent an arrangement wherein a discernible feature exists within the data set, bordered by the transition, such as a hand displayed against a background in a visual digital image. By contrast, although the arrangement of FIG. 12A may in some ways similar at least one notable difference is exhibited, namely, the numerical property values in the first and second regions 1202A and 1204A are so similar as to not be readily distinguished (and indeed in the example shown exhibit identical numerical distribution, for purposes of example). What are identified in FIG. 12A as the first and second regions 1202A and 1204A may in fact represent the same feature (or part of the same background). To continue the example above, both the first and second regions 1202A and 1204B may be part of the same hand (or the same background); in such instance the column identified as transition 1206A may not in fact represent a true transition at all.

Similarly, FIG. 12B shows an arrangement of a data set 1208B with first and second regions 1202B and 1204B and a potential transition 1206B therebetween. (Again, a three-by-three matrix 1212B of data elements is shown for reference.)

A variety of factors may contribute to "spurious" data features that are not transitions but that may bear some resemblance thereto, and that may be mistaken for transitions. The particulars of sensors, algorithms, optics, etc. may produce artifacts, and power surges or other incidental factors likewise may affect data. Imaging errors, for example, may manifest in the form of lines (e.g. due to a fault affecting a vertical or horizontal line of pixels in an digital image), circles (e.g. "halos" resulting from optical effects such as lens flare), various irregular shapes, etc. Even random chance may from time to time produce the appearance of a transition where none exists.

In addition, data sets may include information that is accurate, but still at least potentially misleading, such as information that resembles a sought-for transition, but that in fact is not the sought-for transition. To continue the example above of a digital visual image of a hand against a background, a ring worn on a finger or a bracelet worn on the wrist may (when imaged) yield data that appears similar to the outline of the hand. That is, a real phenomenon (the jewelry) may have the appearance of the transition being sought (the hand's outline). Such phenomena may be considered as "false transitions". If in such instance the region of the hand were to be segmented from the image, and a ring were read as part of the hand's outline, then the finger on which that ring is worn may be ignored as part of the hand.

Other features than jewelry, including but not limited to deep creases or other natural features of a hand, tattoos, scars, dirt or other contamination, contrasting shadows, etc. may similarly be rendered in a data set as spurious transitions. Likewise, other sorts of data sets than digital visual images also may exhibit such false transitions.

Given such arrangement, wherein both sides of a spurious transition have similar data properties, it may be expected that an approach for determining what direction corresponds with the interior of a feature may be indeterminate. That is, if both sides of a "transition" are part of a hand, then a clear determination of which direction is "into the hand" may not be possible since in such case multiple directions would in fact point into the hand. An arrangement with both sides of the "transition" being background likewise may not be amenable to a clear determination, since in such case no direction from the transition corresponds with "into the hand".

Conversely, considering an image with two hands therein (whether belonging to the same person or not), both hands may be incorrectly identified as being a single object, also potentially leading to confusion with regard to which direction is into "the" hand (since there would be two hands, and if overlapping moving into one hand would be moving out of the other hand).

Thus, as noted above, in at least certain instances a lack of a clearly determined inward direction (dominant direction) may in itself represent useful information, e.g. the prospective transition under consideration may not indeed be a transition for the feature that is to be segmented from a particular data set. Such information may be used to invoke additional examination of some portion of the data set, the data set as a whole, a sensor generating the data set, executable instructions carrying out the examination, etc. to determine whether some problem exists.

Moreover, certain embodiments may address such issues as the possibility of spurious data transitions through further execution of processes similar to those already described. While examples thus far herein typically have included only a single direction determination—identifying the direction into a feature, or the direction out of a feature—embodiments are not limited only thereto.

For example, certain embodiments may determine both a direction into a feature and out of a feature from a prospective transition point. (As noted previously, for a linear property as shown in certain examples herein, the maximum product sum may indicate the direction of a region with a high property value, while the minimum product sum may indicate the direction of a region with a low property value.) If one or both determinations—the direction to the interior of the feature, and to the exterior of the feature—are inconclusive, then as noted above this may be indicative that the prospective transition is spurious (and confidence that the prospective transition is spurious may be higher than if only one direction were tested). However, if both a clear determination of the inward direction and a clear determination of the outward direction are achieved, then confidence may be increased that a given data element does represent a portion of a transition for purposes of segmenting a feature from the data set. More regarding potential advantages of and approaches for considering both inward and outward directions is presented later herein.

In addition, determining a direction into a feature from a transition and out of the feature from the transition may be useful in other ways. For example, if "east" represents the direction into a feature, and "west" represents the direction out of the feature, then in at least certain instances it may reasonably be inferred that the transition extends "north" and "south". Thus, the transition is to be followed (e.g. in order to segment region defined by that transition), it may be effective to evaluate points north and south of the current transition point as potential transition points as well.

In such fashion, a transition may be followed from one data element to another without necessarily evaluating the contents of the prospective transition elements themselves. Instead of (or in addition to) attempting to determine whether a data element is a transition based on the property value of that data element, the next transition element along a transition may be identified by position relative to the interior and exterior of the feature in question. Once that next transition element is tested to determine again the directions to the interior and exterior of the feature therefrom, and the probable position of yet the next transition element may be determined. Thus, a transition may be followed without ever attempting to determine whether the data property of any given element correspond with a transition.

As has been described at some length herein, transition elements typically may exhibit a high degree of variation or noise in their property values. Thus, an approach wherein the data property values of transition elements are not required to be evaluated may avoid the difficulties of determining whether an element is or is not a transition. In effect, the question of "does the property value indicate this element is a transition?" is sidestepped, to be replaced with "which direction is into the feature from the element, and which direction is outward?"

In addition to performing multiple tests in multiple directions (e.g. to determine inward and outward directions), certain embodiments may utilize multiple tests for determining inward and/or outward directions. One such test may utilize three-by-three dominant direction matrices as those shown as elements 614A in FIG. 6, while another uses dominant direction matrices as that shown as element 714A in FIG. 7. Although both types of matrix include eight weighting factors (and thus produce eight products and may be anticipated to yield comparable product sums), the more widely-reaching matrix 714A would sample at a greater distance from the prospective transition point. Thus, if a spurious feature such as a ring on a finger, a scar, etc. were to produce the appearance of a distinct region to one side of a transition for matrix 614A, matrix 714A may nonetheless extend outward far enough to once again reach the portion of the hand beyond the ring, scar, etc. (In practice such "confirming" matrices may be larger than that shown for 714A; the matrix size utilized to produce confidence that a transition represents the actual edge of a feature—e.g. the outline of a hand—as opposed to some feature such as a ring may vary from one embodiment to another, for example depending on the resolution of the data set and other factors.)

Figure 13:
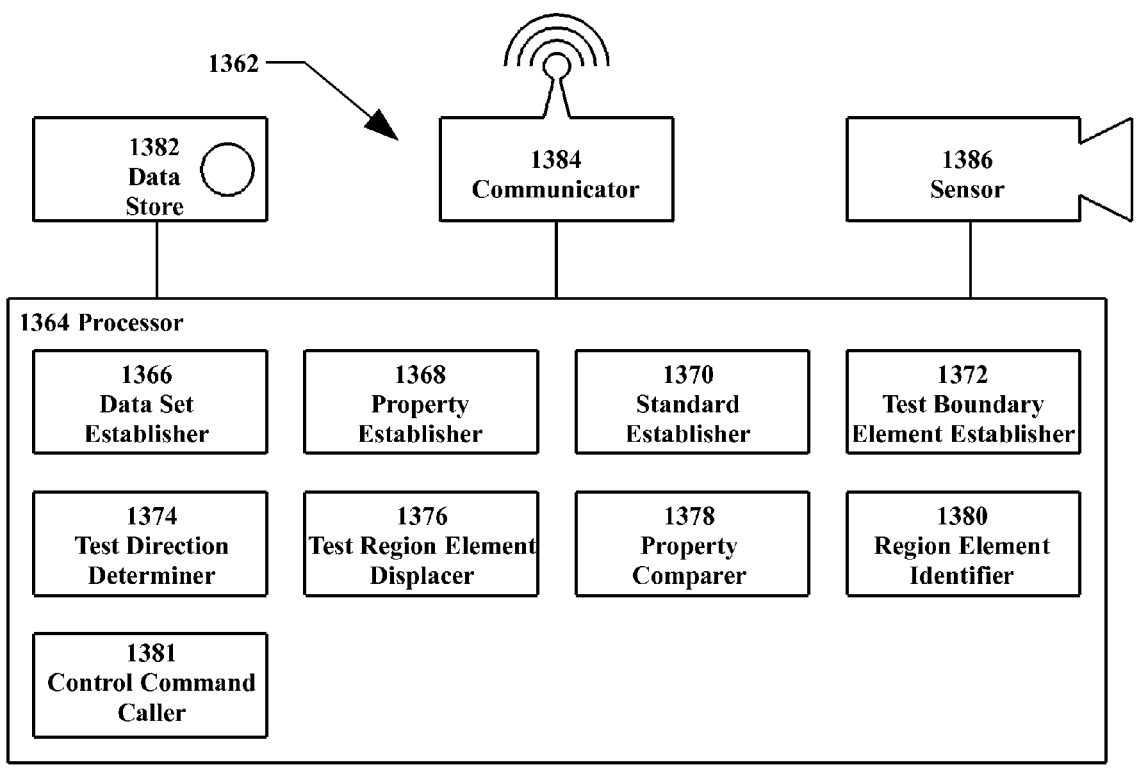
FIG. 13 shows an example apparatus for distinguishing features in a data set, in schematic form.

Referring now to FIG. 13, although previously herein embodiments have been described mainly with regard to examples in the form of methods, embodiments in the form of an apparatus also may be suitable. FIG. 13 shows an example apparatus 1362.

The apparatus 1362 includes a processor 1364, the processor 1364 being adapted to execute executable instructions. Embodiments are not particularly limited with regard to the processor 1364. A range of general-purpose, special-purpose, and embedded systems may be suitable for use as a processor 1364 for various embodiments. Moreover, it may be equally suitable for the processor 1364 to consist of two or more physical or logical processor components, or to be a "virtual" processor. Other arrangements also may be equally suitable.

The example apparatus 1362 in FIG. 13 also includes several data entities 1366 through 1381 disposed on the processor 1364. The data entities 1366 through 1381 may include executable instructions instantiated on the processor, non-executable data, some combination thereof, etc. In the example shown the data entities 1366 through 1381 are described as including executable instructions, but other arrangements may be equally suitable.

With regard individually to the data entities 1366 through 1381 in FIG. 13, a data set establisher 1366 is disposed on the processor 1364. The data set establisher 1366 is adapted to establish a data set. A property establisher 1368 also is disposed on the processor 1364; the property establisher 1368 is adapted to establish a property for elements of the data set. A standard establisher 1370 also is disposed on the processor 1364; the standard establisher 1370 is adapted to establish a standard for distinguishing a feature within the data set. A test boundary element establisher 1372 also is disposed on the processor 1364; the test boundary element establisher 1372 is adapted to establish one or more elements within the data set as being at least potentially representative of a boundary between the feature to be distinguished and other "non-feature" portions of the data set, and/or for verifying that the potential boundary elements are or are not in fact boundary elements. A test direction establisher 1374 also is disposed on the processor 1364; the dominant direction establisher 1370 is adapted to establish a direction representing "inward" into the feature in question, and/or "outward" away from the feature in question, and/or along one or more directions of propagation of a boundary, etc.

A test region element displacer 1376 is disposed on the processor 1364. The test region element displacer 1376 is adapted to establish at least one element that at least potentially is part of the feature or region to be segmented from the larger data set. Typically the test region element(s) as established by the test region element displacer 1376 are established based at least in part on a test boundary element and a dominant direction therefrom, e.g. by displacing from the test boundary element in the dominant direction by at least one element.

A property comparer 1378 also is disposed on the processor 1364. The property comparer 1378 is adapted to determine whether a test region element is or is not part of the region or feature to be segmented, e.g. by comparing the property value for the test region element against the standard established by the standard establisher 1370. A region element identifier 1380 also is disposed on the processor 1364. The region element identifier 1380 is adapted to identify and/or assign test region elements that match the standard as being part of the region or feature to be segmented. Such identification/assignment may represent for example a binary data flag (e.g. 0 for "not part of the region" or 1 for "part of the region"), but other arrangements may be equally suitable.

A control command caller 1381 also is disposed on the processor 1364. The control command caller 1381 is adapted to deliver and/or invoke some command with the processor 1364 so as to control the processor itself 1364, and/or some device, component, system, etc. in communication with the processor 1364 (including but not limited to the data store 1382, the communicator 1384, the sensor 1386, a display, a portable electronic device such as a head mounted display, etc.). However, although the control command caller 1381 is shown as an example in FIG. 13 (and likewise in FIG. 14), embodiments are not limited only to those including a control command caller 1381; not all embodiments necessarily will call, or need be capable of calling, control commands as described.

In addition, for at least certain embodiments the control command caller 1381 may determine the presence of events from the region, and/or identify which command(s) are associated with the relevant event(s). For example, consider an example wherein hand postures, gestures, poses, etc. are to control the apparatus 1362 (and/or some other device or system in communication therewith). If a region is defined as representing a hand, e.g. through identifying which elements are part of the region via the region element identifier 1380, then the control command caller 1381 may determine what posture, gesture, pose, etc. that hand is manifesting (if any), for example based on the configuration and/or motion of the hand. The control command caller 1381 additionally or instead may identify what control command(s) (if any) are associated with that posture, gesture, pose, etc. The control command caller may then call a command, e.g. so as to control the apparatus 1362.

However, such features are examples only, and embodiments are not limited only thereto.

Data sets, properties, standards, boundary elements, dominant directions relative to boundaries or transitions, test region elements, property comparison, and regions and the establishment thereof have been previously described herein.

With regard to establishment, a data set establisher 1366 may for example establish a data set based on input from a sensor, read from a data store, received via a communicator, computed within the processor, etc. The property establisher 1368, standard establisher 1370, test boundary element establisher 1372, and/or test direction determiner 1374 may perform their function(s) likewise. Not all entities must operate identically, e.g. the data set establisher 1366 may establish the data set based on input from a sensor while the standard establisher 1370 establishes the standard by obtaining the standard from a data store and the boundary element establisher 1372 establishes boundary elements through computational analysis of the data set within the processor, etc.

In addition, the apparatus 1364 may include additional elements, such as a data store 1382, communicator 1384, sensor 1386, etc. In the example shown, the data store 1382 may provide stored data for one or more of the data entities 1366 through 1378 disposed on the processor 1364. Likewise, the communicator 1384 may provide data from some external source for one or more of the data entities 1366 through 1381 disposed on the processor 1364. Similarly, the sensor 1386 may provide sensory data input for one or more of the data entities 1366 through 1381 disposed on the processor 1364. However, although shown in the example of FIG. 13 as potentially supportive of certain other elements (e.g. the data set establisher 1366, property establisher 1368, etc. as noted above), a data store 1382, communicator 1384, and/or sensor 1386 may be considered optional, and is not necessarily required for all embodiments.

Figure 14:
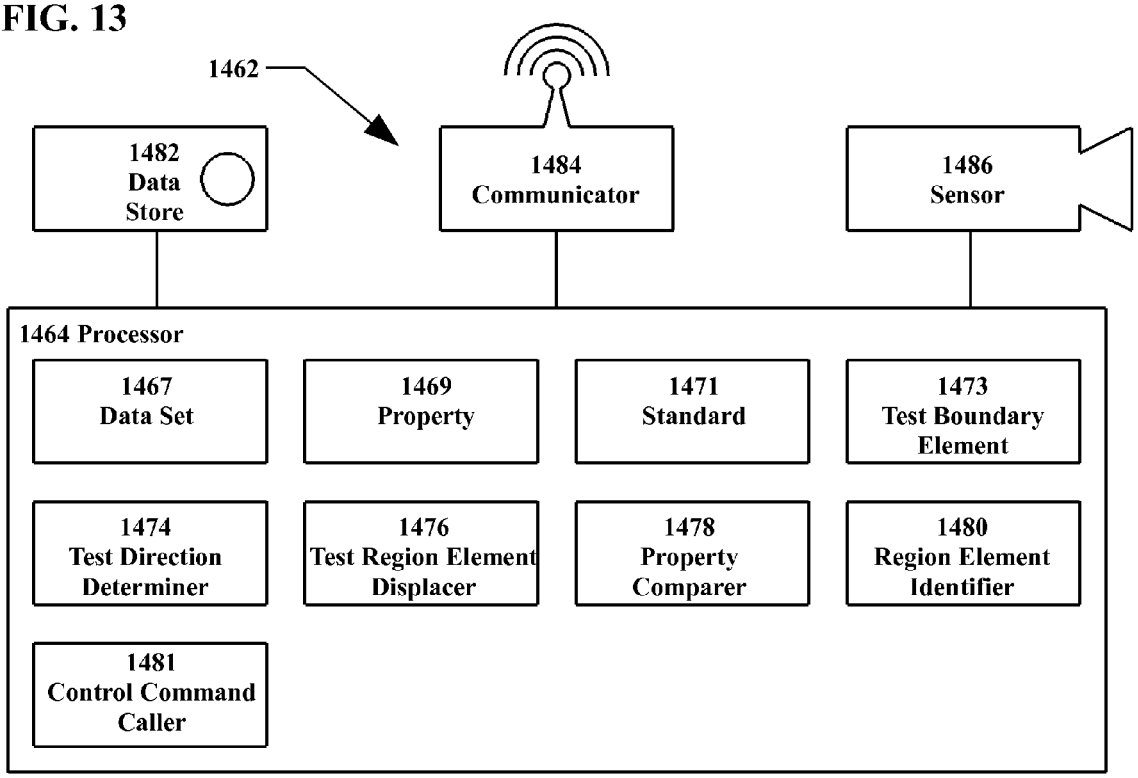
FIG. 14 shows another example apparatus for distinguishing features in a data set, in schematic form.

Now with reference to FIG. 14, another example apparatus 1462 is shown therein. The apparatus 1462 includes a processor 1464, the processor 1464 being adapted to execute executable instructions. Several data entities 1467 through 1481 are disposed on the processor 1464.

Where the example of FIG. 13 included a data set establisher 1366, property establisher 1368, standard establisher 1370, and test boundary element establisher 1372 the example of FIG. 14 includes a data set 1467, property 1469, standard 1471, and boundary element 1473. Data sets 1467, properties 1469, standards 1471, and boundary elements 1473 have been previously described herein.

The example apparatus 1462 in FIG. 14 also includes a dominant direction determiner 1474, test region element displacer 1476, property comparer 1478, region identifier 1480, and control command caller 1481, at least somewhat comparable to similarly named elements from FIG. 13. The apparatus 1462 may include additional elements such as a data store 1482, communicator 1484, sensor 1486, etc.

It is emphasized with regard to FIG. 13 and FIG. 14 that embodiments are not particularly limited manner by which a data set 1467, property 1469, standard 1471, and boundary element 1473 are made available; one or more of the data set 1467, property 1469, standard 1471, and boundary element 1473 may be instantiated directly on the processor 1464 as in FIG. 14, while one or more such may be established by a property establisher 1368, standard establisher 1370, test boundary element establisher 1372, and test direction establisher 1374 as in FIG. 13, or otherwise made available. So long as the necessary information and/or executable instructions are available, various embodiments may function regardless of the manner by which such entities are made available.

Although elements disposed on a processor are shown for clarity in FIG. 13 and FIG. 14 as being a group of integral components, this is an example only. Elements may be divided into sections, broken into multiple pieces, combined into a larger whole (e.g. a single assembly of executable instructions and data that performs all functions), etc.

Figure 15:
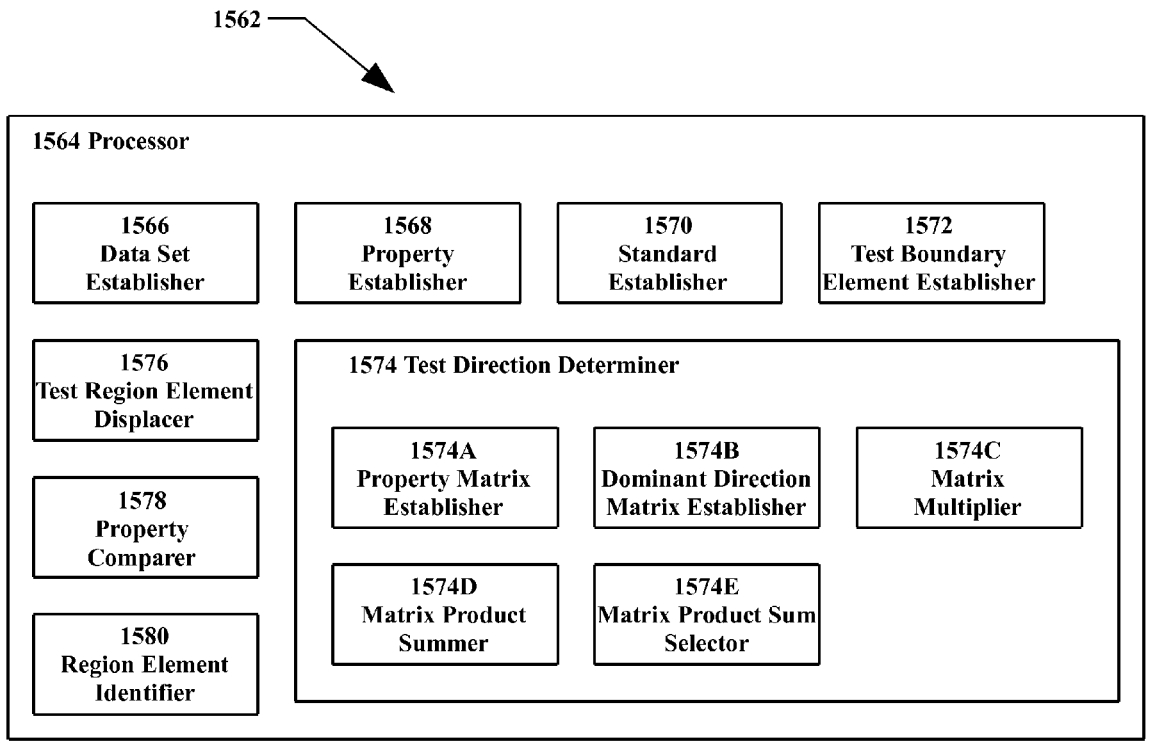
FIG. 15 shows another example apparatus for distinguishing features in a data set, in schematic form, showing a functional element broken into sub-elements.

Now with reference to FIG. 15, another example apparatus 1562 is shown there. The apparatus 1562 in FIG. 15 includes a test direction establisher 1574 at least somewhat similar to that in FIG. 13, but in the arrangement of FIG. 15 the test direction establisher 1574 is subdivided into several portions identified as 1574A through 1574E.

The test direction determiner 1574 includes a property matrix establisher 1574A; the property matrix establisher 1574A is adapted to establish a matrix of property values, e.g. as a subset of a data set. The test direction determiner 1574 includes a dominant direction matrix establisher 1574B; the dominant direction matrix establisher 1574B is adapted to establish one or more dominant direction matrices, such as weighted matrices adapted to indicate a dominant direction when combined with the property matrix. The test direction determiner 1574 includes a matrix multiplier 1574C; the matrix multiplier 1574C is adapted to multiply corresponding values in the property matrix and the dominant direction matrices. The test direction determiner 1574 includes a matrix product summer 1574D; the matrix product summer 1574D is adapted to sum the products of the values multiplied by the matrix multiplier 1474C. The test direction determiner 1574 includes a matrix product sum selector 1574E; the matrix product sum selector 1574E is adapted to select one of the sums of generated by the matrix product summer 1574D so as to identify a dominant direction, i.e. to determine the direction to the interior of a prospective region for segmenting from a larger data set.

Property matrices and dominant direction matrices and the establishment thereof, and matrix multiplication, product summing, and product selection have be previously described herein.

The apparatus 1562 as shown in FIG. 15 also includes a processor 1564, with the test direction determiner 1574 disposed thereon. A data set establisher 1566, property establisher 1568, standard establisher 1570, test boundary element establisher 1572, test region element displacer 1576, property comparer 1578, and region element identifier 1580 are also shown to be disposed on the processor 1564. Data set establishers 1566, property establishers 1568, standard establishers 1570, test boundary element establishers 1572, test region element displacers 1576, property comparers 1578, and region element identifiers 1580 have been previously described herein.

It is pointed out that the apparatus 1562 shown in FIG. 15 does not include a data store, communicator, or sensor as do the example apparatuses shown in FIG. 13 and FIG. 14, nor a control command caller. As noted previously, such elements are optional, and may not be included in all embodiments.

Figure 16:
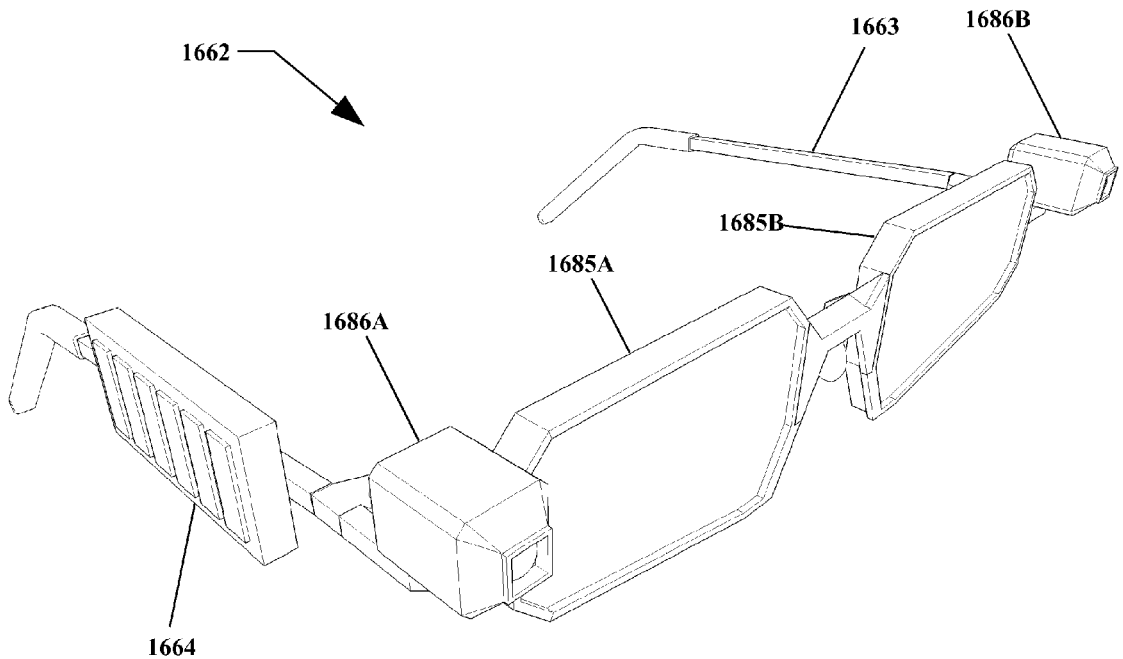
FIG. 16 shows an example apparatus for distinguishing features in a data set, in perspective view.

Now with reference to FIG. 16, embodiments may take many forms, and/or may be incorporated into many devices. One example of an apparatus 1662 is shown in FIG. 16, in perspective view. The example apparatus 1662 shown is in the form of a head-mounted display, as may be used for delivering immersive visual content to a user, such as augmented reality and/or virtual reality imagery. Although not all features described herein necessarily will be visible in FIG. 16 (nor necessarily from the exterior of any particular embodiment), and likewise not all features described herein necessarily even will be present, it should be understood that various embodiments may provide useful functionality within and as part of hardware such as that shown in FIG. 16. For example, distinguishing features within data sets may support the identification of postures and/or gestures, thus facilitating postural/gestural input and/or control of a head mounted display similar to that shown in FIG. 16, some other apparatus, etc. (Further comments regarding the incorporation of embodiments as substeps of a larger functional method are presented subsequently herein with regard to FIG. 19, FIG. 20A, and FIG. 20B.) However, although the example presented in FIG. 16 constitutes a discrete physical device (e.g. a wearable electronic device, more particularly a head-mounted display), embodiments are not limited only to physical hardware, nor to running on nor to the specific embodiment shown in FIG. 16.

As shown, the apparatus 1662 includes a processor 1664. Although not visible in perspective view, the processor 1664 may have disposed thereon one or more data entities, such as a data set establisher, property establisher, standard establisher, test boundary element establisher, dominant direction establisher, test region element displacer, property comparer, and/or region element identifier comparable to those shown and described previously with regard to FIG. 13.

In addition, the example apparatus 1662 includes a body 1663, the body being in the form of a pair of glasses so as to be wearable e.g. as a head mounted display. The processor 1664 is disposed on the body 1663. Also disposed on the body 1663 are first and second displays 1685A and 1685B, and first and second sensors 1686A and 1686B. In the example as shown, the displays 1685A and 1685B are disposed on the body 1663 such that when the body 1663 is worn the displays 1685A and 1685B would be arranged in front of, facing, and proximate the eyes of a wearer, for example so as to display stereo visual information to that wearer. Similarly, the sensors 1686A and 1686B are shown disposed on the body 1663 such that when the body 1663 is worn the sensors 1686A and 1686B would be arranged in left and right positions proximate and facing generally outward from the wearer's eyes, for example so as to capture stereo visual information at least comparable to that received by the wearer's eyes.

However, the arrangement shown in FIG. 16 is an example only. The body 1663, displays 1685A and 1685B, and sensors 1686A and 1686B are optional and are shown as an example, though not all embodiments necessarily will have such elements. Substantially any processor, device incorporating a processor, device in communication with a processor, etc. may be utilized for various embodiments.

Figure 17:
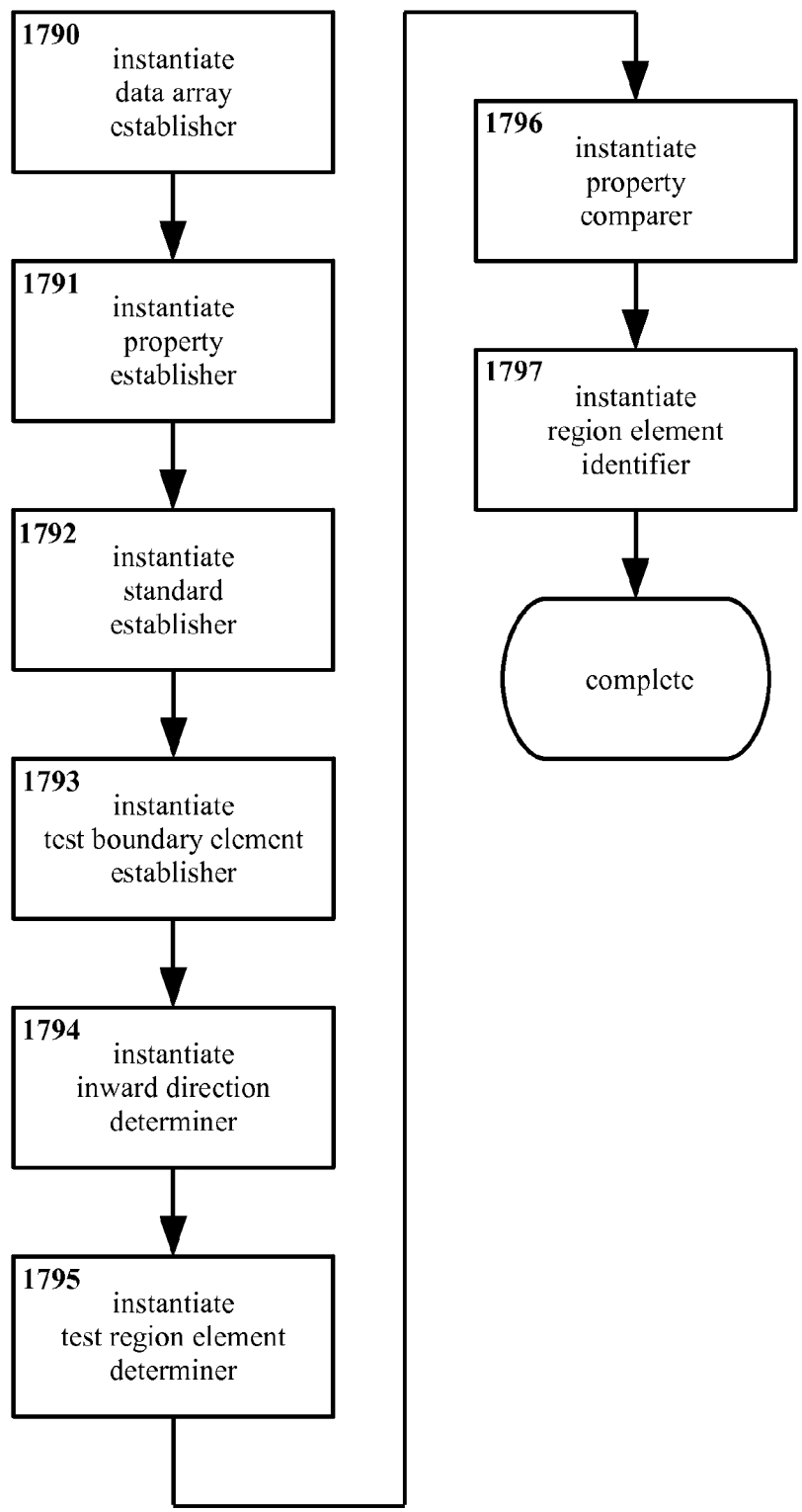
FIG. 17 shows an example method for establishing a capability for executing certain functions within a processor, in flow chart form.

Now with reference to FIG. 17, a method for configuring an apparatus is shown therein.

In the method of FIG. 17, a data set establisher is instantiated 1790 on a processor. A property establisher is instantiated 1791 on the processor. A standard establisher is instantiated 1792 on the processor. A test boundary element establisher is instantiated 1793 on the processor. A test direction determiner is instantiated 1794 on the processor. A test region element displacer is instantiated 1795 on the processor. A property comparer is instantiated 1796 on the processor. A region element identifier is instantiated 1797 on the processor.

Data set establishers, property establisher, standard establisher, test boundary element establishers, test direction determiners, test region element displacers, property comparers, and region element identifiers have been previously described herein.

Typically, though not necessarily, instantiation steps 1790 through 1797 may be carried out using data and/or executable instructions read from a data store such as a hard drive, solid state drive, optical drive, etc., communicated from an outside source, obtained from a sensor (e.g. receiving a data set corresponding to a visual image from a digital camera or other imaging sensor), etc. Embodiments are not particularly limited with regard to sources therefor.

Steps as shown in FIG. 17 are examples only, and may be combined, subdivided, reordered, etc. For example, now with reference to FIG. 18, a method at least somewhat similar to that in FIG. 17 is shown, but with one step subdivided.

Figure 18:
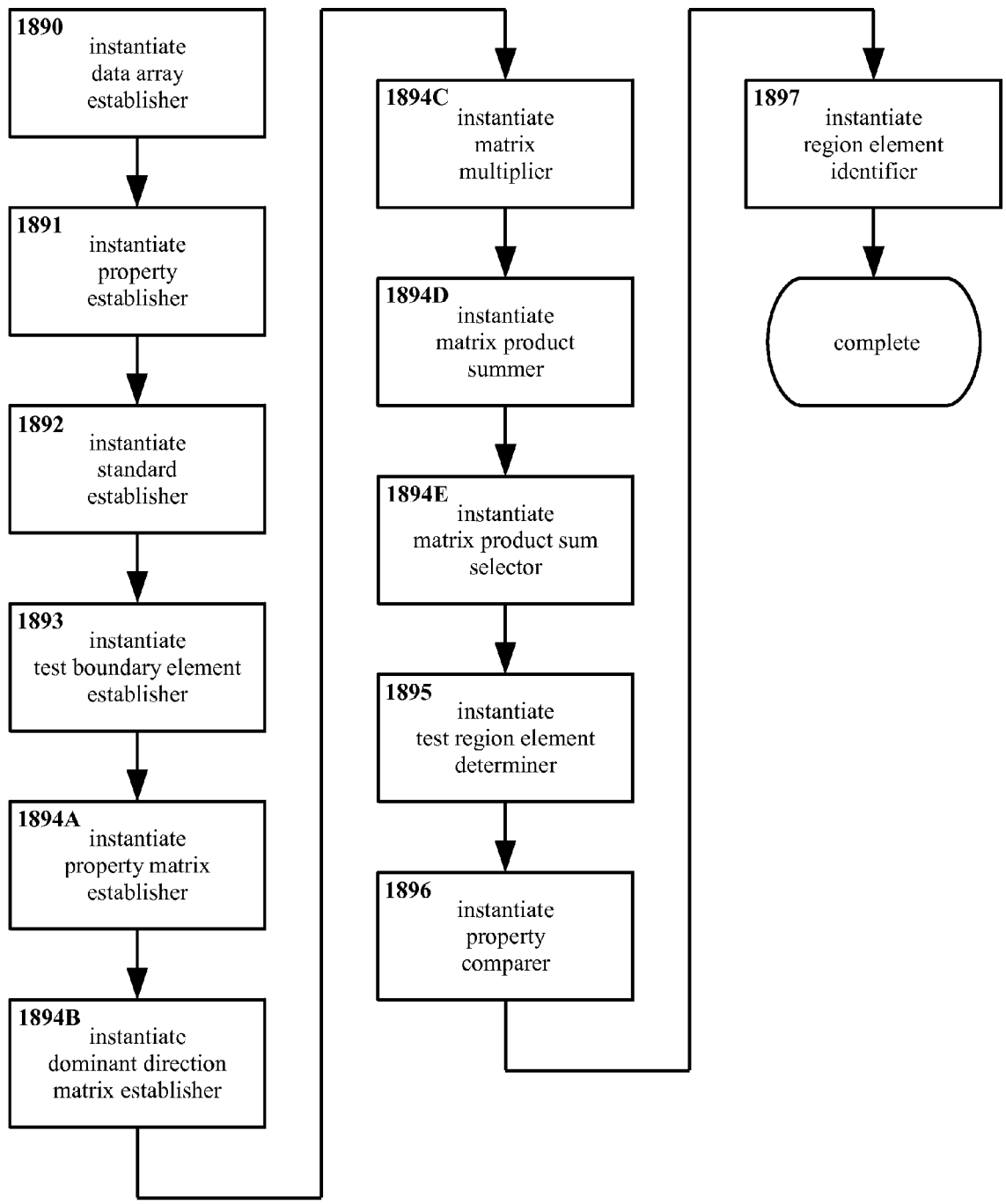
FIG. 18 shows another example method for establishing a capability for executing certain functions within a processor, in flow chart form.

In the method of FIG. 18, a data set establisher is instantiated 1890 on a processor, a property establisher is instantiated 1891 on the processor, a standard establisher is instantiated 1892 on the processor, and a test boundary element establisher is instantiated 1893 on the processor.

Where in FIG. 17 a test direction determiner was instantiated as a single step, in FIG. 18 several substeps 1894A through 1894E are shown that together at least substantially correspond with the instantiation of a test direction determiner (i.e. by providing the functionality of a test direction establisher once instantiated). In the arrangement of FIG. 18, a property matrix establisher is instantiated 1894A on the processor. A dominant direction matrix establisher is instantiated 1894B on the processor. A matrix multiplier is instantiated 1894C on the processor. A matrix product summer is instantiated 1894D on the processor. A matrix product sum selector is instantiated 1894E on the processor.

Continuing in FIG. 18, a test region element displacer is instantiated 1895 on the processor, a property comparer is instantiated 1896 on the processor, and a region element identifier is instantiated 1897 on the processor.

Figure 19:
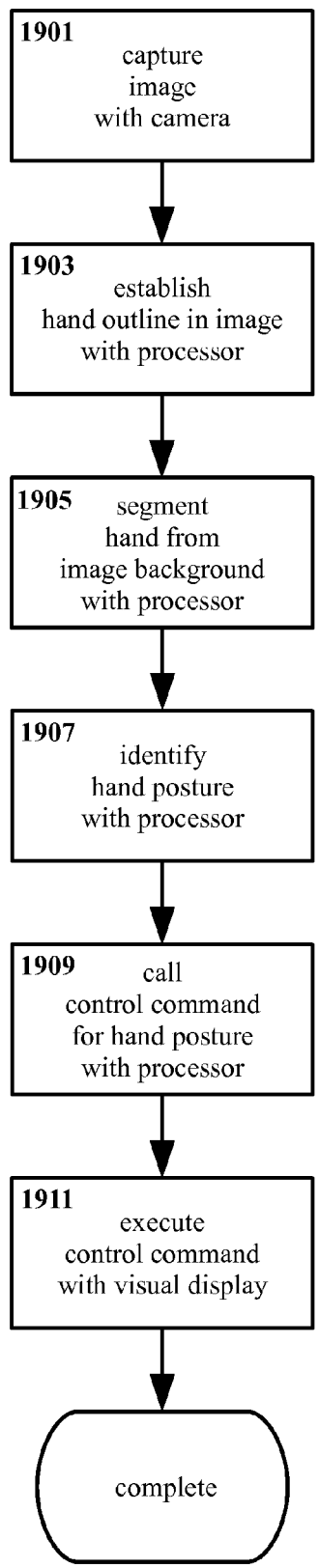
FIG. 19 shows an example of a use-case for posture/gesture control of a physical device, in flow chart form.

Now with reference to FIG. 19, therein is shown an example of a use-case. The example of FIG. 19 considers an arrangement with respect to a hardware device such as the head-mounted display illustrated in FIG. 16. As shown and described with regard to FIG. 19, such hardware may for example be controlled with hand postures and/or hand gestures as detected through use of a camera, interpreted using a processor (typically though not necessarily with executable instructions instantiated thereon), with commands executed in response to the postures/gestures, at least certain such commands producing or altering visual output delivered to display screens (e.g. changes to a virtual reality and/or augmented reality interface, environment, etc.).

Figure 20A:
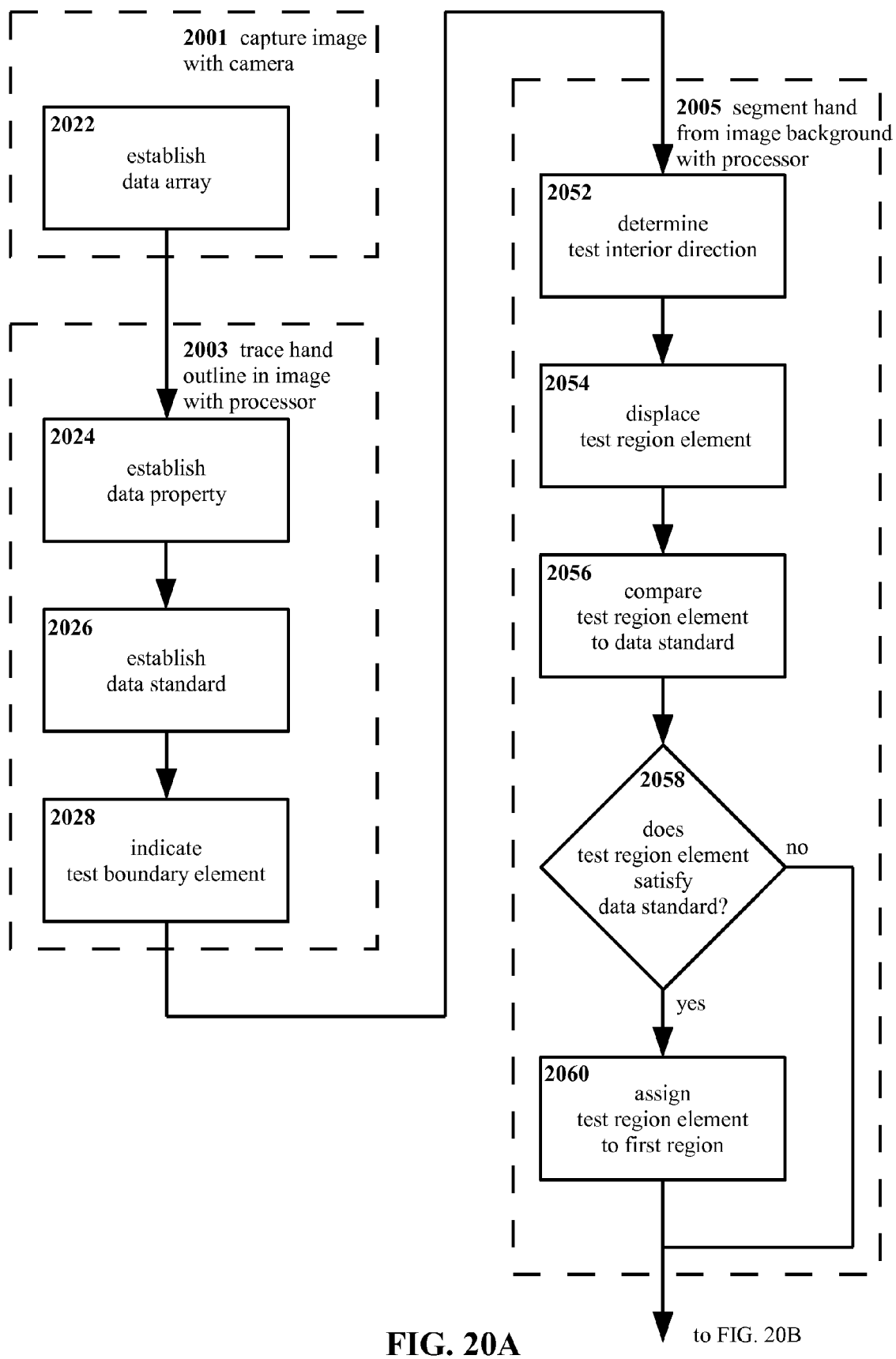
FIG. 20A and FIG. 20B show another example a use-case for posture/gesture control of a physical device, in flow chart form.
Figure 20B:
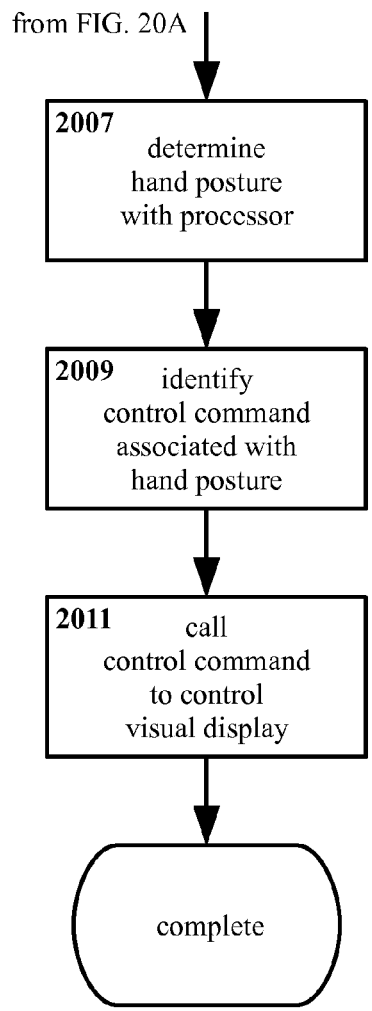

It is noted that a similar but more detailed example to that in FIG. 19 is presented in FIG. 20A and FIG. 20B. Where FIG. 19 shows an overview of a larger method that may incorporate an various embodiments, FIG. 20A and FIG. 20B illustrate more specifically how individual steps in an example method (similar to that already shown and described with regard to FIG. 5) may be understood to serve within a practical implementation such as a head-mounted display. It is emphasized however that embodiments are not limited only to head-mounted displays, nor to the specific example methods shown in FIG. 19 and/or in FIG. 20A and FIG. 20B.

In FIG. 19, an image is captured 1901 with a camera. For purposes of the example arrangement in FIG. 19 the camera may be considered to be a digital camera such as a CCD or CMOS camera (including but not limited to a depth camera), and the image may be considered to be a digital image in the form of a digital file such as a png, jpg, etc. so as to be readily received and manipulated by electronic systems. However, this is an example only, and other arrangements may be equally suitable.

For purposes of hand posture/gesture recognition in the example shown in FIG. 19, it may be assumed that a hand is, or at least may be, present within the image captured in step 1901. Continuing in FIG. 19, an outline of the hand is established 1903 in the image with a processor. For purposes of the example arrangement in FIG. 19 the processor may be considered to be a digital electronic processor such as a semi-conductor based integrated chip processor, though other arrangements may be equally suitable. Typically though not necessarily the processor in question may have executable instructions instantiated thereon adapted to carry out or at least support the step of establishing 1903 the hand outline; this comment applies similarly to steps 1905, 1907, and 1909. However, this is an example only, and other arrangements may be equally suitable, including but not limited to specialized processors incorporating hardware dedicated to specific tasks corresponding with steps 1903, 1905, 1907, and/or 1909. Moreover, although for purposes of example the arrangement of FIG. 19 is described herein as though a single processor performs all of steps 1903 through 1909 other arrangements, including but not limited to individual processors for each step, time-sharing or "cloud" processing using one or more processors, etc. may be equally suitable.

Moving on in FIG. 19, the hand is segmented 1905 from the background of the image with the processor. That is, the portion of the camera image that may be considered "hand" is distinguished from the portion of the camera image that may be considered "not hand".

The posture of the hand is identified 1907 with the processor. Typically though not necessarily this may be accomplished by considering the shape of the region segmented in step 1905, by considering features within the segmented region, etc.

A control command is called 1909 for the hand posture as identified in step 1907. That is, when carrying out control of a device through hand gestures and/or hand postures, in at least certain arrangements specific postures/gestures may be associated with commanding specific actions, events, etc. to be carried out in response thereto. As an example, a hand held out face-down with fingers spread may be associated with a command for a display to "go back", i.e. to return the display to whatever state that display was in previously. More concretely, such a "go back" command may cause the screen to exit a map utility, to return to a game previously in progress, to change from one page of an electronic book to the previous page, etc. These are examples only, and other arrangements may be equally suitable.

Still with reference to FIG. 19, the control command (called in step 1909) is executed 2011 with a visual display. For purposes of the example arrangement in FIG. 19 the visual display may be considered to be an LED or OLED display, CRT display, plasma display, laser display, etc., though other arrangements may be equally suitable. Examples of changes to a visual display associated with an instruction are described above with regard to step 1909; in step 1911 such changes are carried out, such that the visual display exhibits such changes so as to be visible to a viewer.

Turning now to FIG. 20A and FIG. 20B, therein another example is illustrated showing more specifically how individual steps in an example method (similar to that already shown and described with regard to FIG. 5) may be understood to serve within a practical implementation such as a head-mounted display (similar to that already shown and described with regard to FIG. 19).

In FIG. 20A, an image is captured 2001 with a camera (at least somewhat similar to what is described with regard to step 1901 of FIG. 19). Such step may be considered for at least certain embodiments to incorporate a establishing 2022 a data set (at least somewhat similar to what is described with regard to step 522 of FIG. 5), wherein the data set is a two-dimensional array of pixels corresponding to a camera image.

A hand outline is established 2003 with a processor (at least somewhat similar to what is described with regard to step 1903 of FIG. 19). Such step may be considered to incorporate establishing 2024 a data property and establishing 2026 a data standard (at least somewhat similar to what is described with regard to steps 524 and 526 of FIG. 5), wherein the data property is color, brightness, depth, etc. within an image and the data standard is a maximum, minimum, and/or range of values for color, brightness, depth, etc. Step 2003 also may be considered to incorporate establishing a test boundary element 2028 (at least somewhat similar to what is described with regard to steps 528 of FIG. 5), or a series of test boundary elements, wherein the test boundary elements are those that correspond with a transition in color, brightness, depth, etc. so as to delineate the perimeter of a hand within an image.

Although the example arrangement in FIG. 20 shows only a single instance of each step for purposes of simplicity, certain steps therein may be repeated, potentially many times. For example, in establishing 2003 a hand outline in an image, the outline may include many individual test boundary elements, thus establishing 2028 a test boundary element may be repeated many times. To continue the example, a digital image including an arrangement of columns and rows of pixels may include many individual pixels that together define the outline of the hand within that image. Some or all of those individual pixels defining the hand outline may be established 2028 as test boundary elements (although not all pixels that potentially could be so indicated necessarily will or must be so indicated). Thus, step 2028 in FIG. 20 may repeat many times. This may be true even if not all steps in FIG. 20, or even within establishing 2003 the hand outline, are repeated; once the data property is established 2024 as, for example, depth within a depth image, it may not be necessary to repeat establishing 2024 the data property for the same image (or other data set).

Similarly, other steps, including but not limited to 2005 and/or substeps thereof (described below) may be repeated, e.g. so as to identify a series of data elements as belonging to a first region, thus tracing the outline of a hand or other feature displaced one or more steps into the interior of that hand.

Furthermore, it is emphasized that although steps are shown in FIG. 20 as being discrete blocks, operations shown as individual method steps may themselves include substeps (just as establishing 2003 the hand outline encompasses steps 2024, 2026, and 2028). For example, establishing 2028 a test boundary element may include various sub-steps, such as first searching an image to identify a hand outline, by shifting one or more pixels in some direction to follow that outline once the outline is found. For example as already noted herein, in determining inward and/or outward directions with regard to a feature defined by a transition, it may be possible to then follow that transition based at least in part on the determination of inward and/or outward directions.

Continuing in FIG. 20A, a hand is segmented 2005 from the background of the image (the image having been captured in step 2001) with the processor (at least somewhat similar to what is described with regard to step 1905 of FIG. 19). Such step may be considered to incorporate determining 2052 a test inward direction and displacing 2054 a test region element in the test inward direction (at least somewhat similar to what is described with regard to steps 552 and 554 of FIG. 5). Step 2005 also may be considered to incorporate comparing 2056 the test region element to the data standard, and making a determination 2058 as to whether the test region element satisfies the data standard (at least somewhat similar to what is described with regard to steps 556 and 558 of FIG. 5). Step 2005 in FIG. 20A also may be considered to incorporate identifying 2060 the test region element as belonging to a first region if the determination 2058 is positive, and moving on without so identifying the test region element if the determination 2058 is negative.

Now in FIG. 20B, the posture of the hand is determined 2007 with the processor, for example based on the configuration (e.g. shape, size, orientation, etc.) and/or motion (if any; motion may for example be determined through consideration of two or more images over time, though other approaches also may be suitable) of the region segmented from the background as "hand" (although other arrangements also may be suitable). A control command is identified 2009 as being associated with the hand posture identified in step 2007. For example, a closed first posture might be associated with "cancel", thumb-up and thumb-down postures might be associated with yes/no, etc. That control command is called 2011 in order to control a visual display, e.g. so as to invoke a change in what content is displayed, how content is displayed, etc.

Thus, as may be seen from FIG. 20A and FIG. 20B, at least certain embodiments may be considered as a substep or a series of substeps within broader methods and/or apparatuses, and thus may accomplish tasks including but not limited to control processors, devices that include or communicate with processors such as mobile and/or wearable electronic devices, etc.

Although the arrangement shown in FIG. 20A and FIG. 20B refers specifically to hands, images, postures, etc., these are examples only and other arrangements may be equally suitable. Gestures (e.g. dynamic motions as opposed to static postures, though gestures potentially may be understood as successive sequences of postures) may be suitable in addition to or instead of a posture, a stylus may be suitable in addition to or instead of a hand, a depth map may be suitable in addition to or instead of an image, etc. Likewise, although the example in FIG. 20A and FIG. 20B refers specifically to carrying out instructions with respect to a visual display, other instructions addressing and/or controlling other devices, systems, etc. also may be equally suitable.

In addition, references to hands, postures, visual displays, etc. in FIG. 20A and FIG. 20B are themselves examples only. Steps analogous to 2007, 2009, and/or 2011 may be carried out without necessarily relating to hand inputs, visual displays, etc., for at least certain embodiments.

For example, a more general case analogous to step 2007 may be detection and/or identification of substantially any event, rather than necessarily a hand posture. While the execution of a hand posture, hand gesture, hand pose, etc. may be detected as an event as shown in FIG. 20A and FIG. 20B, other events may be equally suitable. A stylus or pointer might be detected instead, facilitating control in a manner similar to that described with regard to hand postures. However, other objects, features, etc., not necessarily limited to objects and/or features used for deliberate input, also may be considered to perform and/or to be events. For example, the existence of a face within the field of view of an image may be an event, as may the existence of a facial expression. The existence, appearance, disappearance, motion, transformation, etc. of substantially any feature that may be detected within an image (or other data set) may be considered as an event for at least certain embodiments of the present invention. Typically, though not necessarily, a step analogous to 2007 also may include some form of interpretation, e.g. if a determination is to made as to whether a particular face is present, some form of facial identification may be necessary or at least useful. Embodiments are not limited with regard to whether or how such interpretation is carried out.

Similarly, a more general case analogous to step 2009 may be identification of a control command associated with a given event. Given the wide range of possible events, the nature and function of control commands that may be associated therewith is likewise large, and embodiments are not limited with regard thereto.

Again similarly, a more general case analogous to step 2011 may be calling the control command with respect to substantially any system, rather than necessarily a visual display. For example, considering a head mounted display, a control command may indeed control the visual display(s), but may also control sensors, communicators, data stores, the processor itself, etc. However, in at least certain embodiments control commands may control other systems, such as other portable electronic devices, personal computers, mainframes, cloud systems, hardware in communication with a processor calling the control command, etc.; such systems may be local, such as a display hard-wired to the processor, or remote, such as a network accessed via the internet or a lock accessed via wireless communication such as Bluetooth.

However, it is again noted that steps such as 2007, 2009, 2011, analogs thereof, and/or the grouping of substeps in FIG. 20A and FIG. 20B is an example only, and that not all such steps, substeps, and/or groupings are necessarily required for all embodiments, nor are analogs thereof necessarily required. For example, for certain embodiments it may be sufficient to identify a hand (or some other feature) within an image (or some other data set), rather than necessarily controlling a system therewith. Other steps, such as storing the hand and/or information determined therefrom, further processing data associated with the hand, transmitting the hand and/or information associated therewith to some external destination, etc. also may be suitable.

As noted previously herein, determining an outward direction from a possible transition may be useful in developing increased confidence in the existence and/or location of that transition. In addition, determining an outward direction relative to a transition, and/or tracing an outline one or more pixels outward from that transition, also may be useful.

Figures 21, 22:
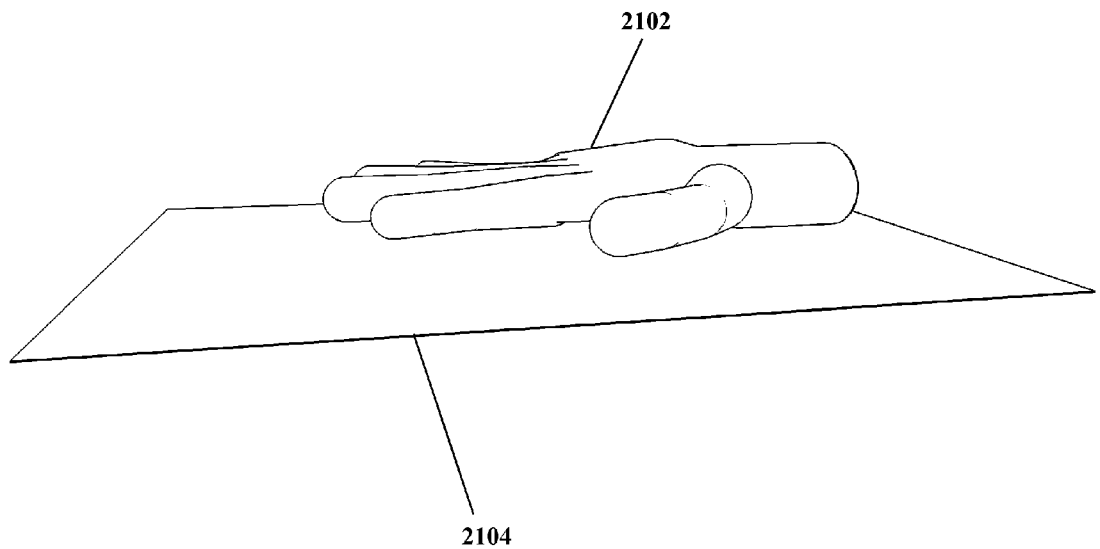
FIG. 21 shows an example arrangement of a hand and a background in proximity to one another, as may be the subject of a data set, in perspective view.
FIG. 22 shows an example data wherein first and second regions exhibit value ranges proximate one another.

For example, consider an arrangement such as that in FIG. 21. Therein a hand 2102 is held flat, palm outward, near a flat surface 2104 such as a table.

Certain previous examples herein have included a large difference between first and second regions in a data set, as may be the case for image data representing a features that have a clear and/or large difference in some property. For example, such an image may include a hand and a background, wherein a difference in position (e.g. depth/distance from a sensor), brightness, color, etc. between the hand and the background were relatively large. Considering depth as a more particular example, if the hand (or other feature of interest) is at a depth that is dramatically different from the background, or otherwise easily distinguished from the background, then the resulting data set may exhibit depth values for the hand that likewise are dramatically different from the depth values for the background.

Such an arrangement, with an easily distinguished difference in depth, may yield a data set similar to that in FIG. 4D, for example, wherein the first region 402D may represent the hand and exhibits values near the upper limit of 255, and the second region 404D may represent the background and exhibits values near the lower limit of 0. Even though variation may be seen in the values for the first region 402D and also in the values for the second region 404D, the values for the first region 402D and the second region 404D are starkly different from one another.

Alternately, a data set such as that in FIG. 4D may be exhibited by and/or representative of a gray-scale photograph with a light hand held in front of a dark background (or vice versa), by a color image wherein the hand shows a distinctive color and/or color distribution, etc.

However, not all data sets necessarily will exhibit such a readily distinguished difference between first and second regions. Again with reference to FIG. 21, as may be seen the hand 2102 is in close proximity to the surface 2104; thus if a depth map were obtained from a point of view above the hand, then the distance to the hand 2102 and the distance to the surface 2104 may be similar. For example, if the hand 2102 is 40 cm distant from some point of view, the surface 2104 may be 45 cm or 50 cm. If the hand 2102 were physically touching the surface 2104, the difference in depth may be as little as 1 or 2 centimeters.

A data set representative of such an arrangement may resemble that in FIG. 22, showing a data set 2208. As may be seen in FIG. 22, a first region 2202 exhibits values from 129 through 150, a second region 2204 exhibits values from 110 through 127, and the transition 2206 therebetween exhibits values from 113 through 149. Although the first region 2202 has values higher than those of the second region 2204, the distinction is not as stark as in certain previous examples herein such as that shown in FIG. 4D.

For a depth map representing the situation in FIG. 21, with a hand 2102 disposed in close proximity to a surface 2104, the distance to the hand 2102 and to the surface 2104 may be sufficiently similar that it may not be immediately obvious which is which based purely on depth values such as those shown in FIG. 22. In physical terms, the hand 2102 and surface 2104 in FIG. 21 are close enough together that knowing the depth of one or the other may not necessarily identify one from the other; in terms of data, the values in the first and second regions 2202 and 2204 in FIG. 22 are sufficiently similar that knowing the values of one or the other may not necessarily identify one from the other.

For this reason (though not necessarily only for this reason), it may be useful to consider not only the first region 2202 in segmenting the first region 2202 from the data set 2208, but the second region 2204 in addition (and/or instead, depending on the particulars of the arrangement).

It is pointed out that in the arrangement of FIG. 22, although the values in the first region 2202 and the second region 2204 are relatively close in magnitude, every value in the first region 2202 exceeds every value in the second region 2204. However, in practice this may not necessarily be the case. Even if the physical system (if any) that the data set 2208 represents has in it some distinction—e.g. with regard to FIG. 21, if the hand 2102 is indeed closer than the surface 2104—then issues such as sensor noise and other factors may contribute to variation to the data set. It may be that in certain data sets, the range of values in the first and second regions may overlap, for example the lowest values in the first region may be lower than the highest values in the second region. In such instance, considering both the first and the second region rather than only one or the other may be useful.

For example, even if sensor noise is sufficient as to make values in first and second regions overlap, averaging multiple values in the first or second regions may reveal a difference therebetween. Other analysis likewise may be suitable for distinguishing first and second regions. Averaging or other analysis of the first or second regions alone may not necessarily reveal a difference therebetween. For example, consider an arrangement wherein the first region were anticipated to have an average value of between 118 and 127, that average being higher than an average for the second region. (This may correspond with a physical system with a hand that is in front of but close to some background.) If one part of the data set were found to have an average value of 124, this may not in itself clearly distinguish that part from the rest of the data set, e.g. if other parts of the data set exhibit similar values. However, part of the data set were found to have an average value of 124, and another part an average value of 119, then a distinction may be made therebetween even though both parts are in the anticipated range of 118 to 127, based on 124 being greater than 119.

In the arrangement of FIG. 21, the hand 2102 is visibly in close proximity to the surface 2104. However, this should not be seen as limiting with regard to what constitutes "close" proximity. Particulars such as the type of sensor generating a data set (assuming as an example that the data set may be generated by a sensor, which is permissible but not required), the distance between that sensor and the hand 2102 and surface 2104, electronic noise, etc. may influence at what point the hand 2102 is sufficiently close to the surface 2104 that the first and second regions of a data set reflective thereof may be considered "similar" (or at least not starkly different). Thus, discussion of "close" should not be understood as limiting, even if distances are cited as examples herein, and likewise for discussion of the degree to which first and second regions are or may be "similar".

Figure 23:
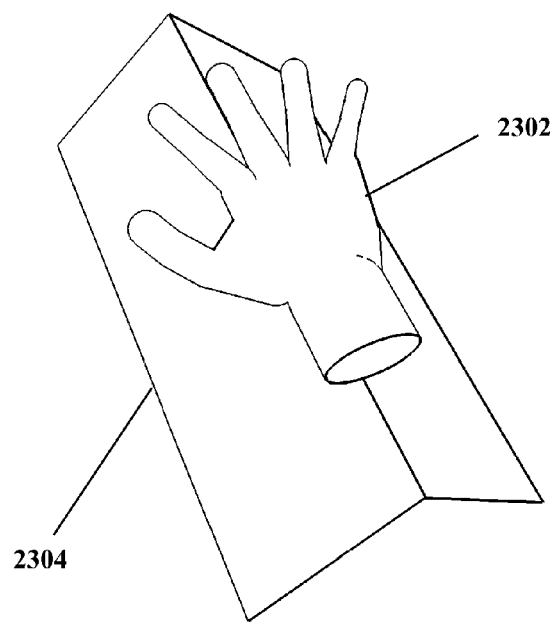
FIG. 23 shows an example arrangement of a hand disposed in front of a non-uniform surface, as may be the subject of a data set, in perspective view.
Figure 24:
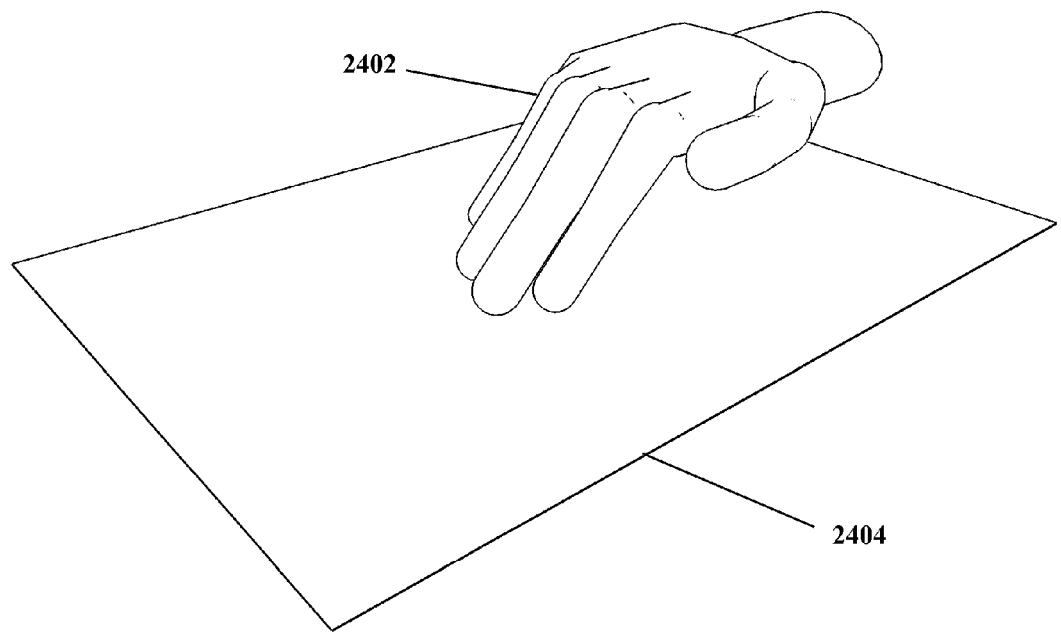
FIG. 24 shows an example arrangement of a hand configured with fingers angled with respect to the palm and disposed in front of a surface, as may be the subject of a data set, in perspective view.

In addition to factors associated with similar values in first and second regions, with reference to FIG. 23 and FIG. 24 it is pointed out that first and second regions may not necessarily be uniform. In certain previous examples the first and/or second regions have been shown for clarity as being at least approximately uniform. That is, considering data sets reflecting distance, the distance values for the first region have been shown as all being numerically similar, and the distance values for the second region likewise have been shown as all being numerically similar. This may be considered to represent a flat, uniform target object in front of a flat, uniform background.

However, not all data sets (nor physical arrangements represented thereby) necessarily will exhibit such uniformity. Values for a first region may vary throughout that first region, and likewise values for a second region may value throughout that second region in addition or instead. In physical terms, not all target objects necessarily are flat and uniform, nor are all backgrounds necessarily flat and uniform.

For example, in FIG. 23 a hand 2302 is shown in front of a surface 2304. The hand 2302 is at least approximately flat and with fingers extended, and it may be that (depending on point of view) for a depth map the distance values across the entire hand 2302 may be approximately uniform. However, the surface 2304 is not flat, but rather is angled; assuming a point of view similar to that from which FIG. 23 is illustrated, distance to the surface 2304 will be greater along left and right edges of the surface 2304 than along the centerline of the surface. If a depth map were to consider the surface 2304 as a second region, then the values in the second region would not necessarily be uniform. The values in the second region in such instance may not even be readily predictable; although in the arrangement in FIG. 23 the surface 2304 exhibits a relatively simple geometry of two flat planes meeting at an angle, in practice a background or other feature considered as a second region may be arbitrarily complex in geometry and/or variation.

With regard to FIG. 24, a hand 2402 is again shown above a surface 2404. However, where the surface 2404 is flat, the hand 2402 is bent, the fingers thereof being angled at the first knuckles. If a depth map were taken of such an arrangement, with the first region representing the hand 2402 and the second region representing the surface 2404, then even though the second region may exhibit uniform values the first region may not represent uniform values.

Through comparison of FIG. 23 and FIG. 24, it should be understood that either or both the first and second regions in a data set representing a physical arrangement may be non-uniform; nor is such non-uniformity necessarily limited to data sets that do not represent physical arrangements, either directly or at all. Likewise, non-uniformity in both first and second regions also may be possible.

Although FIG. 23 and FIG. 24 only show arrangements with simple background surfaces and a single foreground object for purposes of clarity, this is an example only. Arrangements wherein a background has many objects, surfaces, or other elements, and/or wherein two or more foreground objects are to be considered (and potentially both segmented from a data set representing such an arrangement), may be equally suitable. For example, a data set may represent an arrangement with both of one individual's hands as foreground objects, and/or with a background that is relatively "cluttered" rather than geometrically simple, e.g. with furniture, other people, trees, vehicles, etc.

In addition, although FIG. 23 and FIG. 24 show non-uniformity in distance, this is an example only. Non-uniformity in coloring and/or other features also may be present. Furthermore, non-uniformity may be present in factors that may be considered somewhat abstract, such as time, motion, acceleration, etc. That is, a data set may represent not only a static and/or fixed state, but a dynamic state, such as state changing in space, time, etc. Other arrangements also may be equally suitable.

In view of FIG. 23 and FIG. 24, it is noted that property standards applying to a first region and/or a second region (or a region and/or a remnant, a feature and/or a background, etc.) may be variable, e.g. varying over time and/or space. For example, if it is known (or at least suspected) that the distance to a feature such as a hand or a background may be variable, then the distance property used to determine whether a given data element represents the hand or the background may be variable. The distance standard thus may be higher for areas of a hand that are anticipated to be more distant, lower for areas of the hand that are anticipated to be less distant, etc. As an example of variation in time, if multiple data sets are considered distributed in time, such as frames captured by a depth camera several times a second, then the depth property standard used for distinguishing a hand may vary based on the depth of the hand in previous frames. More concretely, if the hand were known (e.g. through analysis of the depths of pixels representing the hand) to be approximately 35 cm distant in one frame, then for a succeeding frame the depth range may be held to within 32 to 38 cm distance (or some other range of variation); although the hand may move to be more or less distant between frames, the distance traveled in a fraction of a second between frames typically may be limited, so in at least certain embodiments it may be useful to define a depth property standard at least partially on previously known depths of the hand.

However, variable property standards are an example only, and are not necessarily required for all embodiments. Even for embodiments wherein variation is expected or even certain, a fixed property standard may be suitable. For example, a depth standard for a hand in a depth image (e.g. as taken by a sensor on a head mounted display) may extend from a depth of 10 cm to a depth of 75 cm; although fixed, typically a hand may be expected to be somewhere within that depth range, and thus the depth property standard may be functional even when fixed.

Considering for example FIG. 21 through FIG. 24, for at least certain embodiments it may be useful to consider both the first region and the second region in a data set (or put differently, both a region and a remnant, both a feature and a background, etc.) in following a transition in the data set, segmenting the first region from the data set, etc.

For example, if as in FIG. 21 a hand 2102 is in close proximity to a surface 2104, such that the distance to the hand 2102 is not starkly different from the distance to the surface 2104, it may be useful to consider both the distances to the hand 2102 and to the surface 2104, rather than only the distance to one or the other. Thus, in colloquial terms the outline of the hand 2102 may be traced not only at a displacement inward into the hand 2102, but also at a displacement outward away from the hand 2102 (or considered differently, at a displacement outward into the background 2104). Tracing both inward displacement into the hand 2102 and the outward displacement into the background 2104 (or away from the hand) may enable more accurate and/or reliable distinction between the hand 2102 and the background 2104 (or more broadly, between first and second regions in a data set).

As a practical example, tracing both within the hand 2102 by displacing inward from the transition, and in the background 2104 by displacing outward from the transition, may facilitate determining within an image of hand 2102 and background 2104 which parts of the image represent the hand 2102 and which parts the background 2104, even when the hand 2102 is close to the background 2104.

Considered in relative terms, for at least certain embodiments tracing both inward and outward from a transition may support improved depth discrimination, or otherwise be useful. For example, for some particular embodiment tracing only inward from a transition may distinguish a hand 2102 from a surface 2104 behind the hand 2102 with a distance therebetween of 20 centimeters, while tracing both inward and outward from the transition may distinguish a hand 2102 from a surface 2104 behind the hand 2102 with a distance therebetween of 10 centimeters, 5 centimeters, etc., other factors being similar.

However, while such inward/outward tracing may be advantageous in certain instances, inward/outward tracing may not necessarily be required or even always useful. Moreover, although improved depth discrimination may be one advantage of inward/outward tracing, other advantages also may exist, including but not limited to improved color discrimination and improved brightness discrimination. Likewise, other advantages not related to discrimination as described also may exist.

Figure 25A:
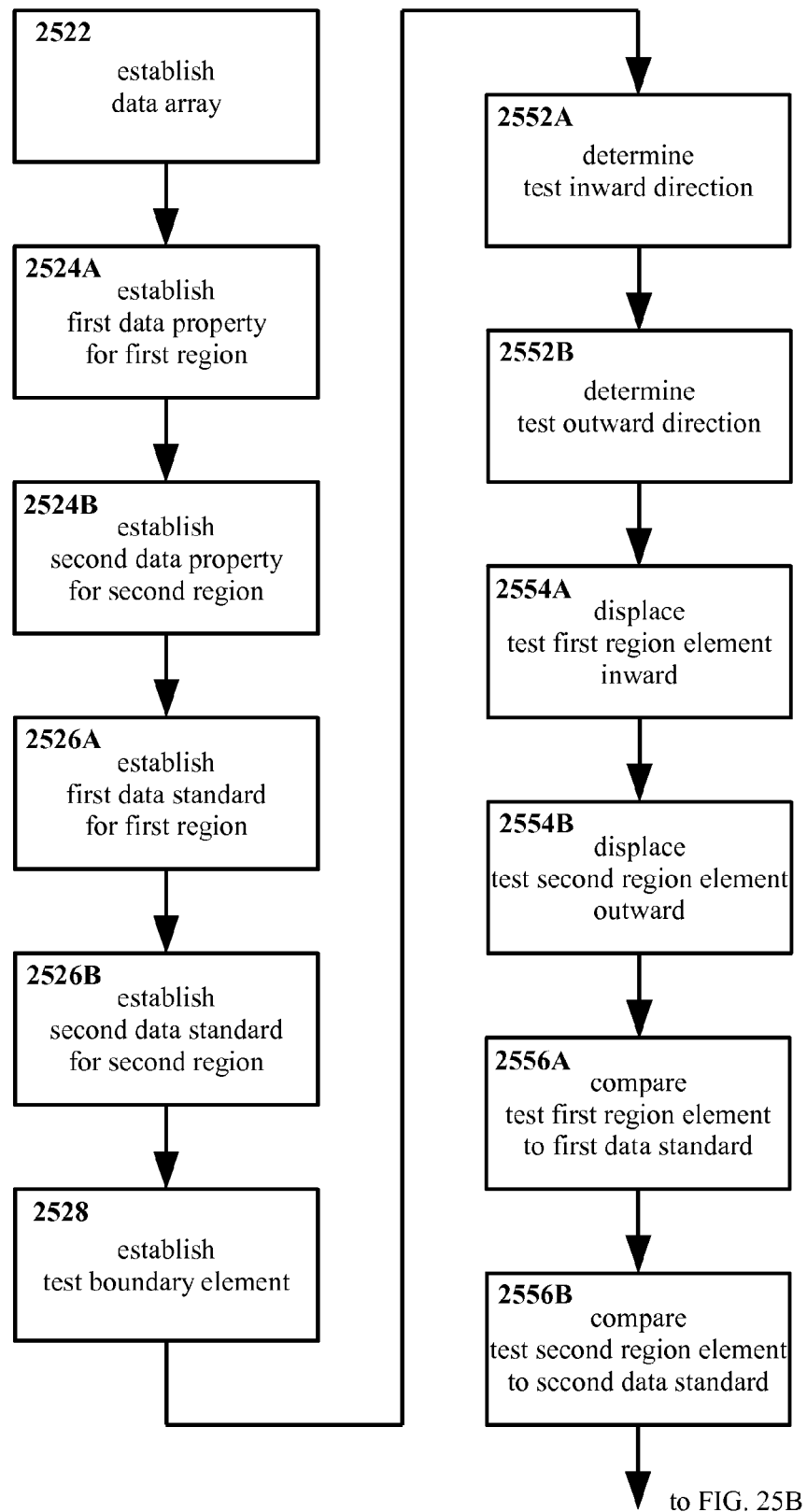
FIG. 25A and FIG. 25B show an example method for distinguishing features in a data set considering inward and outward traces, in flow-chart form.

Turning to FIG. 25A, an example method considering both first and second regions relative to a transition therebetween is illustrated therein, as may be used for such inward/outward tracing as referred to above. In the arrangement of FIG. 25A, a data set is established 2522. Data sets and establishment thereof have been described previously herein.

A first data property is established 2524A for a first region of the data set, and a second data property is established 2524B for a second region of the data set. Data properties and the establishment thereof also have been described previously herein. However, where previously it has been assumed for simplicity that only a single data property may be considered for both the first and the second regions of a data set, as shown in the arrangement of FIG. 25A in at least certain instances two (or more) different data properties may be considered, e.g. a first data property with respect to a first region and a second (different) data property with respect to a second region.

For example, consider a data set that represents a depth image including both distance data and grayscale image data. A first region of that data set may represent a hand, and a second region a background. In considering whether a given element (or other portion) of the data set represents the hand (first region) or the background (second region), a single property may be considered, such as depth or brightness. The hand may be anticipated (in at least some circumstances) to be within a certain range of depths, while the background likewise may be anticipated to be at a different range of depths. As a more concrete example, for a depth image taken from a head mounted display the wearer's hand may be anticipated as being between 0.25 meters and 0.75 meters distant, while the background may be anticipated as being 1 meter distant or more. Thus distance may be used as a single data property for both the first and second regions of the data set. However, as shown in the example of FIG. 25 two different data properties may be used. A portion of the data set may be determined to belong to the first region (e.g. the hand) based on brightness or color, or to belong to the second region (e.g. the background) based on distance.

However, although the use of different data properties with respect to different regions of a data set is permissible, use of different data properties is not required.

In addition, although for simplicity "data property" is used herein as a singular, multiple distinct properties may be considered with respect to various regions of a data set. For example, it may be useful to consider both depth and color in distinguishing first and second regions from one another, to consider depth and color with regard to one region and depth and motion with regard to another region, etc. Other arrangements also may be equally suitable.

Moving on in FIG. 25A, a first data standard is established 2526A for the first region, and a second data standard is established 2526B for the second region. Again, data standards and the establishment thereof have been described previously herein. As noted above with regard to data properties, as shown in the example of FIG. 25A different data standards may be considered for first and second regions in a data set, e.g. a first data standard for the first region and a second data standard for the second region.

It is pointed out that using two (or more) data standards as in FIG. 25A does not require two different data properties (even though FIG. 25A itself does indeed show two different data properties). That is, even if a single data property of depth is considered for both first and second regions, different first and second data standards may be established for the first and second regions, respectively. For example, a first depth range may be defined as a first data standard for a first region, and a second depth range may be defined as a second data standard for a second region. Other arrangements also may be equally suitable.

Still with reference to FIG. 25A, a test boundary element is established 2528. Test boundary elements and establishment thereof have been described previously herein.

A test inward direction is determined 2552A, and a test outward direction is determined 2552B. Test inward directions, test outward directions, and determination thereof have been described previously herein. Where both a test inward direction and a test outward direction is determined (as in FIG. 25A), algorithms for such determination may be identical, may differ but resemble one another, or may be entirely different. Moreover, algorithms or other approaches may be in some manner connected and/or related, e.g. a determination that one direction is a test inward direction may be used as indication or suggestion that an opposite (or other) direction is a test outward direction.

Once a test inward direction is determined 2552A, a test first region element is displaced inward 2554A. Once a test outward direction is determined 2552B, a test second region element is displaced outward 2554B. The test first region element is compared 2556A to the first data standard, and the test second region element is compared 2556B to the second data standard. Test region elements and comparison thereof against data standards have been described previously herein.

Figure 25B:
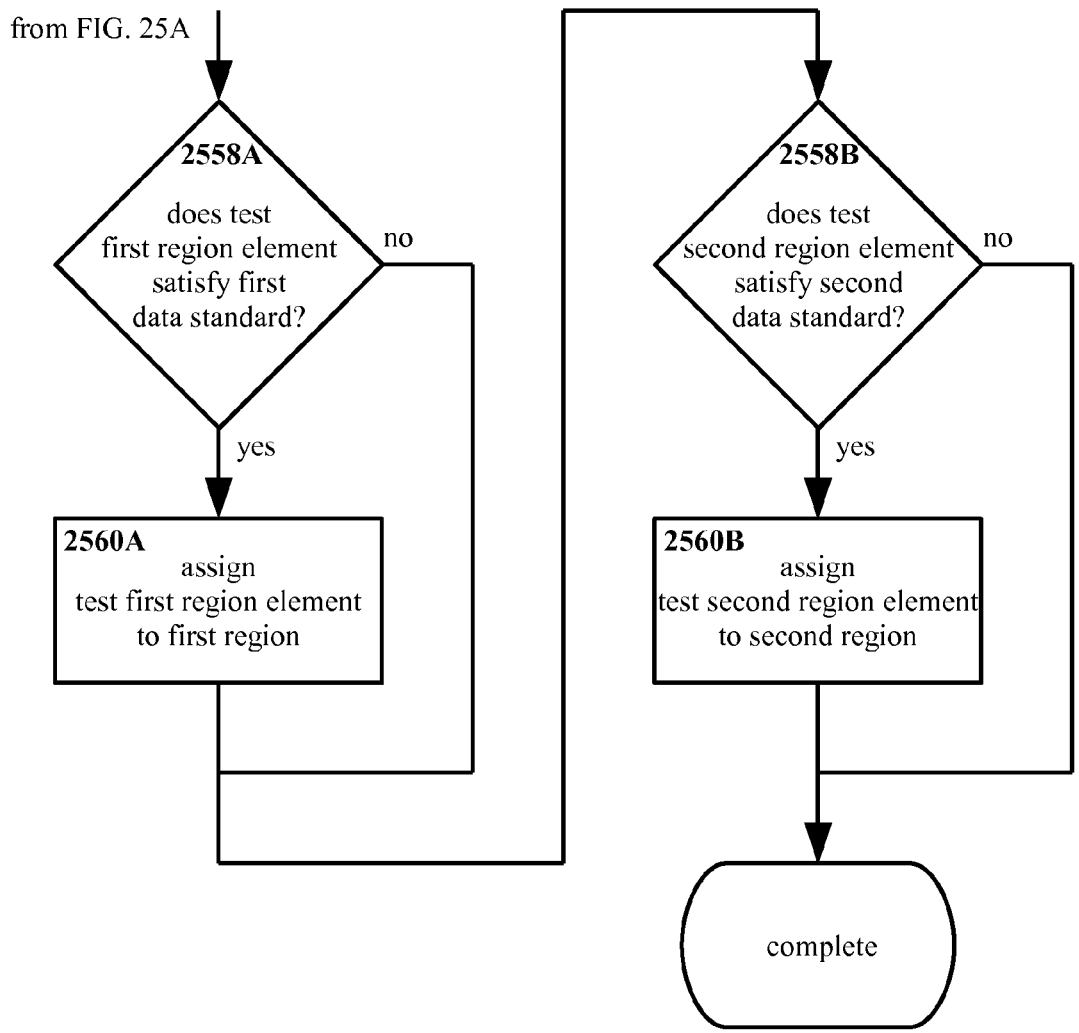

Continuing in FIG. 25B, a determination is made 2558A as to whether the test first region element satisfies the first data standard. If the determination is positive—if the test first region element does satisfy the first data standard—then the method proceeds with step 2560A. Otherwise, the method skips step 2560A. In step 2560A, the test first region element is identified 2560A as belonging to the first region.

A determination is made 2558B as to whether the test second region element satisfies the second data standard. If the determination is positive—if the test second region element does satisfy the second data standard—then the method proceeds with step 2560B. Otherwise, the method skips step 2560B. In step 2560B, the test second region element is identified 2560B as belonging to the second region.

In the arrangement in FIG. 25B, the determinations of first and second regions are shown to be independent. That is, it is determined whether a test first region element (i.e. some prospective element of the first region) is indeed part of the first region, and it is determined separately whether a test second region element (i.e. some prospective element of the second region) is indeed part of the second region; one determination does not affect the other. However, other arrangements may be equally suitable, as shown for example in FIG. 26A, FIG. 26B, FIG. 27A, and FIG. 27B.

Figure 26A:
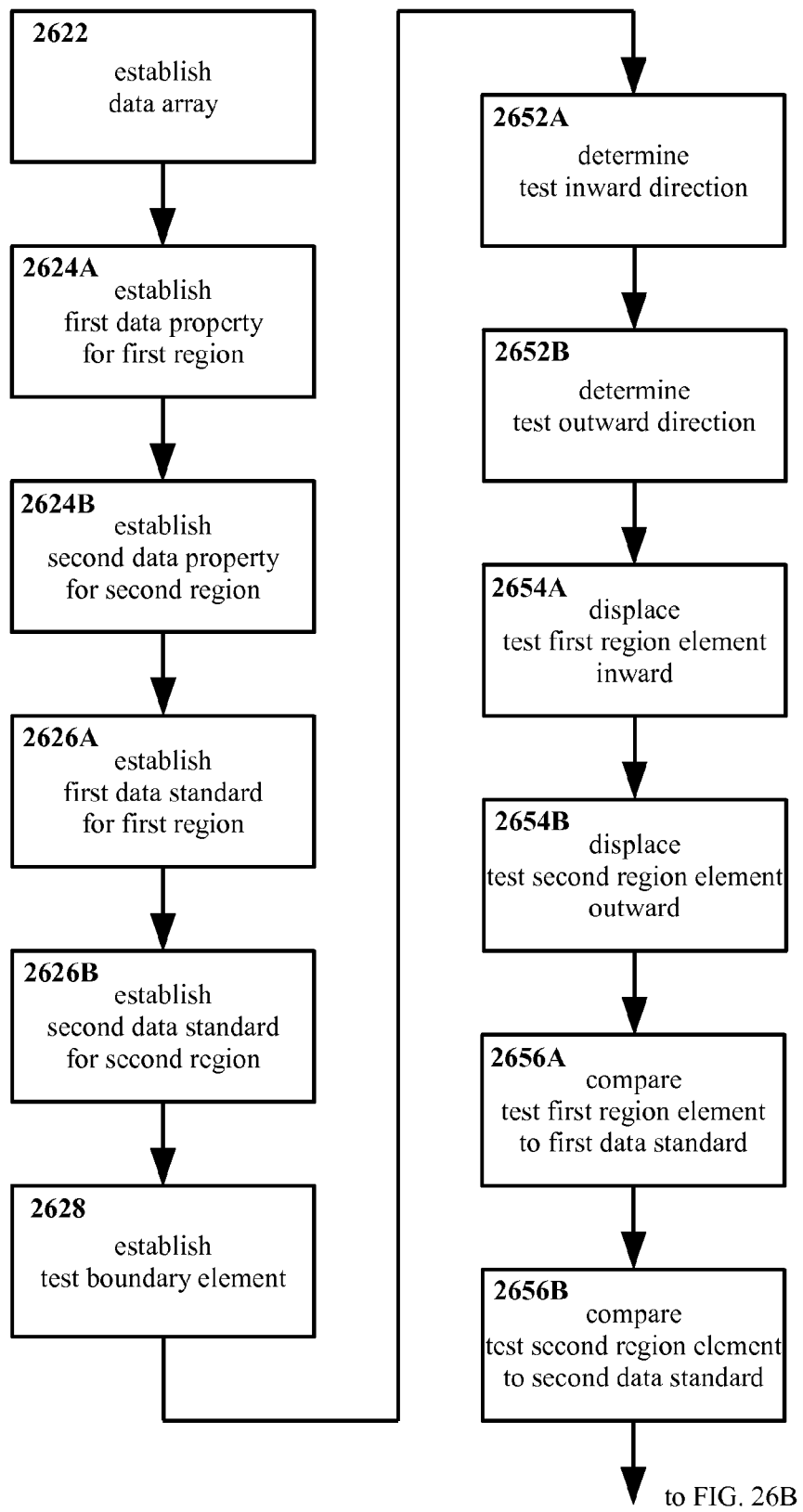
FIG. 26A and FIG. 26B show another example method for distinguishing features in a data set considering inward and outward traces, in flow-chart form.

Now with reference to FIG. 26A, therein is shown an example method at least somewhat similar to that in FIG. 25A. A data set is established 2622. A first data property is established 2624A for a first region, and a second data property is established 2624B for a second region. A first data standard is established 2626A for a first region, and a second data standard is established 2626B for a second region.

A test boundary element is established 2628. A test inward direction and a test outward direction are determined 2652A and 2652B; the test first region element is displaced 2654A inward, and the test second region element is displaced 2654B outward. The test first region element is compared 2656A to the first data standard, and the test second region element is compared 2656B to the second data standard.

Figure 26B:
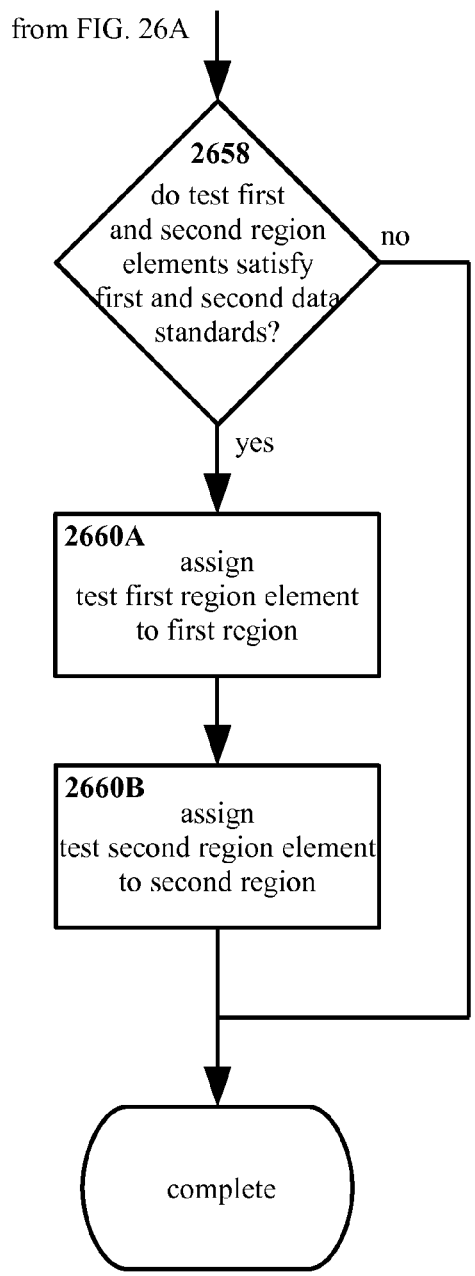

Moving on to FIG. 26B, a determination is made 2658 as to whether the test first region element and test second region element satisfy the first and second data standards, respectively. (It is emphasized that this determination 2658 in FIG. 26B is combined, as contrasted with the example in FIG. 25B wherein two determinations 2558A and 2558B are made.) If the determination is positive—if the test first region element does satisfy the first data standard, and the test second region element does satisfy the second data standard—then the method proceeds with steps 2660A and 2660B. Otherwise, the method skips steps 2660A and 2660B.

In step 2660A, the test first region element is identified 2660A as belonging to the first region. In step 2660B, the test second region element is identified 2660B as belonging to the second region.

Thus in the example of FIG. 26B, a single determination 2658 is made, requiring both that the test first region element satisfies the first data standard, and that the test second region element satisfies the second data standard. Depending on the result of the determination 2658, either both test first and second region elements are identified 2660A and 2660B as belonging to the first and second regions respectively, or neither is. Both test region elements must satisfy their respective standards, and both are identified or not identified as belonging to their respective regions.

Figure 27A:
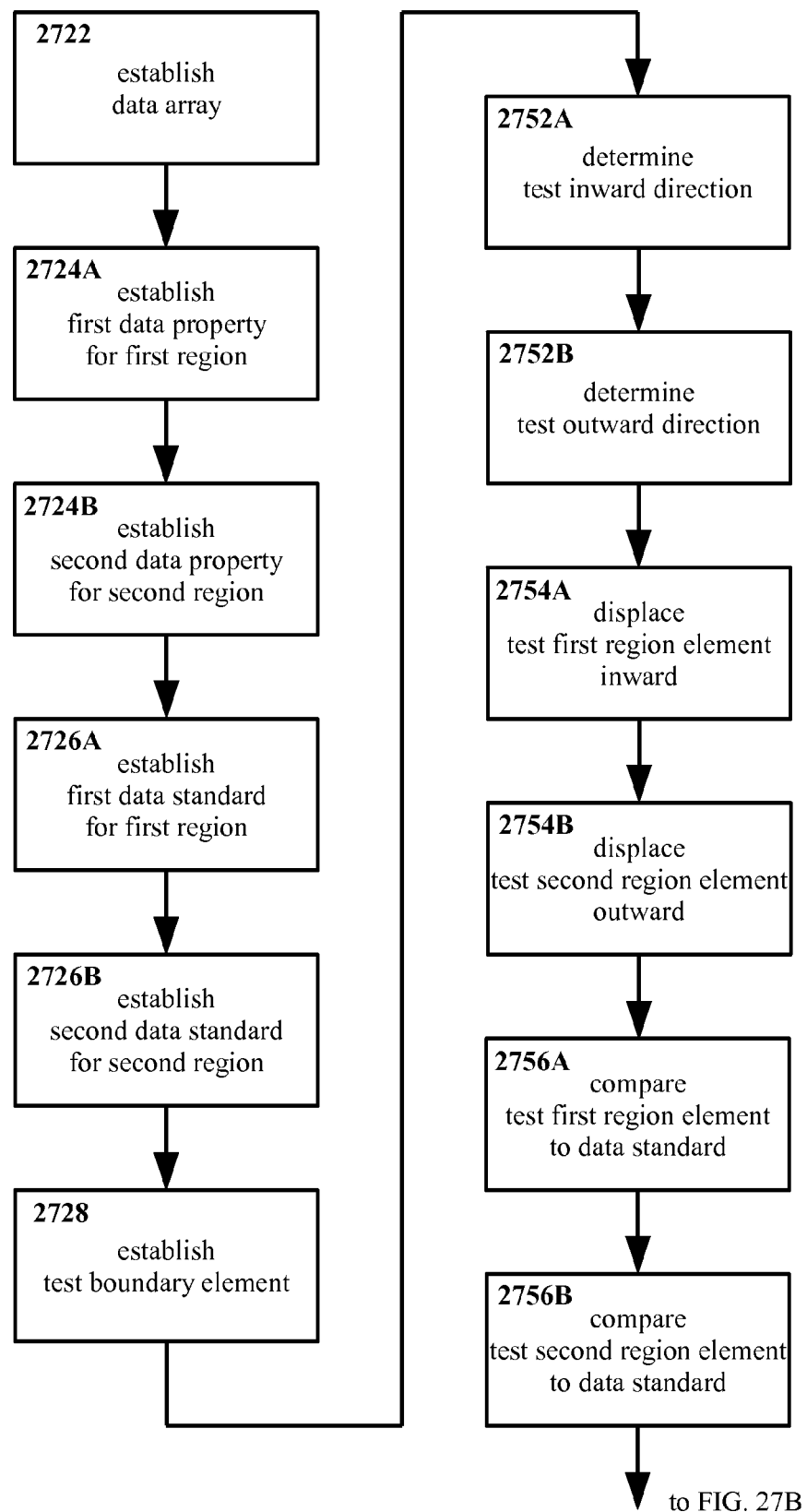
FIG. 27A and FIG. 27B show another example method for distinguishing features in a data set considering inward and outward traces, in flow-chart form.

Now with reference to FIG. 27A, therein is shown an example method at least somewhat similar to that in FIG. 25A and FIG. 26A. A data set is established 2722. A first data property is established 2724A for a first region, and a second data property is established 2724B for a second region. A first data standard is established 2726A for a first region, and a second data standard is established 2726B for a second region.

A test boundary element is established 2728. A test inward direction and a test outward direction are determined 2752A and 2752B; the test first region element is displaced 2754A inward, and the test second region element is displaced 2754B outward. The test first region element is compared 2756A to the first data standard, and the test second region element is compared 2756B to the second data standard.

Figure 27B:
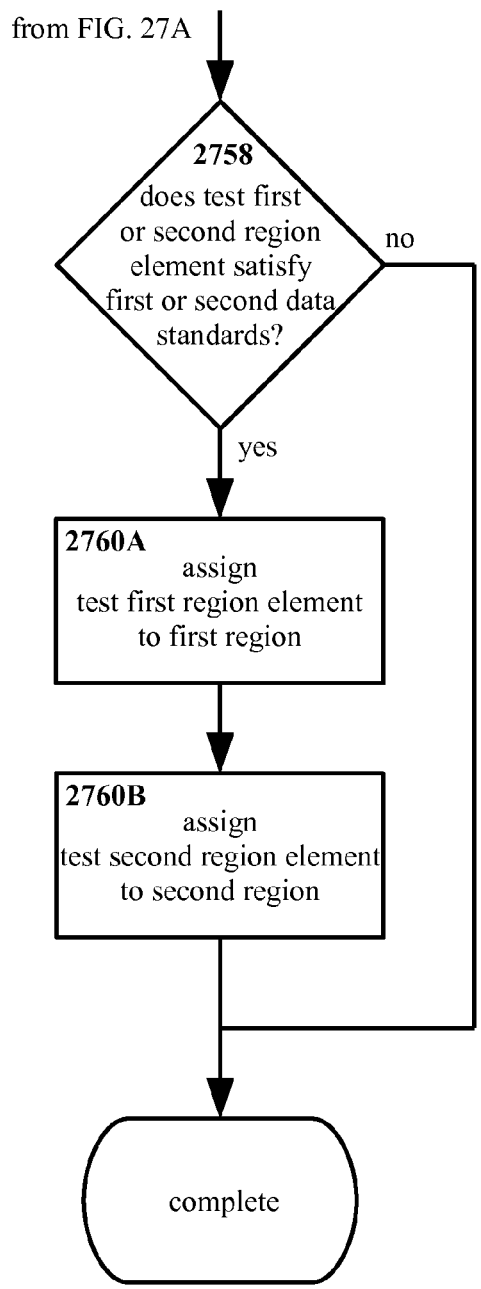

Moving on to FIG. 27B, a determination is made 2758 as to whether either the test first region element or the test second region element satisfy the respective first or second data standards. If the determination is positive—if the test first region element does satisfy the first data standard, or the test second region element does satisfy the second data standard (or both)—then the method proceeds with steps 2760A and 2760B. Otherwise, the method skips steps 2760A and 2760B.

In step 2760A, the test first region element is identified 2760A as belonging to the first region. In step 2760B, the test second region element is identified 2760B as belonging to the second region.

Thus in the example of FIG. 27B, a single determination 2758 is again made. However, in FIG. 27B either the test first region element may satisfy the first data standard, or the test second region element satisfies the second data standard, and either is sufficient to identify 2760A and 2760B both test first and second region elements as belonging to the first and second regions respectively. If either test region elements satisfies its respective standard, both are identified or not identified as belonging to their respective regions.

With regard collectively to FIG. 25 through FIG. 27, although several examples "two trace" arrangements are presented therein, other arrangements may be equally suitable. Various embodiments may utilize different combinations of inward and outward traces, different arrangements for determining whether data elements are part of inward and/or outward traces, different arrangements for determining whether other portions of the data set belong or do not belong to first or second regions (e.g. if those portions are substantially enclosed by traces, as described previously herein), etc., and embodiments are not limited with regard thereto.

Also, with regard to certain examples presented previously herein, first and second regions and distinctions therebetween have been addressed. However, it should be understood that additional regions, e.g. a third region, also may be considered. As an example of a physical system that may be represented by a data set having three regions, one possibility is an image from a camera or other sensor disposed on a head mounted display, with a field of view directed in front of the person wearing the head mounted display. As has been noted in other examples herein, a hand may be considered a first region to be distinguished from a background considered as a second region. However, if both hands of a user are present in an image (or similarly two or more features of interest are present in another data set), then it may be useful to address the image (or other data set) with regard to more than two regions, e.g. first and third regions representing right and left hands respectively, and a second region representing a background.

Such an arrangement considering a third region (or more) is not required. To continue the example above, in certain instances it may be useful to consider both hands to represent the first region, even if the image is such that the hands do not appear to be contiguous (for example if the field of view of the image does not extend beyond the forearms, as may be the case given an imager disposed on a head mounted display). Depending on the particulars of a given situation, it may not be necessary or useful to distinguish one hand from another, and thus both hands may be considered as one region for simplicity.

However, in other instances it may be useful and/or necessary to distinguish two hands against a background, or otherwise to consider a data set as exhibiting (or at least potentially exhibiting) three or more regions. For example, consider again an image with both of a user's hands visible therein, but specifically wherein the two hands at least partially overlap. If a hand gesture is to be identified within the image, for example so as to control a device as described with regard to FIG. 20A and FIG. 20B herein, then determining the configuration of one or both hands—which fingers are bent, at what joints, to what degree, etc.—may be useful and/or necessary. However, if the two overlapping hands were considered as a single region in such instance, the resulting shape may not be clearly representative of any particular hand gesture. As a simple example, two overlapping hands could exhibit the appearance of ten fingers, where a particular one-handed gesture may be defined with regard to only five fingers. Thus treating both hands as a single region may in such circumstance render gesture recognition more difficult, more time consuming, more processor intensive, less reliable, etc.

Potentially such difficulties may be avoided by treating one hand as part of the second region, i.e. as part of the background. However this too may result in difficulties. If the hand making the gesture of interest is more distant than the other hand that is to be considered part of the background, then in a strict sense a portion of the background would then be in front of the hand of interest. While logical and practical issues resulting therefrom may not necessarily be insurmountable, but again may complicate gesture control of a device (or likewise some other process dependent upon distinguishing regions within a data set). In addition, certain gestures may be two handed gestures, or the "off" hand may be of interest for some other reason even if a gesture is made with only one hand.

Similarly, in certain instances it may be useful to consider a background as multiple regions, rather than as a single region. For example, certain objects or features within a background may be of sufficient interest as to be considered separately from the remainder of the background. As a more concrete example, another person's hand visible within an image may be considered with regard to gesture recognition; a head mounted display may be configured to accept a gesture instructing a processor thereon not to save images, record audio, etc. regardless of who makes the gesture, as a privacy function. (That is, any person could make a gesture to "turn off" certain functions of the head mounted display.)

Other background features also may, in certain instances, be distinguished as a third region, either so that features may be recognized or utilized (e.g. a street sign may be found and read to determine location from an image), so that features may be ignored (vehicle traffic or other high-speed features may be ignored to reduce processor loads associated with updating video feeds), or for other purposes or reasons.

Thus consideration may be extended within the scope of the disclosure to a third region distinguished from the first and/or the second regions, and so on. It is noted that such an arrangement may include additional factors, such as the potential for two different boundaries. That is, a boundary between a second region and a third region or between a first region and a third region may differ from the boundary between first and second regions, and so may be treated distinctly. Likewise, a third region may have a third data property, a third data standard, etc. distinct from first and/or second data properties and/or data standards, and so forth.

In addition, it is noted that for simplicity the approaches described as examples for determining whether elements of a data set are part of a first region, a second region, a transition, etc., and for various other operations, have addressed those elements individually. While addressing each data element individually and without consideration of other elements (e.g. nearby elements) is permitted, other arrangements may be equally suitable. For example, consideration as to whether an element of the data set is or is not part of the first region may include averaging, other statistical analysis, or other evaluation, etc. of nearby elements.

Consideration also may be given to other data sets. For example, if an image is considered as a data set, and that image is part of a sequence of images, a video feed, etc., then preceding images (thus, other data sets) may be considered in various operations. As a more concrete example, if a first region includes a hand that is centered within the field of view of an image, and an image taken (for example) 1/30th of a second later does not show any first region, then additional consideration may be given to whether the previous determination that a first region was present was in fact accurate, whether the current determination that no first region is present now is accurate, etc. Such consideration may in this instance be based on an expectation that a hand does not typically move from the center of an image to outside the image frame so quickly, but other factors also may be considered.

Likewise, consideration may include logical tests and/or factors beyond those already described, e.g. if a first region is anticipated to represent a hand in an image, and the image is anticipated as being obtained such that the hand typically would extend upward from the bottom edge of the image frame (as may be the case for a camera disposed on a head mounted display), then data elements that appear to represent a first region but that are part of a structure extending from the top of the image frame may be subject to further scrutiny before being considered as part of the first region, excluded altogether from the first region, etc.

Broadly speaking, although certain examples presented herein may be relatively simple, so as to be more readily understood, additional features, greater sophistication, etc. is not prohibited, and may be present within various embodiments.

Figure 28:
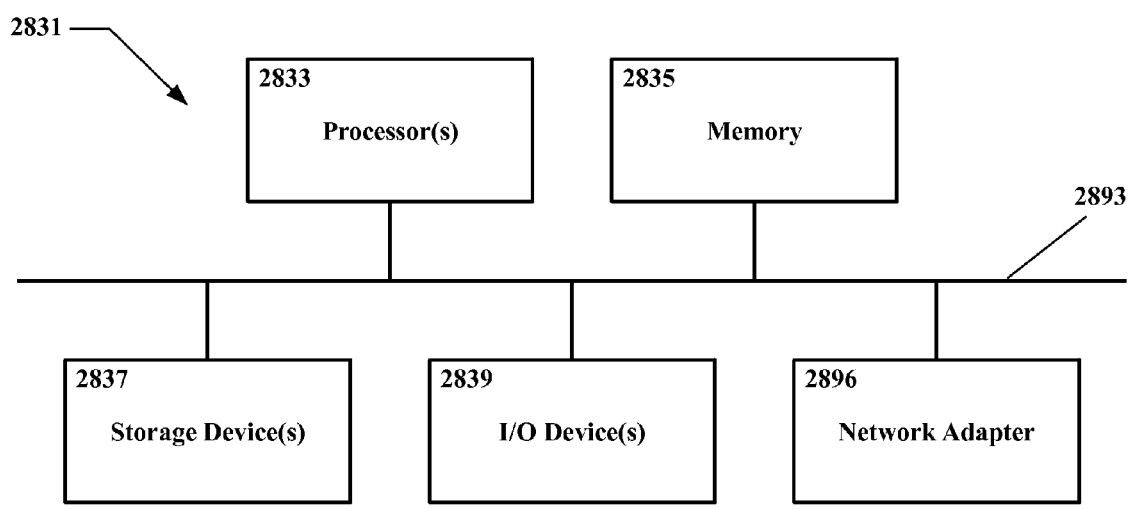
FIG. 28 shows an example apparatus that may perform various operations, and store various information generated and/or used by such operations, in block diagram form.

Now with reference to FIG. 28, a block diagram is shown therein of an apparatus that may perform various operations, and store various information generated and/or used by such operations, according to an embodiment of the disclosed technique. The apparatus may represent any computer or processing system described herein. The processing system 2831 is a hardware device on which any of the other entities, components, or services depicted in the examples of FIG. 1 through FIG. 27 (and any other components described in this specification) may be implemented. The processing system 2831 includes one or more processors 2833 and memory 2835 coupled to an interconnect 2837. The interconnect 2837 is shown in FIG. 28 as an abstraction that represents any one or more separate physical buses, point to point connections, or both connected by appropriate bridges, adapters, or controllers. The interconnect 2837, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 2833 is/are the central processing unit of the processing system 2831 and, thus, control the overall operation of the processing system 2831. In certain embodiments, the processor(s) 2833 accomplish this by executing software or firmware stored in memory 2835. The processor(s) 2833 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 2835 is or includes the main memory of the processing system 2831. The memory 2835 represents any form of random access memory (RAM), read-only memory (ROM), flash memory, or the like, or a combination of such devices. In use, the memory 2835 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network adapter 2839, a storage device(s) 2841, and I/O device(s) 2896, are also connected to the processor(s) 2833 through the interconnect 2837 The network adapter 2839 provides the processing system 2831 with the ability to communicate with remote devices over a network and may be, for example, an Ethernet adapter or Fibre Channel adapter. The network adapter 2839 may also provide the processing system 2831 with the ability to communicate with other computers within the cluster. In some embodiments, the processing system 2831 may use more than one network adapter to deal with the communications within and outside of the cluster separately.

The I/O device(s) 2896 can include, for example, a keyboard, a mouse or other pointing device, disk drives, printers, a scanner, and other input and/or output devices, including a display device. The I/O device(s) 2896 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 2835 may be implemented as software and/or firmware to program the processor(s) 2833 to carry out actions described herein. In certain embodiments, such software or firmware may be initially provided to the processing system 2831 by downloading from a remote system through the processing system 2831 (e.g., via network adapter 2839).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 2841 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A machine implemented method for controlling a device through hand inputs, comprising:
    establishing a depth image comprising a plurality of pixels in a processor;
    defining a hand from a background in said depth image with said processor, comprising:
        establishing a depth value for said pixels of said depth image;
        establishing a hand depth value standard corresponding with said hand in said depth image based on said depth value for said pixels;
        establishing a background depth value standard corresponding with said background in said depth image based on said depth value for said pixels;
        establishing a plurality of test boundary pixels collectively comprising a boundary for said hand within said depth image, and determining a next of said plurality of test boundary elements at least partially from a current of said test boundary elements, and for each of said test boundary pixels:

establishing eight dominant directions;
establishing a property matrix comprising said depth value for a three by three configuration of pixels centered on and excluding said test boundary pixel;
establishing a three by three dominant direction matrix for each of said dominant directions, each said dominant direction matrix centered on and excluding said test boundary pixel and comprising weighting values of
 8 in said dominant direction;
 4s 45 degrees offset from said dominant direction;
 2s 90 degrees offset from said dominant direction:
 1s 135 degrees offset from said dominant direction;
 0 180 degrees offset from said dominant direction:
for each dominant direction matrix, multiplying each value thereof with a corresponding depth value of said property matrix and summing products thereof to yield a dominant direction value;
determining a test inward direction for said hand relative to said test boundary pixel by comparing said dominant direction values;
determining a test outward direction for said hand relative to said test boundary pixel by comparing said dominant direction values;
establishing a test hand pixel in said depth image displaced at least one pixel from said test boundary pixel in said test inward direction;
comparing said depth value of said test hand pixel to said hand depth value standard;
if said depth value of said test hand pixel satisfies said hand depth value standard, identifying said test hand pixel as belonging to said hand;
establishing a test background pixel in said depth image displaced at least one pixel from said test boundary pixel in said test outward direction;
comparing said depth value of said test background pixel to said background depth value standard;
if said depth value of said test hand pixel satisfies said background depth value standard, identifying said test background pixel as belonging to said background;
if said pixels identified as belonging to said hand comprise a substantially continuous inward trace disposed inward from said boundary, identifying a portion of said depth image enclosed by said inward trace as belonging to said hand;
determining with said processor at least one of a configuration and a motion of said hand;
identifying with said processor a control command associated with said at least one of said configuration and said motion of said hand; and
calling said control command with said processor, so as to control said device.

2. A machine implemented method for controlling a system through event detection, comprising:
 establishing a data set comprising a plurality of elements in a processor, wherein said data set comprises at least one of an optical image, a depth map, and a depth image;
 defining a region from a remnant in said data set with said processor, comprising:
 establishing a property of said elements of said data set, wherein said elements comprise pixels and wherein said property comprises at least one of color, brightness, degrees of focus, and depth;
 establishing a region standard distinguishing said region of said data set based on said property;
 establishing a remnant standard distinguishing a remnant of said data set based on said property;
 establishing a test boundary element;
 determining a test inward direction for said region relative to said test boundary element;
 determining a test outward direction for said region relative to said test boundary element, wherein establishing said test inward direction comprises:
 establishing a plurality of dominant directions;
 analyzing each of said dominant directions;
 selecting said test inward direction from said plurality of dominant directions;
 wherein establishing said outward direction comprises:
 analyzing each of said dominant directions; and
 selecting said test outward direction from said plurality of dominant directions;
 wherein analyzing each of said dominant directions comprises:
 establishing a property matrix comprising values of said property for a configuration of elements proximate said test boundary element;
 establishing a dominant direction matrix for each of said at least one dominant direction, each said dominant direction matrix comprising weighting values for said configuration of elements proximate said test boundary element; and
 for each dominant direction matrix, multiplying each element thereof with a corresponding element of said property matrix and summing products thereof to yield a dominant direction value;
 determining a test region element of said data set displaced at least one element from said test boundary element in said test inward direction;
 determining a test remnant element of said data set displaced at least one element from said test boundary element in said test outward direction;
 comparing said property of said test region element to said region standard;
 if said property of said test region element satisfies said region standard, identifying said test region element as belonging to said region;
 comparing said property of said remnant region element to said remnant standard;
 if said property of said test remnant element satisfies said remnant standard, identifying said test remnant element as belonging to said remnant; and
 determining with said processor an event indicated by said region;
 identifying with said processor a control command associated with said event;
 calling said control command with said processor, so as to control said system.

3. The method of claim 2, comprising:
 establishing a plurality of test boundary elements, and for each said test boundary element:
 establishing a test inward direction for said region relative to said test boundary element;
 establishing a test outward direction for said region relative to said test boundary element;
 establishing a test region element of said data set displaced at least one element from said test boundary element in said test inward direction;
 establishing a test remnant element of said data set displaced at least one element from said test boundary element in said test outward direction;
 comparing said property of said test region element to said region standard;

if said property of said test region element satisfies said standard,
identifying said test region element as belonging to said region;
comparing said property of said remnant region element to said remnant standard; and
if said property of said test remnant element satisfies said remnant standard,
identifying said test remnant element as belonging to said remnant.

4. The method of claim 3, comprising:
establishing a next of said plurality of test boundary elements at least partially from a current of said test boundary elements.

5. The method of claim 3, comprising;
establishing a boundary propagation direction for said region relative to said test boundary element; and
establishing a next of said plurality of test boundary elements by displacing at least one element from a current of said test boundary elements in said boundary propagation direction.

6. The method of claim 3, wherein:
said plurality of test boundary elements collectively comprise a boundary of said region.

7. The method of claim 6, wherein:
said boundary is at least substantially continuous.

8. The method of claim 6, wherein:
a plurality of elements identified as belonging to said region comprise an inward trace disposed inward from said boundary; and
a plurality of elements identified as belonging to said remnant comprise an outward trace disposed outward from said boundary.

9. The method of daim 8, wherein:
said inward trace is at least substantially continuous; and
said outward trace is at least substantially continuous.

10. The method of claim 8, comprising:
identifying said elements of said data set inward of said inward trace relative to said boundary as belonging to said region; and
identifying said elements of said data set outward of said outward trace relative to said boundary as belonging to said remnant.

11. The method of claim 2, comprising:
responsive to said definition of said region from said remnant, calling a control command with said processor.

12. The method of claim 2, wherein:
said test boundary element comprises a discontinuity in said property.

13. The method of claim 2, wherein:
analyzing each of said dominant directions comprises calculating a mathematical value for each of said dominant directions based on a value of said property proximate said test region element;
selecting said test inward direction comprises comparing said mathematical values; and
selecting said test outward direction comprises comparing said mathematical values.

14. The method of claim 2, wherein:
selecting said test inward direction comprises identifying a maximum of said dominant direction values and selecting said dominant direction associated therewith as said test inward direction; and
selecting said test outward direction comprises identifying a minimum of said dominant direction values and selecting said dominant direction associated therewith as said test outward direction.

15. The method of claim 14, wherein:
If at least two of said dominant direction values are substantially equal maxima:
enlarging said property matrix to an enlarged configuration of elements proximate said test boundary element;
enlarging each of said dominant direction matrices to said enlarged configuration;
for each enlarged dominant direction matrix, multiplying each element thereof with a corresponding element of said enlarged property matrix and summing products thereof to yield an enlarged dominant direction value;
identifying a maximum of said enlarged dominant values and selecting said dominant direction associated therewith as said test inward direction;
if at least two of said dominant direction values are substantially equal minima:
enlarging said property matrix to an enlarged configuration of elements proximate said test boundary element;
enlarging each of said dominant direction matrices to said enlarged configuration;
for each enlarged dominant direction matrix, multiplying each element thereof with a corresponding element of said enlarged property matrix and summing products thereof to yield an enlarged dominant direction value; and
identifying a maximum of said enlarged dominant values and selecting said dominant direction associated therewith as said test outward direction.

16. The method of claim 14, wherein:
selecting said test inward direction comprises identifying a minimum of said dominant direction values and selecting said dominant direction associated therewith as said test inward direction; and
selecting said test outward direction comprises identifying a maximum of said dominant direction values and selecting said dominant direction associated therewith as said test outward direction.

17. The method of claim 16, wherein:
if at least two of said dominant direction values are substantially equal minima:
enlarging said property matrix to an enlarged configuration of elements proximate said test boundary element;
enlarging each of said dominant direction matrices to said enlarged configuration;
for each enlarged dominant direction matrix, multiplying each element thereof with a corresponding element of said enlarged property matrix and summing products thereof to yield an enlarged dominant direction value;
identifying a minimum of said enlarged dominant values and selecting said dominant direction associated therewith as said test outward direction if at least two of said dominant direction values are substantially equal minima:
enlarging said property matrix to an enlarged configuration of elements proximate said test boundary element;
enlarging each of said dominant direction matrices to said enlarged configuration;
for each enlarged dominant direction matrix, multiplying each element thereof with a corresponding element of said enlarged property matrix and summing products thereof to yield an enlarged dominant direction value; and identifying a maximum of said enlarged dominant values and selecting said dominant direction associated therewith as said test inward direction.

18. The method of claim 2, wherein;
said property matrix comprises a three by three matrix centered on and excluding said test boundary element.

19. The method of claim 2, wherein:
said weighting values for each said dominant direction matrices comprise:
8 in said dominant direction;
4s 45 degrees offset from said dominant direction;
2s 90 degrees offset from said dominant direction;
1s 135 degrees offset from said dominant direction; and
0 180 degrees offset from said dominant direction.

20. The method of claim 1, wherein:
said region standard and said remnant standard are variable.

21. An apparatus for controlling a system responsive to event detection, comprising:
a processor adapted to execute executable instructions instantiated thereon;
a data set establisher comprising executable instructions instantiated on said processor, said data set establisher being adapted to establish a data set comprising a plurality of elements, wherein said data set comprises at least one of an optical image, a depth map, and a depth image;
a property establisher comprising executable instructions instantiated on said processor, said property establisher being adapted to establish a property of at least some of said elements of said data set, wherein said elements comprise pixels and wherein said property comprises at least one of color, brightness, degree of focus, and depth;
a standard establisher comprising executable instructions instantiated on said processor, said a standard establisher being adapted to establish a region standard and a remnant standard distinguishing a region of said data set from a remnant of said data based on said region and remnant standards;
a test boundary element establisher comprising executable instructions instantiated on said processor, said test boundary element establisher being adapted to establish potential boundary elements defining said region from said remnant within said data set;
a test direction establisher comprising executable instructions instantiated on said processor, said test direction establisher being adapted to establish a test inward direction relative to said test boundary element and a test outward direction relative to said test boundary element;
a test region element displacer comprising executable instructions instantiated on said processor, said test region element displacer being adapted to displace a test region element from said test boundary element in said test inward direction by at least one element and to displace a test remnant element from said test boundary element in said test outward direction by at least one element;
a property comparer comprising executable instructions instantiated on said processor, said property comparer being adapted to compare said test region element against said region standard and said test remnant element against said remnant standard;
a region identifier comprising executable instructions instantiated on said processor, said region identifier being adapted to identify said test region element as part of said region if said test region element satisfies said region standard and to identify said test remnant element as part of said remnant if said test remnant element satisfies said remnant standard; and
a control command caller comprising executable instructions instantiated on said processor, said controller command caller being adapted to determine an event indicated by said region, to identify a control command associated with said event, and to call said command so as to control said system.

22. The apparatus of dam 21, comprising:
a body, said processor being disposed on said body;
a sensor disposed on said body; and
first and second displays disposed on said body;
wherein said body is adapted to be worn on a head of a wearer, such that when said body is worn said first and second displays are disposed substantially in front of, facing toward, and proximate eyes of said wearer so as to enable output thereto, and said sensor is aligned such that a field of view of said sensor is directed substantially in front of said wearer.

23. An apparatus for controlling a system responsive to event detection, comprising:
means for establishing a data set comprising a plurality of elements, wherin said data set comprises at least one of an optical image, a depth map, and a depth image;
means for defining a region from a remnant in said data set, comprising:
means for establishing a property of said elements of said data set, wherein said elements comprises pixels and wherein said property comprises at least one of color, brightness, degree of focus, and depth:
means for establishing a region standard distinguishing said region of said data set based on said property and said remnant of said data set based on said property;
means for establishing a test boundary element;
means for establishing a test inward direction for said region relative to said test boundary element and a test outward direction for said region relative to said test boundary element;
means for establishing a test region element of said data set displaced at least one element from said test boundary element in said test inward direction and establishing a test remnant element of said data set displaced at least one element from said test boundary element in said test outward direction;
means for comparing said property of said test region element to said region standard and said property of said test remnant element to said remnant standard;
means for identifying said test region element as belonging to said region if said property of said test region element satisfies said region standard and identifying said test remnant element as belonging to said remnant if said remnant property of said test remnant element satisfies said standard; and
means for determining an event indicated by sad region, identifying a control command associated with said event, and calling said control command so as to control said system.

\* \* \* \* \*